Feb. 23, 1960    C. SCHRAMM    2,925,612
CASE MAKING MACHINE
Filed June 23, 1958    23 Sheets-Sheet 5

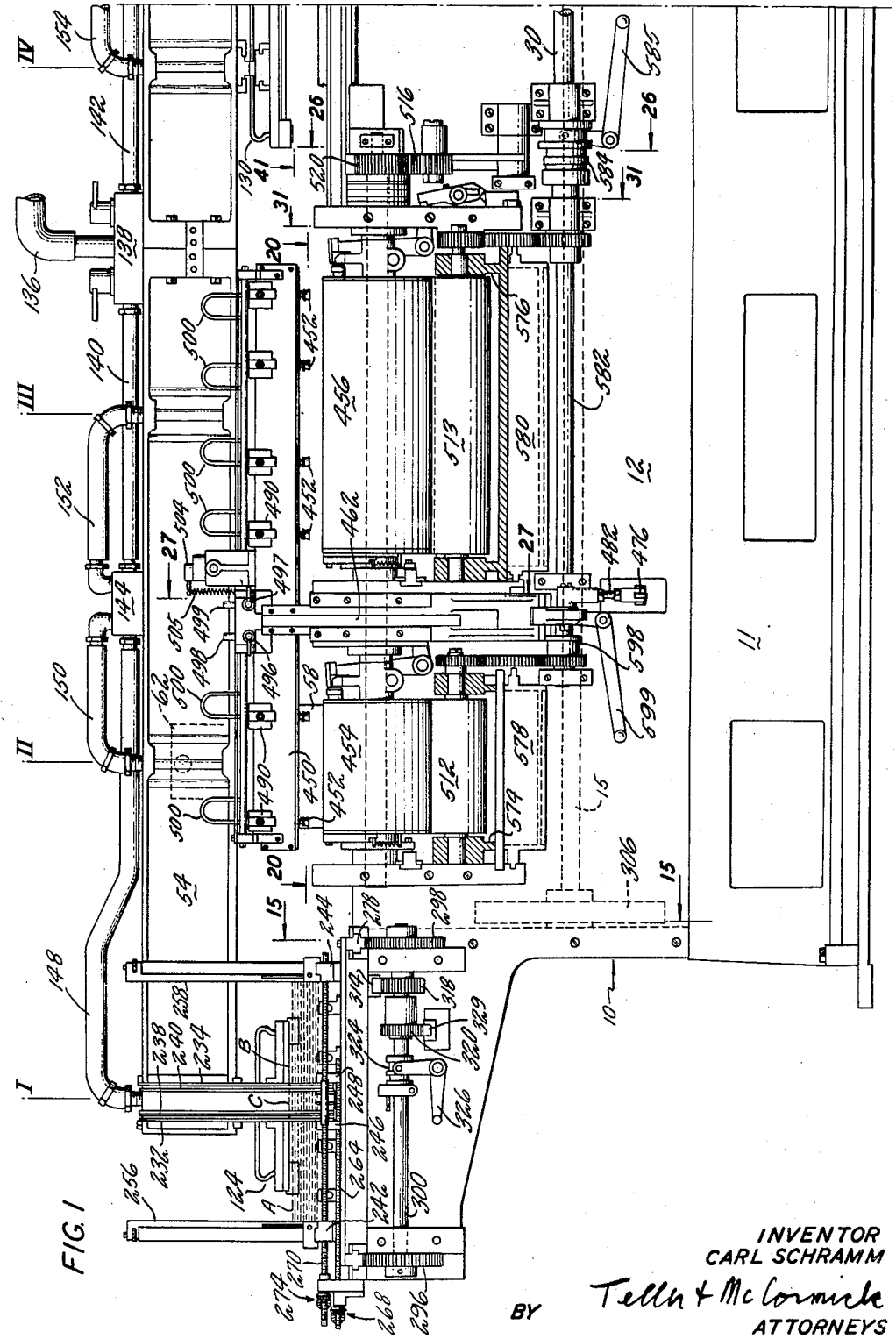

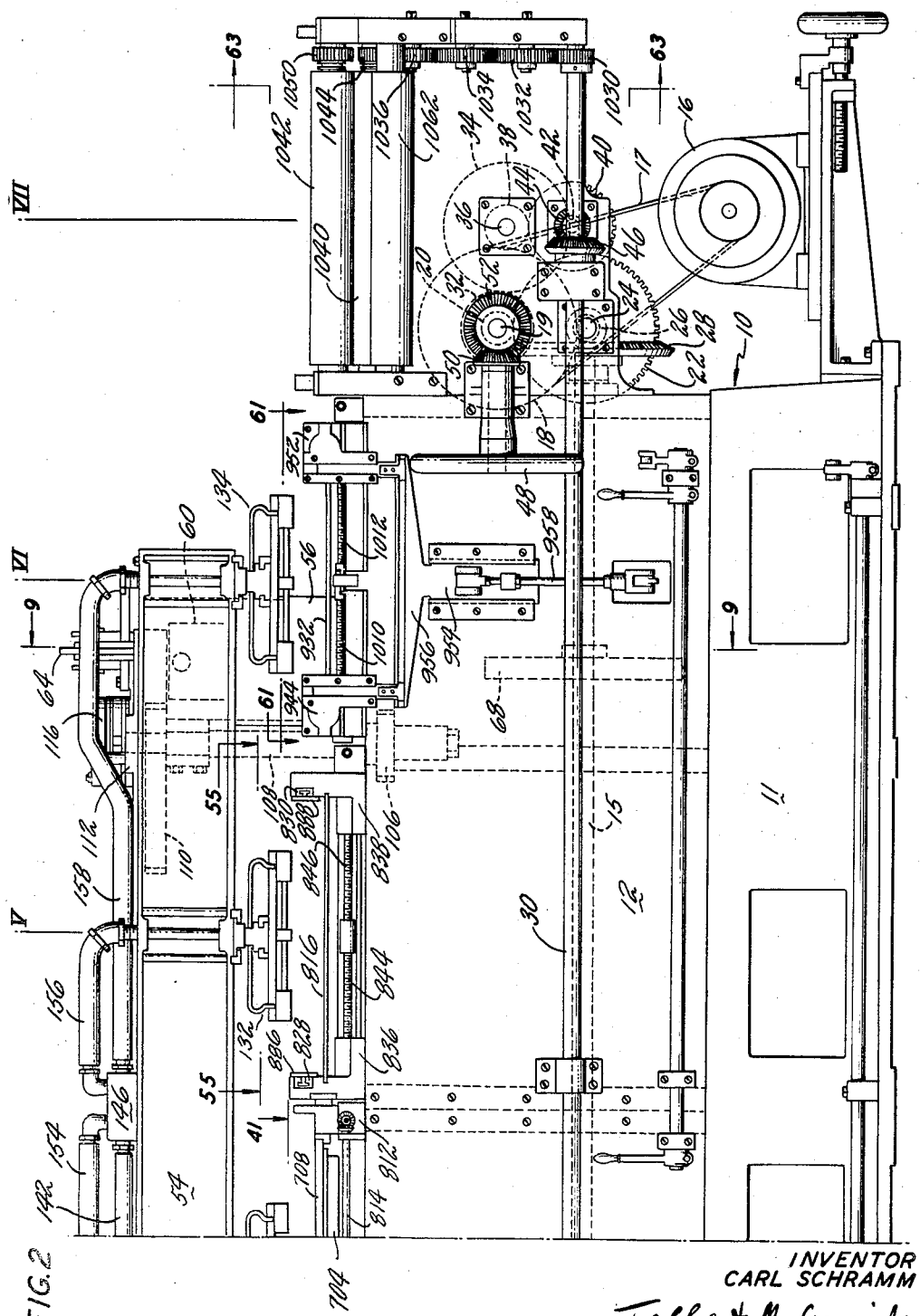

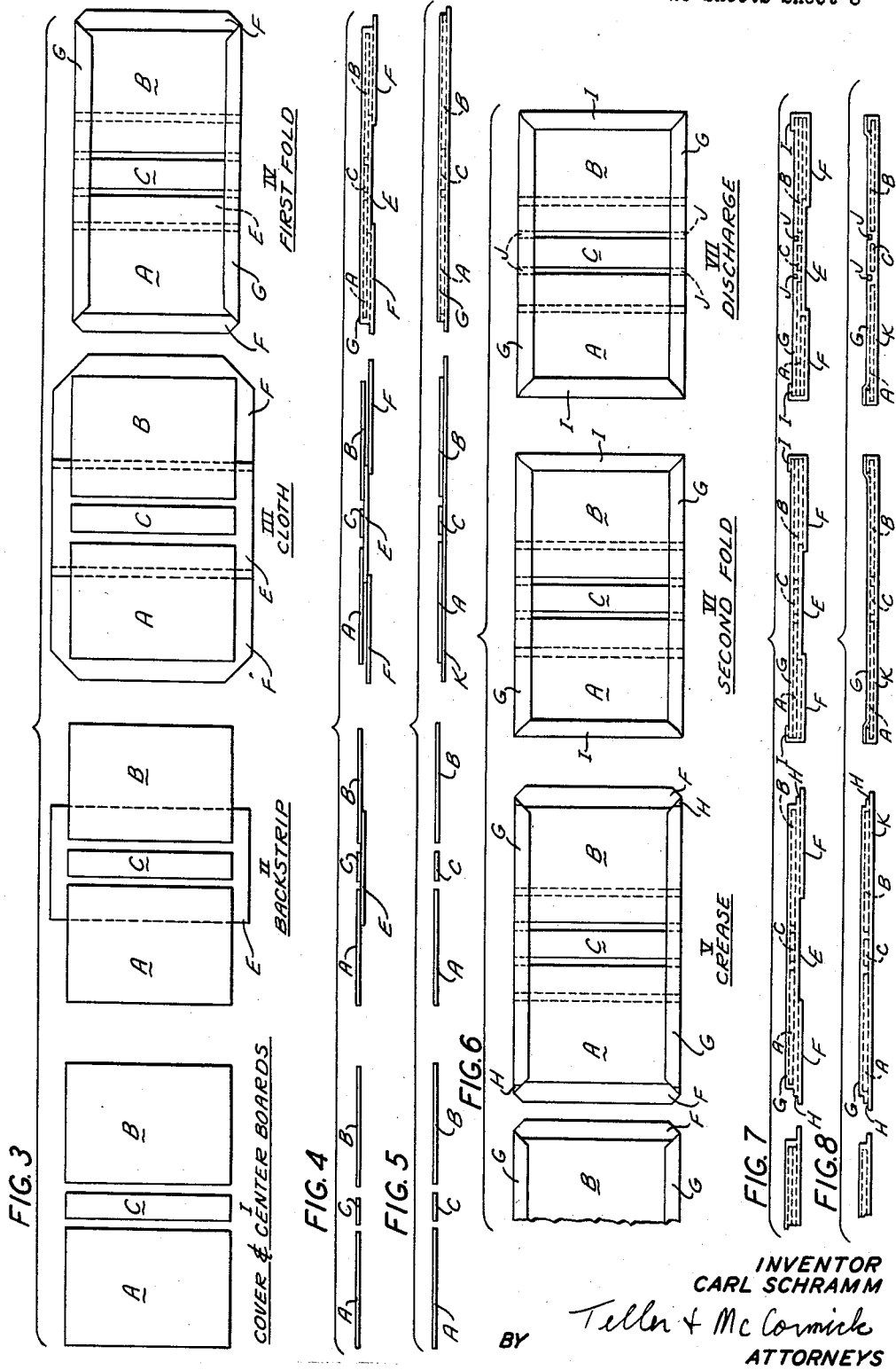

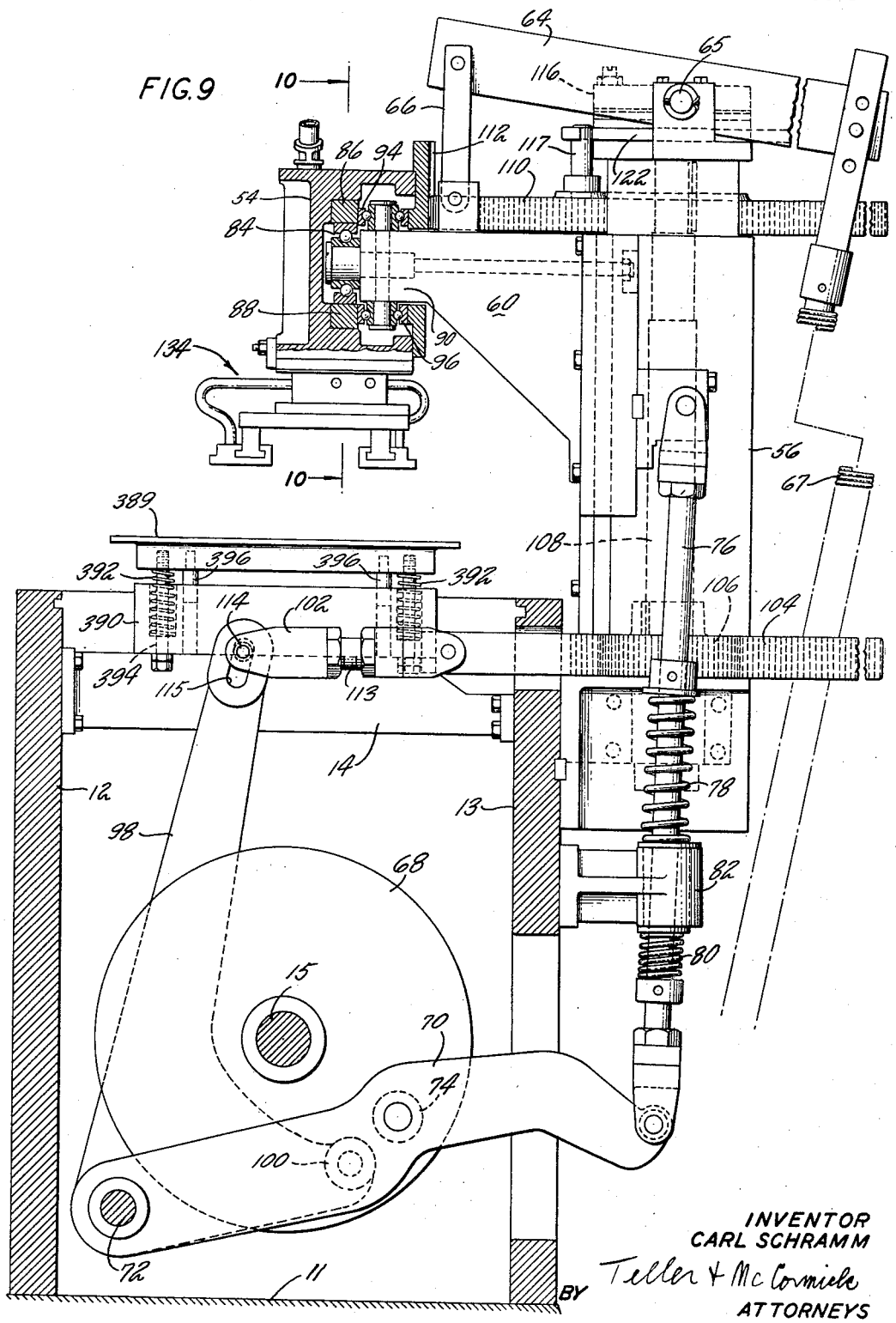

INVENTOR
CARL SCHRAMM
BY Teller & McCormick
ATTORNEYS

Feb. 23, 1960 C. SCHRAMM 2,925,612
CASE MAKING MACHINE
Filed June 23, 1958 23 Sheets-Sheet 6
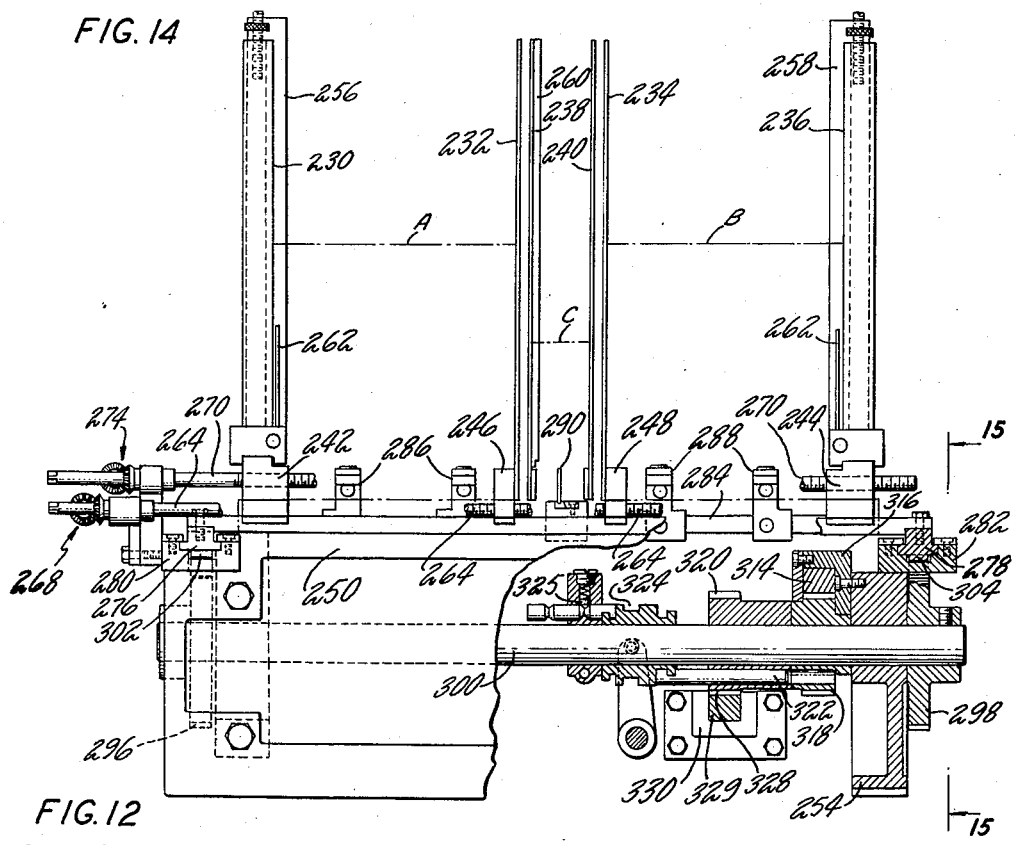
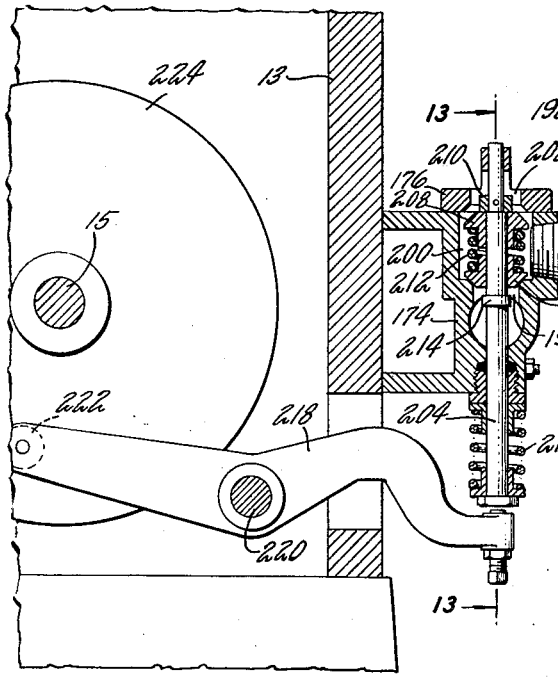
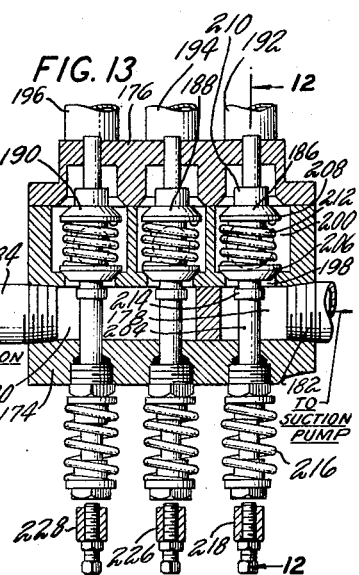
INVENTOR
CARL SCHRAMM
BY Teller & McCormick
ATTORNEYS

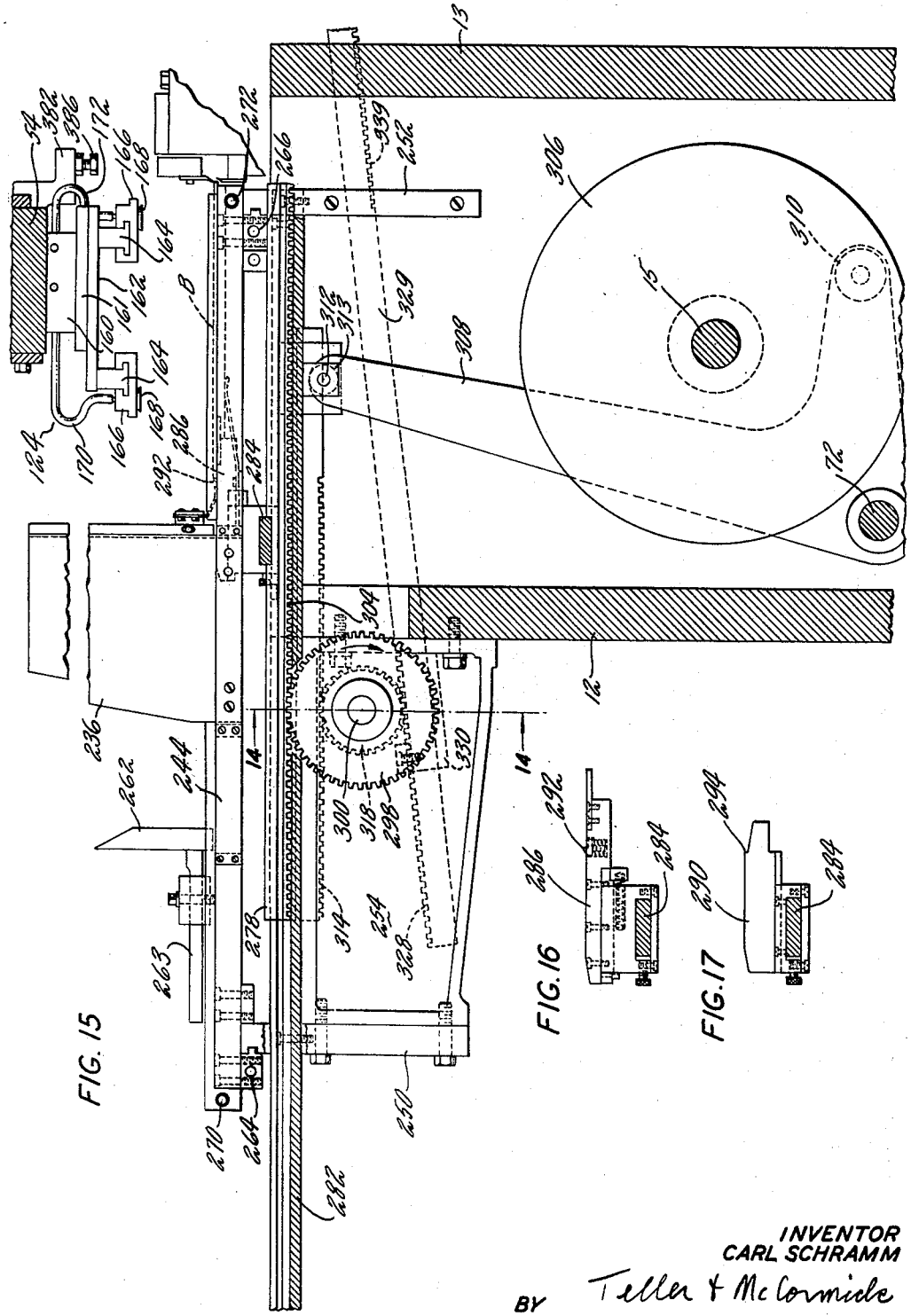

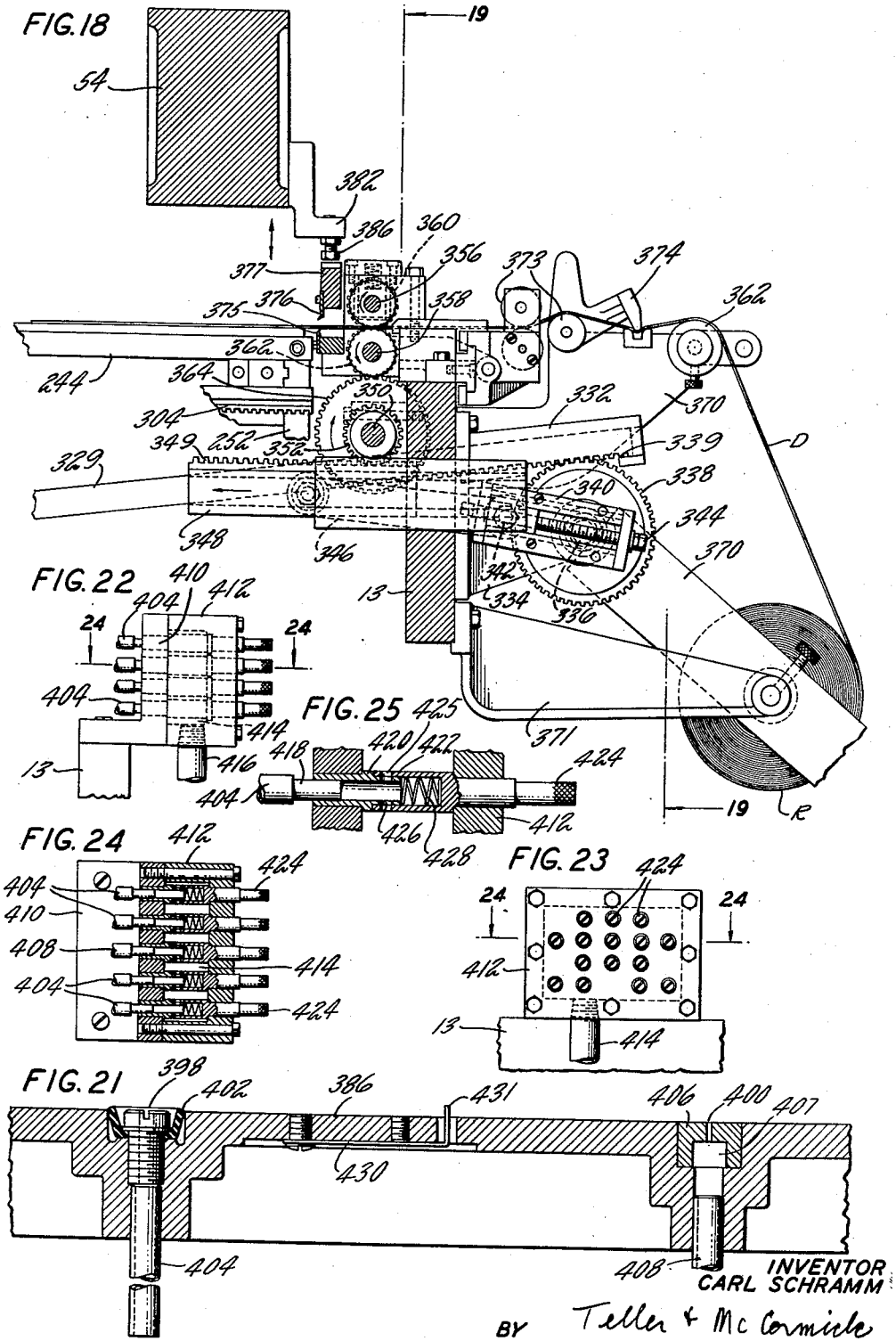

Feb. 23, 1960

C. SCHRAMM 2,925,612

CASE MAKING MACHINE

Filed June 23, 1958

INVENTOR
CARL SCHRAMM

BY Teller & McCormick

ATTORNEYS

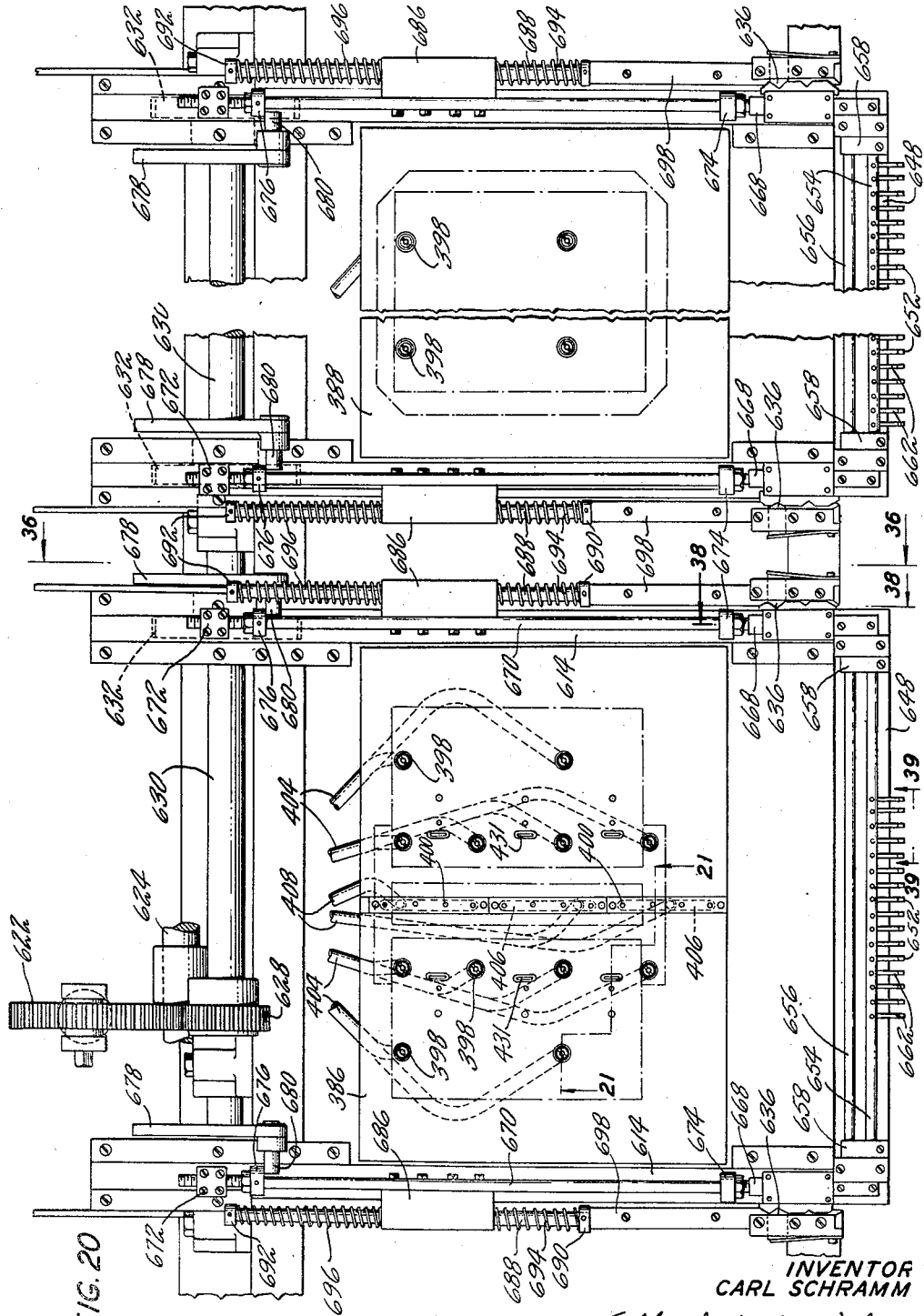

Feb. 23, 1960 C. SCHRAMM 2,925,612
CASE MAKING MACHINE
Filed June 23, 1958 23 Sheets-Sheet 11

INVENTOR
CARL SCHRAMM
BY Teller & McCormick
ATTORNEYS

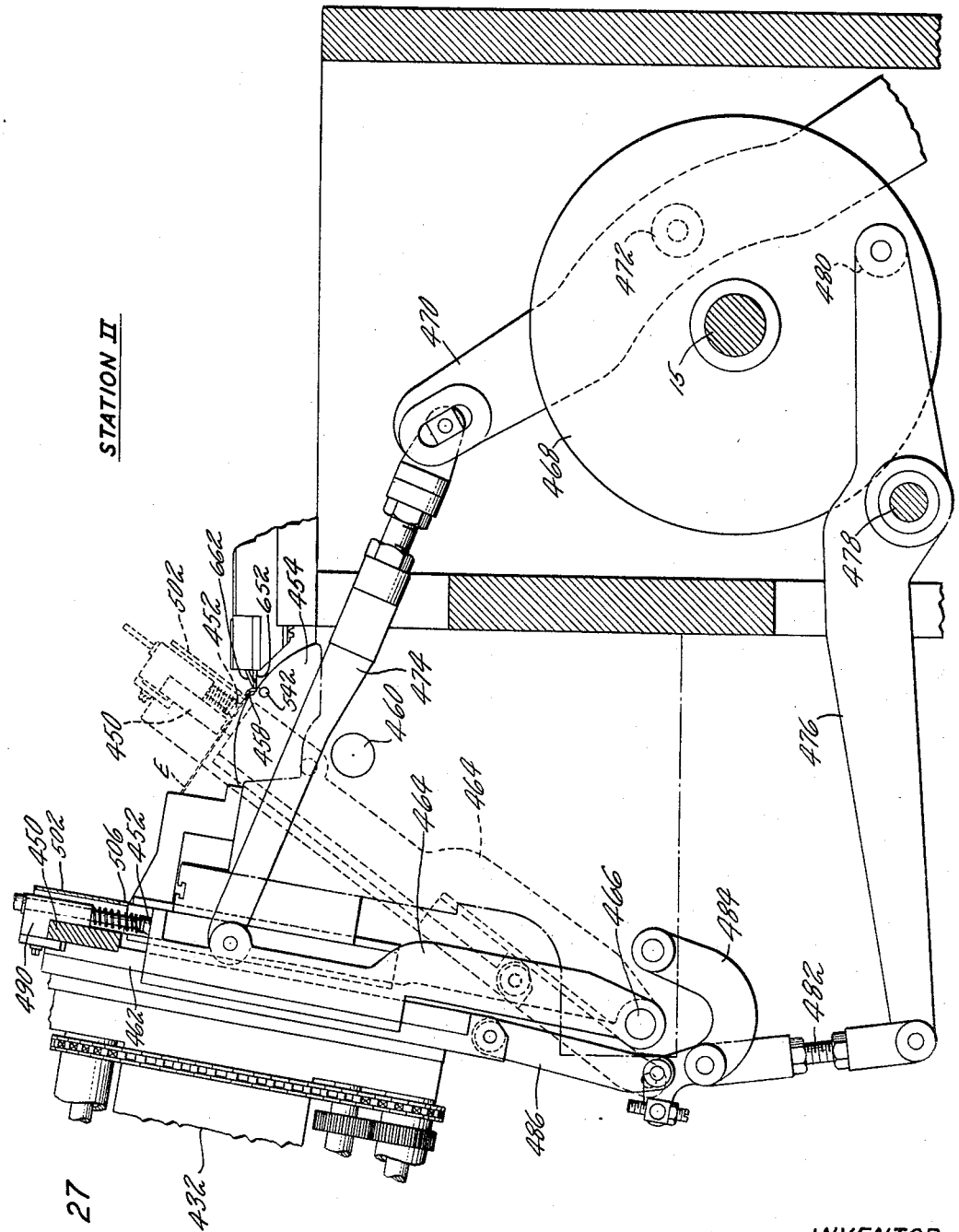

Feb. 23, 1960    C. SCHRAMM    2,925,612
CASE MAKING MACHINE

Filed June 23, 1958    23 Sheets-Sheet 13

INVENTOR
CARL SCHRAMM
BY Teller & McCormick
ATTORNEYS

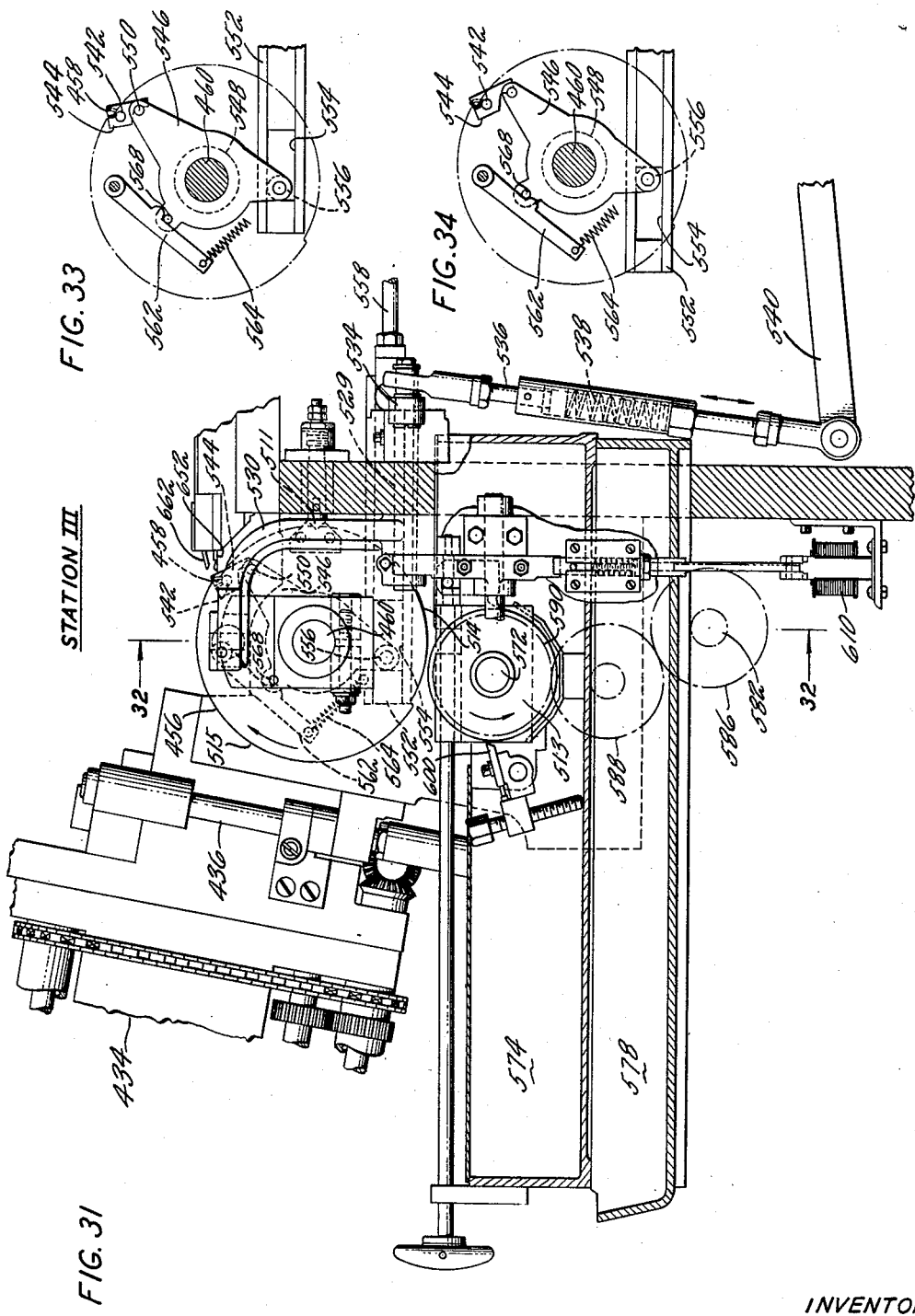

Feb. 23, 1960 C. SCHRAMM 2,925,612
CASE MAKING MACHINE
Filed June 23, 1958 23 Sheets-Sheet 15
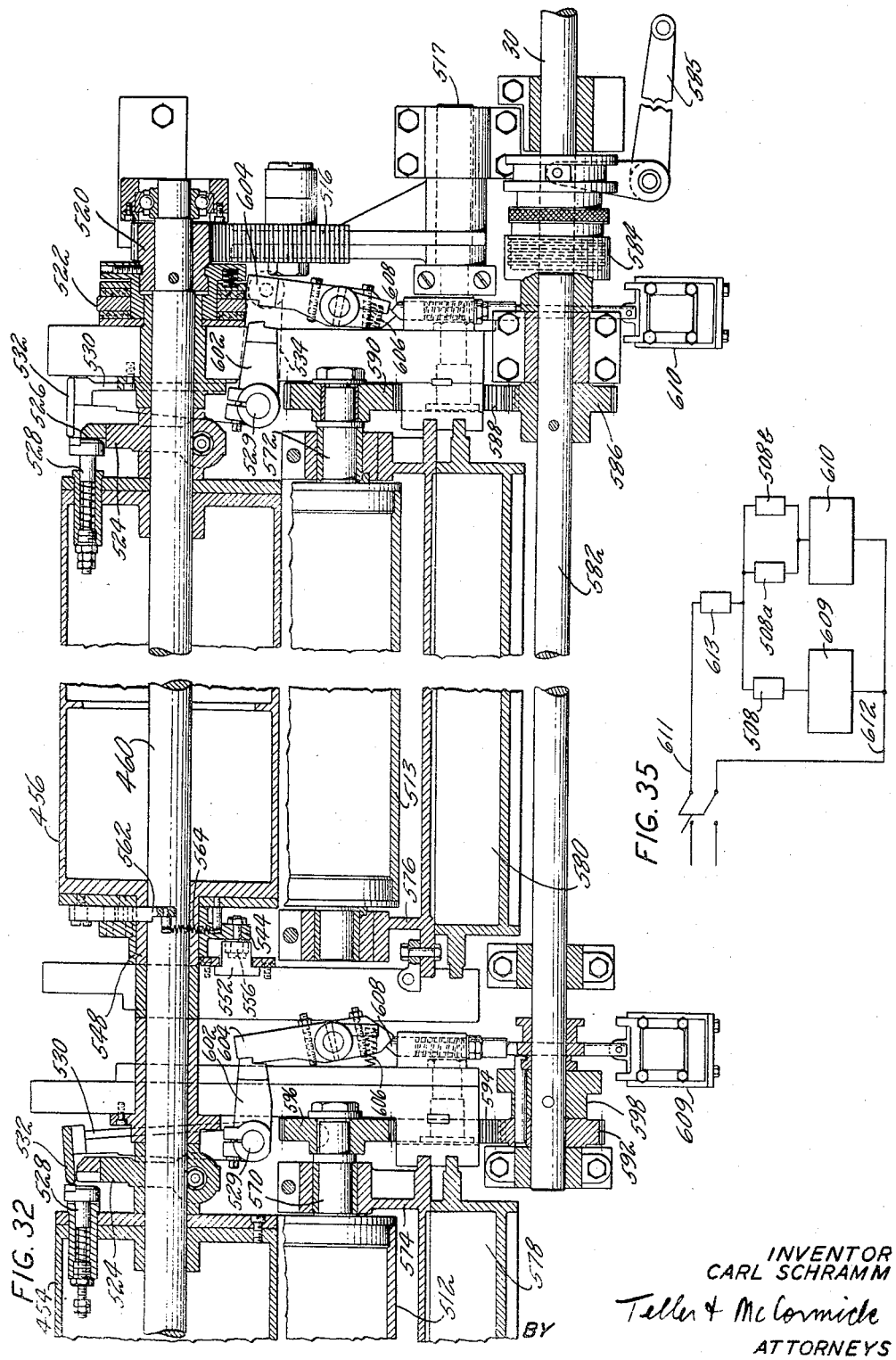
INVENTOR
CARL SCHRAMM
BY Teller & McCormick
ATTORNEYS

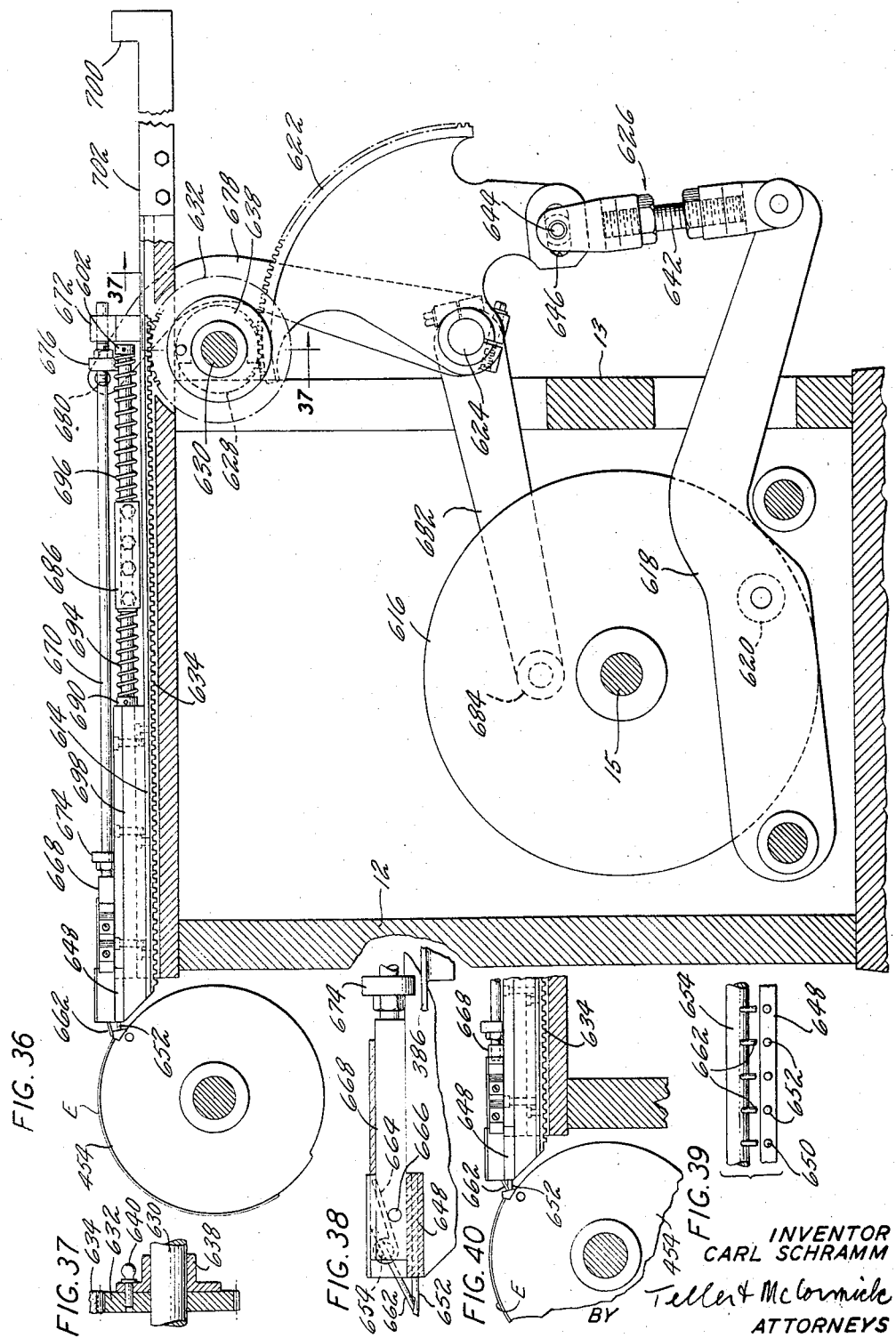

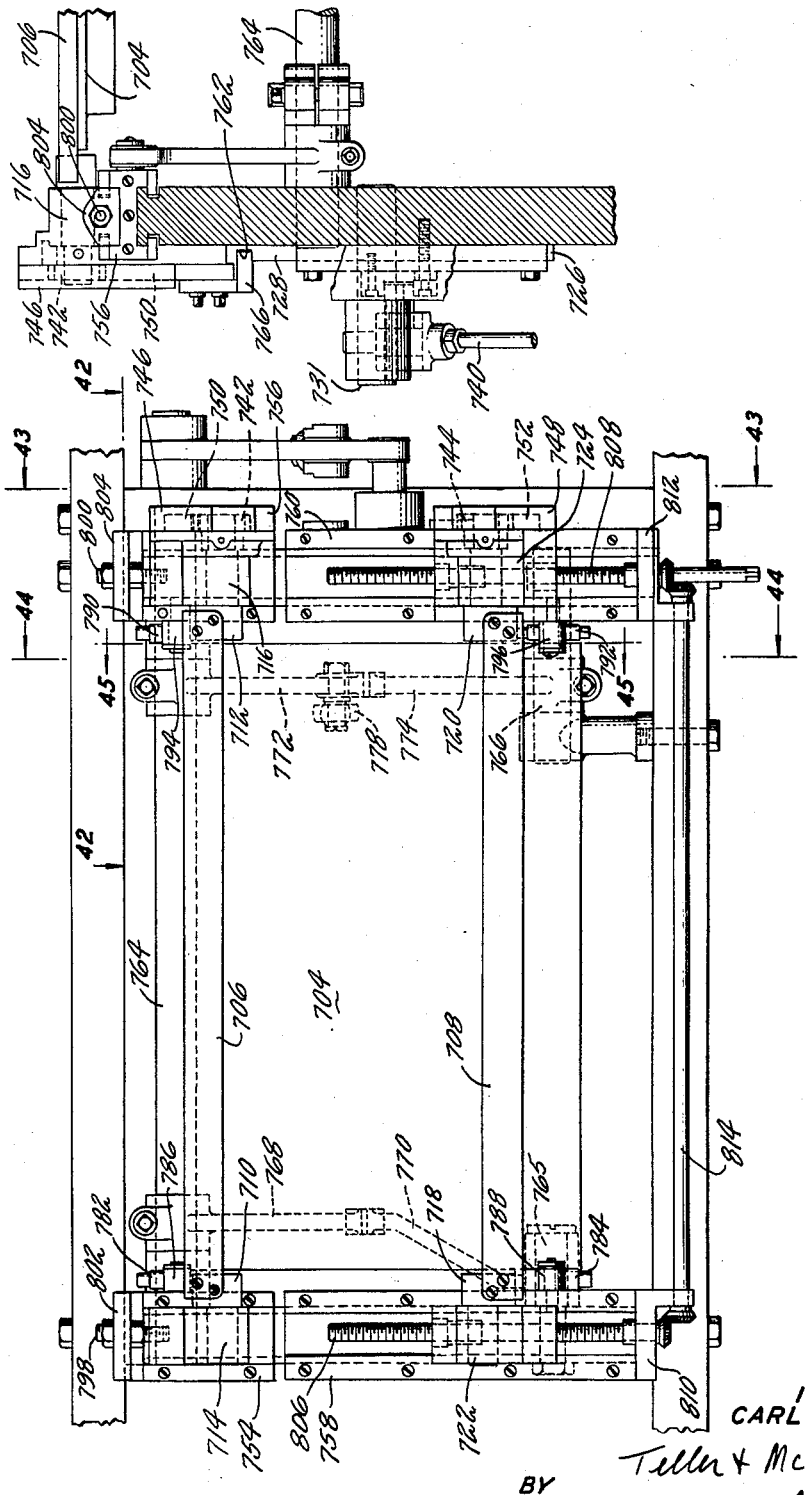

Feb. 23, 1960 C. SCHRAMM 2,925,612
CASE MAKING MACHINE
Filed June 23, 1958 23 Sheets-Sheet 18
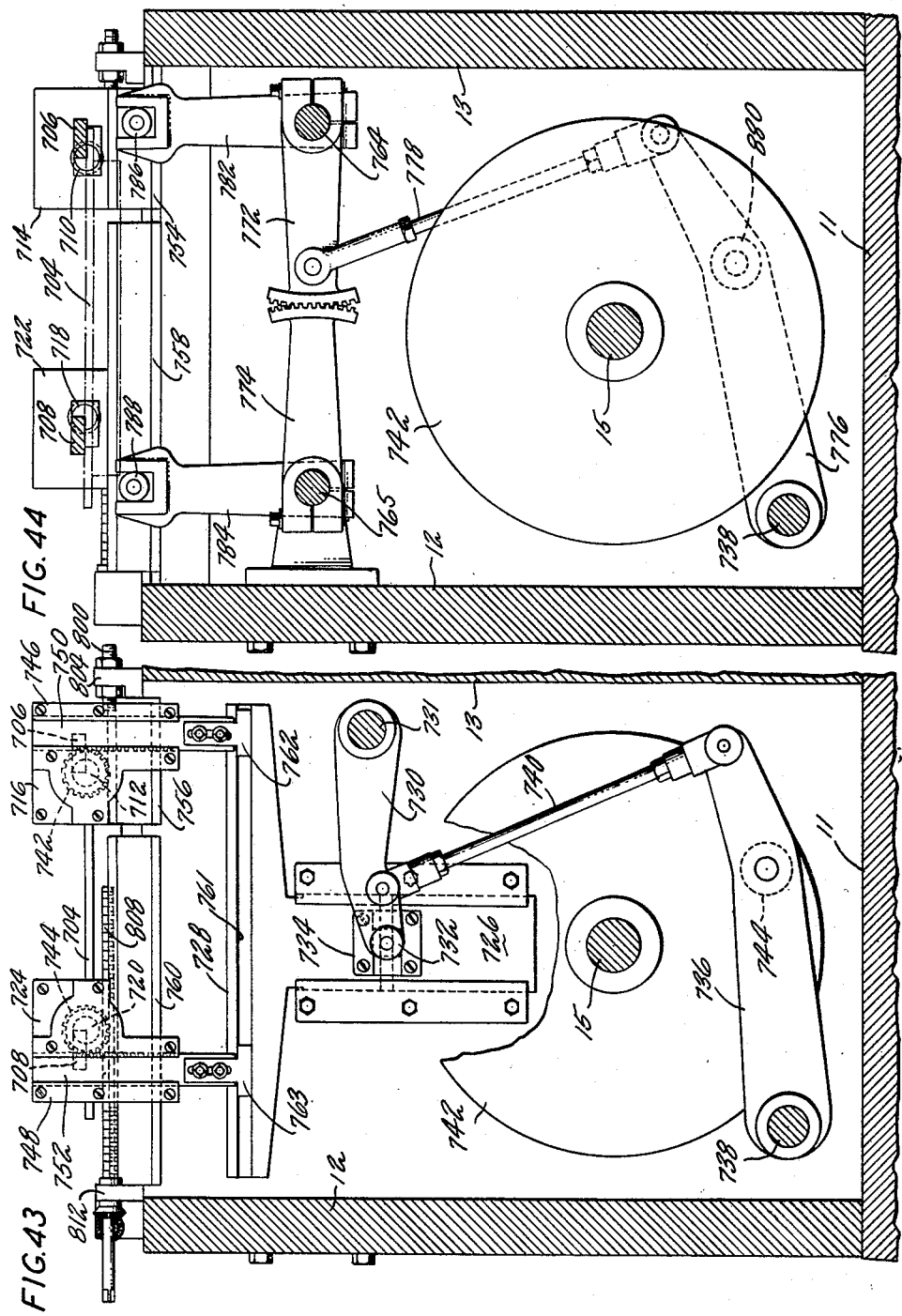
INVENTOR
CARL SCHRAMM
BY Teller & McCormick
ATTORNEYS

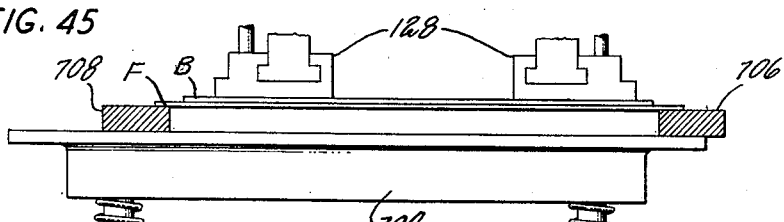
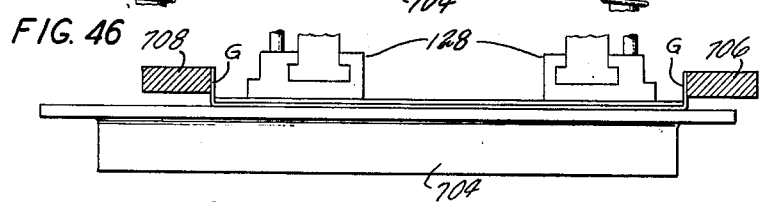
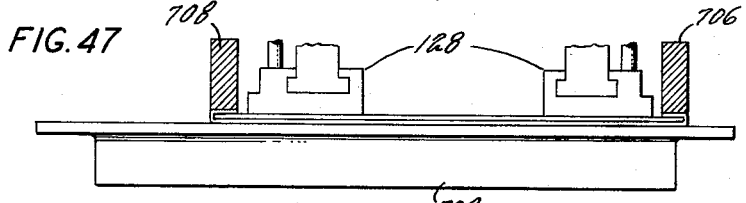
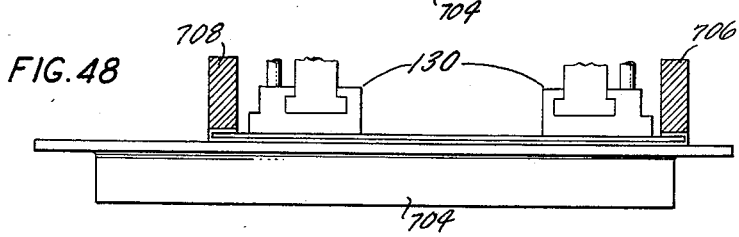
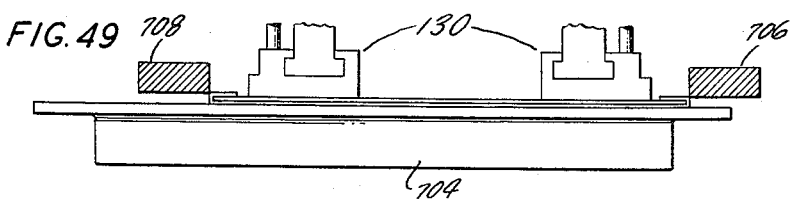
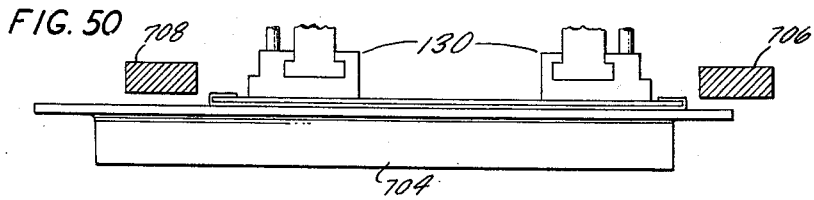

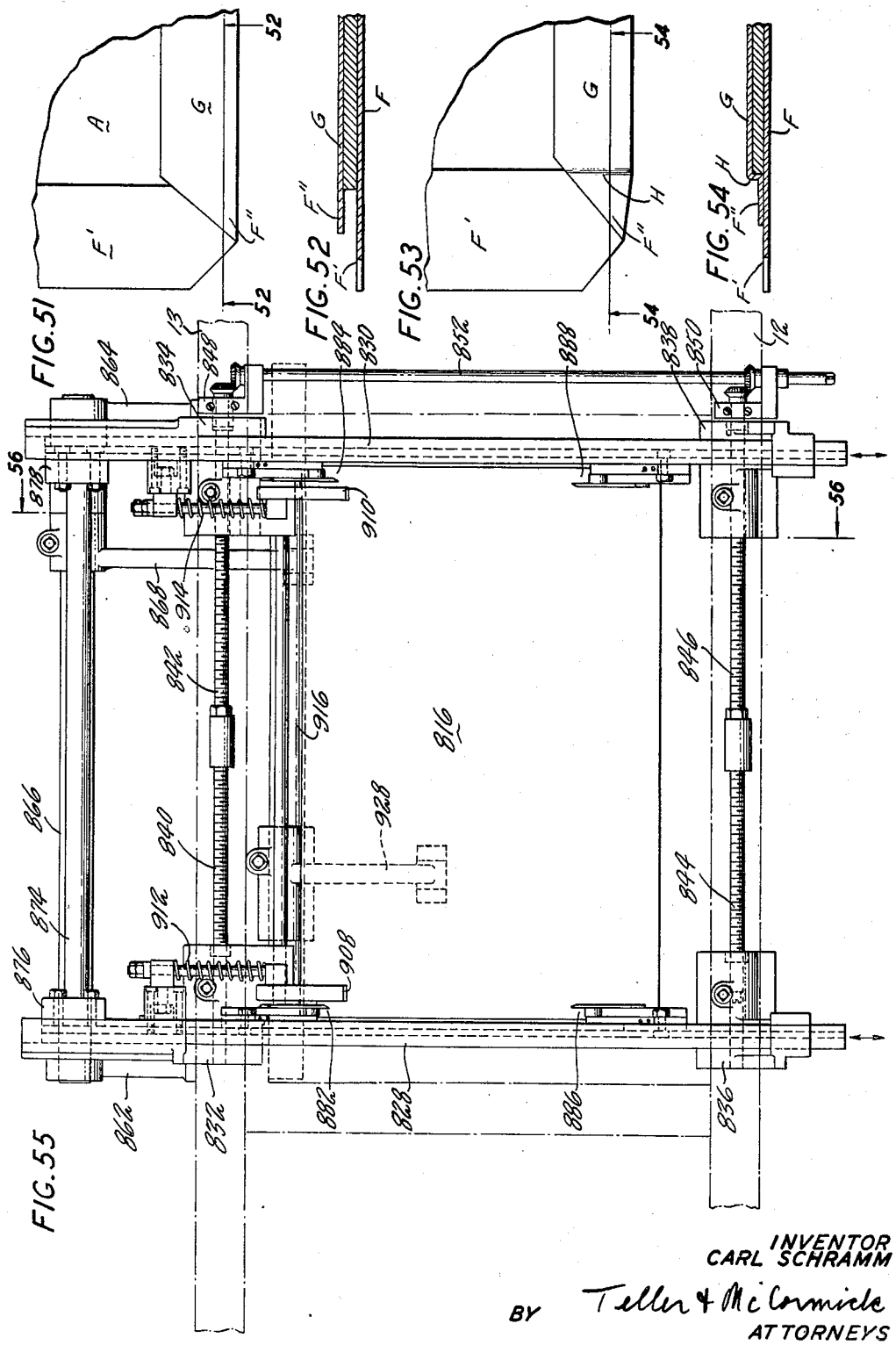

Feb. 23, 1960
C. SCHRAMM
2,925,612
CASE MAKING MACHINE
Filed June 23, 1958
23 Sheets-Sheet 21
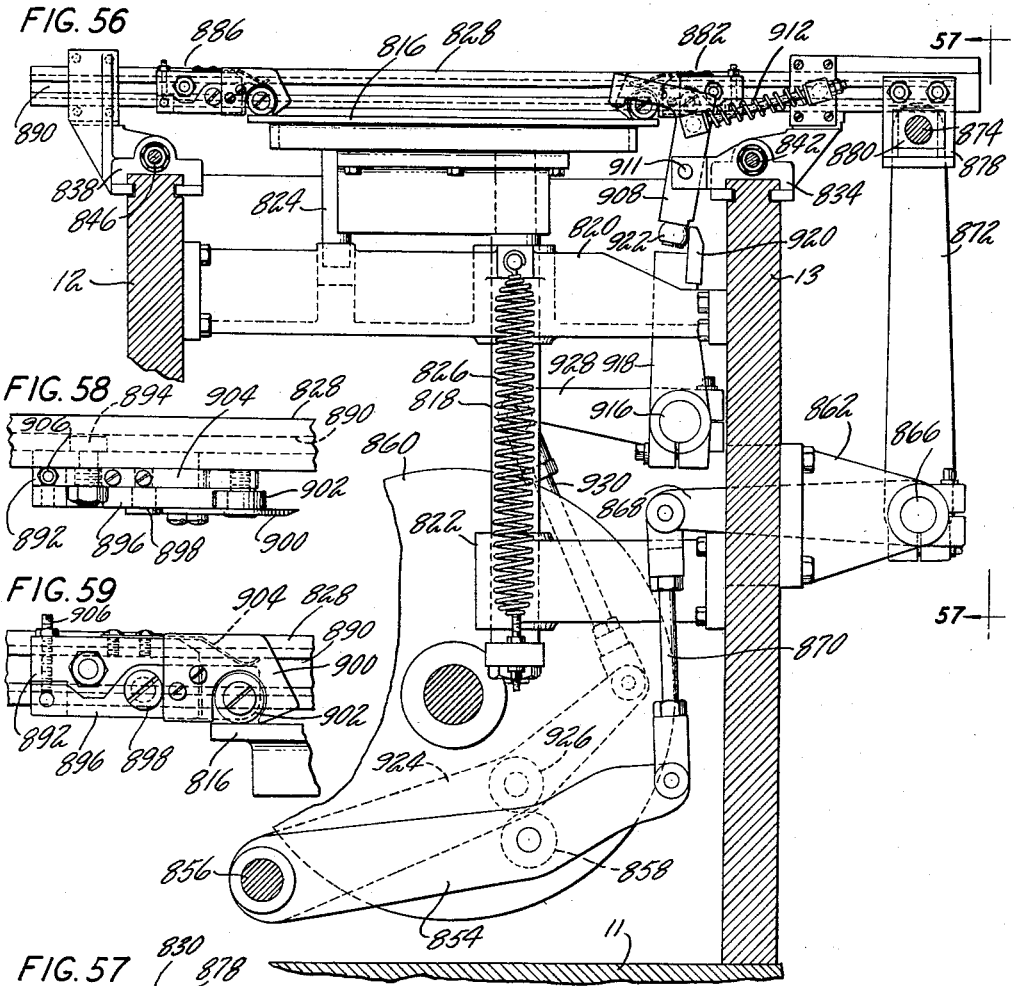
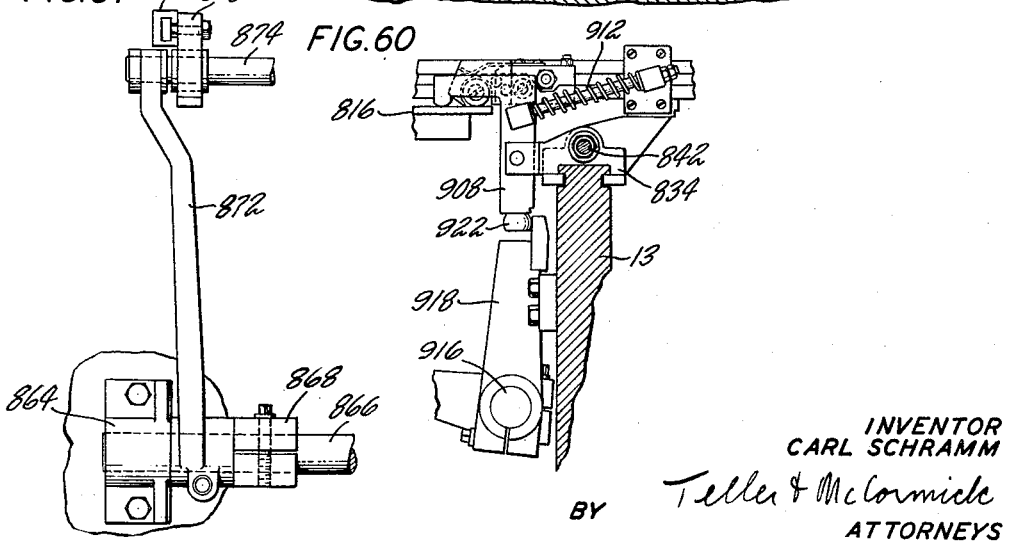
INVENTOR
CARL SCHRAMM
BY Teller & McCormick
ATTORNEYS Feb. 23, 1960

C. SCHRAMM 2,925,612

CASE MAKING MACHINE

Filed June 23, 1958

INVENTOR
CARL SCHRAMM

BY Teller & McCormick

ATTORNEYS

Feb. 23, 1960

C. SCHRAMM 2,925,612

CASE MAKING MACHINE

Filed June 23, 1958

INVENTOR
CARL SCHRAMM

BY Teller & McCormick

ATTORNEYS

United States Patent Office 2,925,612
Patented Feb. 23, 1960

2,925,612
CASE MAKING MACHINE

Carl Schramm, North Coventry, Conn., assignor to The Smyth Manufacturing Company, Hartford, Conn., a corporation of Connecticut Application June 23, 1958, Serial No. 743,713

16 Claims. (Cl. 11—2)

The invention relates to a cyclically operable machine for making covers or cases for books, and more particularly cases of the type wherein each case comprises two hard cover boards and a cover cloth glued to and folded around said cover boards. A machine of the type to which the invention relates has a sequential series of stations at which various operations are effected. The operations include the assembly of the initial several case components and the first and second folding of the cover cloth around the edges of the cover boards.

One object of the invention is to provide a case making machine of the type stated wherein there is a transfer mechanism which includes a single reciprocable member with transfer devices thereon which engage the case components at each of the several stations and which transfer said components to the next following stations and finally to a receiving position.

Another object of the invention is to provide a case making machine of the type stated having means at the initial station for the feeding of center elements of either of two types. During each cycle a center element of the selected type is placed in a predetermined spaced relationship with two hard cover boards.

Another object of the invention is to provide a case making machine of the type stated having means for assembling a backstrip and two cover cloth sections with the cover boards and center element preparatory to folding. As illustrated, there are two separate stations, one for the assembly of the backstrip with the cover boards and center element and the other for the subsequent assembly of the cover cloth sections.

Another object of the invention is to provide improved gluing means at either or both of the last said stations, which gluing means includes a rotatable cylinder for carrying the backstrip or cover cloth during gluing and which gluing means further includes automatic mechanism for preventing rotation of said cylinder in the event of any failure to feed a backstrip or cover cloth thereto.

Still another object of the invention is to provide a folding device having novel and advantageous features, which folding device is adapted to be included in the folding mechanism for first folding or for second folding or for both.

Still another more specific object of the invention is to provide means, preferably at a separate station, for pressing or creasing the partly folded cover cloth after the first folding operation so as to insure subsequent smooth folding during the second folding operation.

Other objects of the invention will be apparent from the drawings and from the following specification and claims.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

Fig. 1 is a front view of the left portion of a machine embodying the invention, certain parts being omitted for clarity which omitted parts include those at the front of the line 32—32 in Fig. 31.

Fig. 2 is a front view of the right portion of said machine embodying the invention.

Fig. 3 is a schematic plan view showing the components of a case for a book and indicating the operations performed thereon at certain stations of the machine shown in Figs. 1 and 2, these being Stations I, II, III and IV.

Fig. 4 is a front view showing the components of said case at the same stations as shown in Fig. 3.

Fig. 5 is a view similar to Fig. 4, but showing the components of an alternative case and indicating the operations performed thereon at the same stations.

Fig. 6 is a view similar to Fig. 3 and showing the same components of said case, but indicating the operations performed at other stations of the machine, these being Stations V, VI and VII.

Fig. 7 is a front view similar to Fig. 4 and showing the components of said case at the same stations as shown in Fig. 6.

Fig. 8 is a view similar to Fig. 7, but showing the components for the same alternative case as shown in Fig. 5.

Fig. 9 is an enlarged elevational and sectional view taken from the right, the sectional portion of the view being along the lines 9—9 in Figs. 2 and 10.

Fig. 12 is a fragmentary sectional view taken along the line 12—12 of Fig. 13 and showing the suction valve mechanism for controlling the suction at various portions of the machine.

Fig. 13 is a fragmentary sectional view taken along the line 13—13 of Fig. 12.

Fig. 14 is an enlarged fragmentary front elevational and sectional view at Station I as indicated on Fig. 1, certain parts at the rear being omitted and the sectional portion of the view being taken along the line 14—14 of Fig. 15.

Fig. 15 is a transverse elevational and sectional view of the parts shown in Fig. 14, the sectional portion of the view being taken along the lines 15—15 in Figs. 1 and 14, certain parts fully shown in Fig. 18 being omitted.

Fig. 16 is a fragmentary transverse sectional view showing one of the board pushers.

Fig. 17 is a fragmentary transverse sectional view showing another of the board pushers.

Fig. 18 is a transverse elevational and sectional view taken in the same plane as the lines 15—15 in Figs. 1 and 14 and showing the backlining supply mechanism at Station I.

Fig. 20 is a fragmentary plan view taken along the line 20—20 of Fig. 1, this view showing the platforms and some of the adjacent parts of the machine at Stations II and III, but omitting various other parts.

Fig. 21 is an enlarged fragmentary sectional view taken along the line 21—21 of Fig. 20.

Fig. 22 is a left end view of a suction control box for Station II.

Fig. 23 is a rear view of the control box shown in Fig. 22.

Fig. 24 is a horizontal sectional view taken along the lines 24—24 of Figs. 22 and 23.

Fig. 25 is an enlarged sectional view similar to a portion of Fig. 24 and showing one valve device.

Fig. 27 is a fragmentary transverse sectional view taken along the line 27—27 of Fig. 1 and showing the transfer mechanism for backstrips and cover cloth sections.

Fig. 31 is a fragmentary transverse sectional view taken along the line 31—31 of Fig. 1 and showing the gluing mechanism.

Fig. 32 is a fragmentary vertical sectional view taken along the line 32—32 of Fig. 31.

Fig. 33 is a fragmentary sectional view showing the operating mechanism for the grippers on the carrier cylinders.

Fig. 34 is a view similar to Fig. 33, but showing the parts in different relative positions.

Fig. 35 is a diagram of electrical connections.

Fig. 36 is a transverse sectional view taken along the line 36—36 of Fig. 20 and showing the carrier mechanism for transversely moving the backstrips and cover cloth sections.

Fig. 37 is a fragmentary vertical sectional view taken along the line 37—37 of Fig. 36.

Fig. 38 is an enlarged fragmentary transverse sectional view taken along the line 38—38 of Fig. 20.

Fig. 39 is an enlarged fragmentary front view of the carrier mechanism.

Fig. 40 is a view similar to the upper left portion of Fig. 36, but showing the parts in different relative positions.

Fig. 41 is a fragmentary plan view taken along the line 41—41 of Figs. 1 and 2, this view showing various parts at Station IV.

Fig. 42 is a fragmentary longitudinal sectional view taken along the line 42—42 of Fig. 41.

Fig. 43 is a transverse sectional view taken along the line 43—43 of Fig. 41.

Fig. 44 is a transverse sectional view taken along the line 44—44 of Fig. 41.

Fig. 45 is a fragmentary partly schematic sectional view taken along the line 45—45 of Fig. 41.

Fig. 46 is a view similar to Fig. 45, but showing the second step of folding procedure.

Fig. 47 is a view similar to Figs. 45 and 46, but showing the third step of folding procedure.

Fig. 48 is a view similar to Fig. 47, but showing the fourth step of folding procedure.

Fig. 49 is a view similar to Fig. 48, but showing the fifth step of folding procedure.

Fig. 50 is a view similar to Fig. 49, but showing the sixth or final step of folding procedure.

Fig. 51 is an enlarged fragmentary plan view of the lower left corner of a case for a book immediately following the first folding operation.

Fig. 52 is a fragmentary sectional view taken along the line 52—52 of Fig. 51.

Fig. 53 is a view similar to Fig. 51, but showing the same corner after the creasing operation.

Fig. 54 is a fragmentary sectional view taken along the line 54—54 of Fig. 53.

Fig. 55 is a fragmentary plan view taken along the line 55—55 of Fig. 2, this view showing various parts at Station V.

Fig. 56 is a transverse sectional view taken along the line 56—56 of Fig. 55.

Fig. 57 is a fragmentary rear view taken in the direction of the arrows 57, 57 in Fig. 56.

Fig. 58 is an enlarged plan view of one of the creasing devices shown in Fig. 55.

Fig. 59 is a side view of the creasing device as shown in Fig. 58.

Fig. 60 is a fragmentary view similar to a portion of Fig. 56, but showing some of the parts in different relative positions.

Sequence of operations—Figs. 1 to 8

Figs. 1 and 2 of the drawings, taken together, constitute a front elevational view of a presently preferred embodiment of a machine embodying the invention, except as to certain parts that are omitted for clarity of illustration as hereinafter explained. The machine has a sequential series of horizontally spaced stations, the distance between stations being uniform and being sometimes hereinafter referred to as the "primary distance." In the making of a case for a book, the various case components are fed to stations in one portion of the machine and are transferred by station-to-station movements to stations in another portion of the machine wherein various operations take place. As shown, the several stations of the machine are arranged in a straight line and the case components are transferred from left to right, but the invention is not necessarily so limited. The centers of the several stations at which feeding and other operations take place are designated respectively as I, II, III, IV, V, VI and VII.

Figs. 3, 4, 6 and 7 schematically show the operations at the several machine stations and more particularly show those for making cases having three-piece cloth covers. Said operations at these stations will be described.

Figure 19:
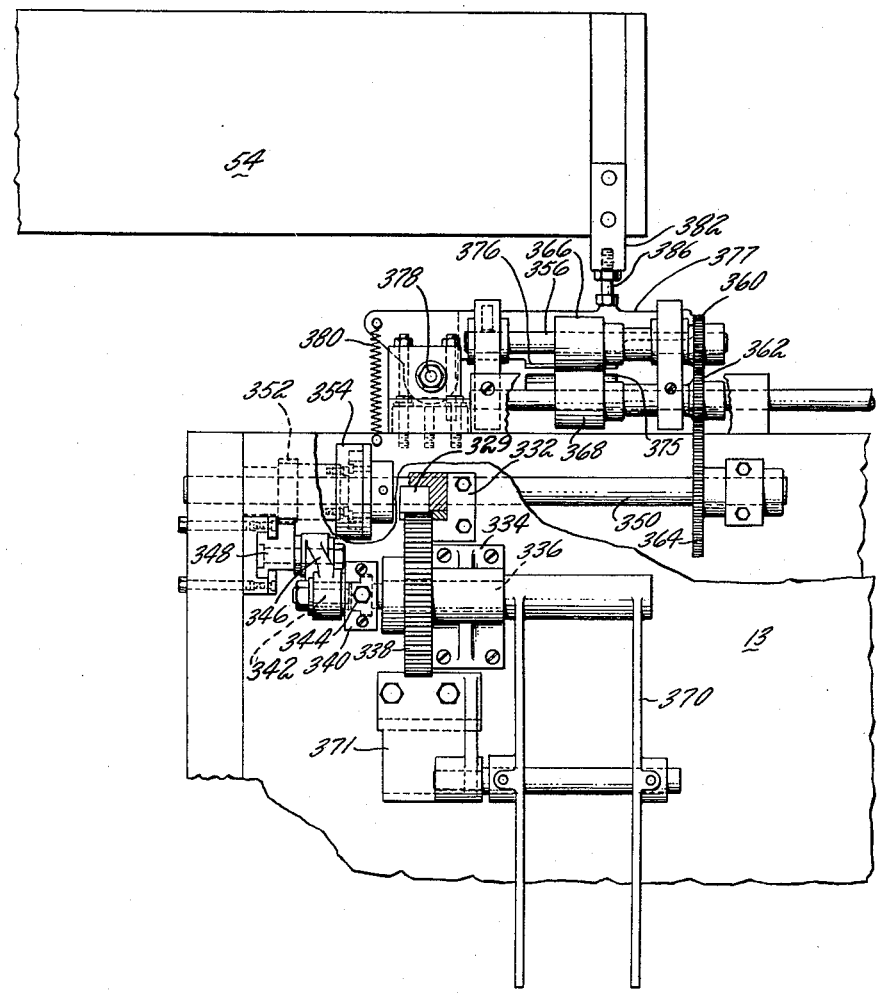
Fig. 19 is a rear view of the back lining supply mechanism taken along the line 19—19 of Fig. 18.

At Station I as shown in Figs. 3 and 4, cover boards A and B and a center element are fed transversely into a predetermined assembled relationship wherein they are in spaced relationship as shown. The center element may be a center board C or it may be a flexible backlining D. When the center element is a center board C, it is fed rearwardly in unison with the cover boards A and B from suitable magazines near the front. The flexible backlining D, when substituted, is the same size as the center board C. The backlining D is not shown in Fig. 3 but is shown in Figs. 18 and 19. The backlining, when used, is fed transversely from a roll at the rear and is cut to length. For purposes of the present brief description, it will be assumed that the center board will be used and not the backlining. Said Station I is sometimes hereinafter designated as the "board assembly station."

Station II is optional in the sense that it may be either omitted entirely or not used when the machine is to be used for making cases having one-piece cover cloths. When Station II is provided and used, a precut backstrip E which may be formed of cloth is fed transversely and is preferably fed rearwardly from a magazine or stack mechanism at the front. The term "cloth" is herein used in a generic sense and is intended to include not only cloth but also all flexible material suitable for the purpose. The backstrip is glued on its upper face before reaching the position shown. When the backstrip E is in place, the boards A, B and C are transferred from Station I without change in relative positions and are placed on the glued backstrip E. Said Station II is sometimes hereinafter designated as the backstrip assembly station."

At Station II a cover cloth is glued and is fed transversely into the position shown. The term "cover cloth" is intended to include either a single sheet or two separate sheets or sections such as the sections F, F. The cover cloth, whether in one piece or in two sections, is precut and is fed transversely to the position shown. Preferably, the cover cloth is fed rearwardly from a magazine or stack mechanism at the front. The cover cloth, whether in one piece or in sections, has beveled corners as shown, and the cover cloth is glued on its upper face before reaching the position shown. Assuming that Station II is provided, the boards A, B and C and the backstrip E are transferred from Station II to Station III without change in relative positions and are placed on the glued cover cloth or cover cloth sections F, F at said Station III. Said Station III is sometimes hereinafter designated as the "cover cloth assembly station."

At Station IV portions of the previously glued cover cloth are folded around two opposite exposed edges of the cover boards A and B. While the invention is not so limited, the folding mechanism at Station IV preferably folds the front and rear edge portions of the cover cloth rearwardly and forwardly around the front and rear edges of the cover boards A, B and C as shown at G, G in Figs. 3 and 4. Said cover cloth has been previously glued and the portions G, G therefore adhere to the cover boards. When Station II is provided and when a backstrip E has been put in place at said station, the folding mechanism that folds the front and rear portions of the cover cloth also folds the front and rear portions of the backstrip. Station IV is sometimes hereinafter designated as the "first folding station."

Station V is preferably provided for pressing or creasing the partly folded cover cloth along the eges of the cover boards A and B that remain partly exposed after the first folding at Station IV. When the first folding is at the front and rear of the cover boards, the creasing or pressing is at the side edges of said boards as indicated at H, H in Figs. 6 and 7. This pressing or creasing insures the subsequent smooth folding of end edge portions of said cover sections. Station V is sometimes hereinafter designated at the "creasing station."

At Station VI the portions of the cover cloth that were not folded at Station IV are folded around the remaining exposed edges of the cover boards A and B. When the front and rear portions of the cover cloth were folded at Station IV, as is preferrred, the right and left side portions are folded at Station VI toward the right and toward the left around the left and right edges of the boards A and B as shown at I, I in Figs. 6 and 7. The cover cloth has been previously glued and the portions I, I therefore adhere to the boards. The ends of the folded portions I, I overlap the ends of the folded portions G, G. Station VI is sometimes hereinafter designated as the "second folding station."

Station VII constitutes a receiving position for the completed cases. At this station there is preferably provided a conveyor mechanism which moves the completed cases forwardly beneath a resilient pressing roll. When the center element is a center board C, the resilient pressing roll causes the folded portions G, G to enter the grooves J, J between the boards A, C and C, B as shown in Figs. 6 and 7. The conveyor moves the completed cases additionally forwardly for discharge.

Figs. 5 and 8 are generally similar respectively to Figs. 4 and 7 and they more specifically illustrate the operations for making cases having one-piece cloth covers. For such a case, no backstrip is required, and Station II may be omitted. When said station is provided, it is idle, but the boards A, B and C are transferred from Station I to Station II as previously described and are then transferred from Station II to Station III.

At Station III, sometimes designated as the cover cloth assembly station, a single one-piece precut cover cloth K is fed transversely, and is preferably fed rearwardly from a magazine or stack mechanism at the front. Said cloth K is fed to a position shown in Fig. 5 and similar to that of the cover cloth sections F, F shown in Fig. 3, and said cover cloth K has beveled corners like those of the cover cloth sections F, F. The cover cloth K is glued on its upper face, the gluing being similar to that for the cover cloth sections F, F. When the cover cloth K is in place, the boards A, B and C are transferred from Station II to which they were previously transferred from Station I.

The folding and creasing operations for the one-piece cover cloth are similar to those for the two-piece cover cloth and a repetition of the description is unnecessary.

*General organization—Figs. 1 and 2*

Figs. 1 and 2 show the several stations of the machine are arranged in a straight line, and the machine comprises a main bed or frame 10 which is supported on a base 11. The frame 10 preferably comprises spaced vertical front and rear plates 12 and 13 as more clearly shown in Fig. 9, these plates being connected by crossbars 14. Said frame 10 directly or indirectly carries the various operative parts of the machine.

Mounted in suitable bearings in the frame 10 is a longitudinal power and cam shaft 15, preferably located about midway between the front and rear plates 12 and 13. Said shaft 15 is so driven that it makes one rotation during each machine cycle, and said shaft operates several different mechanisms, all as hereinafter described. An electric motor 16 serves to drive the shaft 15 and also other parts of the machine. The motor is connected by a belt or chain 17 with a pulley 18 on a transverse shaft 19 which carries a pinion 20. The pinion 20 meshes with a gear 22 on a transverse shaft 24. A bevel pinion 26 on the shaft 24 meshes with a bevel gear 28 on said longitudinal cam and power shaft 15.

There is also provided a longitudinal power shaft 30 which extends along the frame 10 at the front of the frame plate 12, and this shaft is also driven by the motor 16. A pinion 32 on the shaft 19 meshes with a gear 34 on a transverse shaft 36. A pinion 38 on the shaft 36 meshes with a gear 40 on a shaft 42, and this shaft carries a bevel gear 44 which meshes with a bevel gear 46 on said shaft 30.

A handwheel 48 is connectible with the shaft 19 by meshing bevel gears 50 and 52. This handwheel may be used to manually operate the machine for set-up and other purposes.

*Station-to-station transfer mechanism—Figs. 1, 2 and 9 to 11*

As before stated, the components and partial or complete assemblies for each case to be made are transferred from station to station and toward the right. A transfer mechanism is provided on the frame 10 which mechanism includes a means reciprocable in a fixed path during each cycle and adapted for substantially simultaneously engaging case components and assemblies at each of the stations and for thereupon moving the engaged components from the several stations without changes in the relationship of the components with each other. The reciprocating means is constructed and arranged to serve during each cycle for depositing the components from each of the said stations except the last at the next following stated station and for depositing the components from the last station at a suitable receiving position.

Preferably and as shown, the reciprocable means of the transfer mechanism includes a horizontal longitudinal transfer rail 54 above the several stations and includes various pickup or transfer devices on said rail. The pickup or transfer devices are hereinafter fully described. Means is provided which is automatically operable during each cycle for effecting one complete longitudinal reciprocation of the rail 54 between trailing and leading positions spaced apart by said primary distance. The several pickup or transfer devices carried by the rail 54 are all spaced apart by said primary distance and they are respectively above the several stations when the rail is in its said trailing position. Means is provided which is automatically operable during each cycle and when the rail 54 is in or near its trailing position for moving said transfer devices downwardly and then upwardly to enable them to engage and lift case components at the several stations, and the last said means is also automatically operable during each cycle and when the rail 54 is in or near its leading position for moving said transfer devices downwardly and then upwardly to enable them to deposit case components at various stations and at a receiving position, the components so deposited having been transferred from preceding stations. As shown and as hereinafter more fully described, the rail 54 may be bodily moved downwardly and upwardly to effect the stated movements of the several transfer devices.

The rail 54 is supported on the frame 10 and, more particularly on the rear plate 13 thereof, by two similar uprights 56 and 58 shown respectively in Figs. 1 and 2. Each upright carries a bracket 60 which is guided for vertical movement therealong. The bracket 60 on the upright 56 is clearly shown in Fig. 9 and a similar bracket 62 is carried by the upright 58. By means to be described, the rail 54 and the several transfer devices thereon are reciprocated horizontally relatively to the brackets 60 and 62, and by other means to be described the brackets 60 and 62 and the rail 54 and the devices thereon are reciprocated vertically. The rail and the transfer devices are shown in their upper trailing positions. The transfer mechanism is more fully shown in Figs. 9, 10 and 11.

Referring more particularly to Fig. 9, the supporting upright 56 is shown as viewed from the right, and the mechanism directly associated with said upright is also shown. For vertically reciprocating the bracket 60 along the upright 56, there is provided a transverse lever 64 which is centrally pivoted at 65 to the upright 56. By means of a link 66, the lever 64 is connected at the front with said bracket 60. A spring 67 is connected with the rear end of the lever 64 and said spring biases the lever 64 in the direction to tend to move the bracket 60 upwardly. Thus, the spring 67 serves as a counterbalance for the bracket 60 and for all parts carried thereby. Carried by the shaft 15 is a cam disc 68, and a lever 70 is pivotally mounted on the frame 10 by means of a longitudinal shaft or pivot pin 72. The pivot pin may extend lengthwise of the machine to serve as a pivot for other levers as hereinafter explained. Said lever 70 carries a roll 74 engaging a cam track, not shown, at one side of the cam disc 68 which track may be at the right side of said disc as viewed in Fig. 2. The lever 70 is connected with the lower end of a link 76, the upper end of the link being connected with said bracket 60. As the disc 68 with its track is rotated, the lever 70 is oscillated and the bracket 60 and attached parts are reciprocated vertically. Springs 78 and 80 surround the link 76 and engage a stationary bracket 82 and said springs tend to hold the parts in an intermediate position.

All of the described mechanism for vertically moving the bracket 60 is duplicated for similarly moving the similar bracket 62 on the upright 58. The two brackets are thus moved exactly in unison.

The bracket 60 carries a horizontal ball bearing 84 which is located between upper and lower longitudinal tracks 86 and 88 located within a recess in the rail 54. The bearing 84 and a similar bearing on the bracket 62 on the upright 58 support the rail and permit it to freely move longitudinally. Each of said brackets 60 and 62 has a longitudinally extending forward portion 90. For additionally guiding the rail 54, the portion 90 of each of said brackets carries two vertical ball bearings 92 and 94 at the top and a single vertical ball bearing 96 at the bottom. These vertical bearings are more clearly shown in Fig. 10 and they engage the tracks 86 and 88 and other longitudinal tracks on the rail 54 and prevent any tilting of the rail about a longitudinal axis.

The cam disc 68 has a cam track, not shown, at the side opposite the first said cam track, and a lever 98 is pivotally mounted on the frame by means of said pivot pin 72, this lever having a roll 100 engaging said opposite cam track. The lever 98 is connected by a link 102 with a rack 104 guided for transverse horizontal movement. The rack 104 meshes with a gear 106, Fig. 10, on a vertical shaft 108 mounted in suitable bearings on the upright 56. Connected with the shaft 108 is a segmental gear 110 which meshes with a longitudinal rack 112 secured to the rail 54. The gear 110 and the rack 112 are best shown in Fig. 11. As the cam disc 68 is rotated, the lever 98 is oscillated and the rack 104 is reciprocated. The rack 104 effects oscillation of the gear 106 and of the shaft 108 and of the segmental gear 110. The gear 110 effects reciprocation of the rack 112 and of the rail 54 and of all parts carried by the rail. As has been explained, the rail and the parts thereon are reciprocated vertically. The width of the rack 112, particularly at the left portion thereof, is such that it remains in mesh with the gear 110 during vertical movement.

The link 102 comprises two end portions connected by a central threaded member 113. The threaded member 113 constitutes means for adjusting the length of the link 102 so as to vary the left or trailing position of the rail 54 as shown in Fig. 1. The link 102 is connected with the lever 98 by means of a pivot pin 114 adjustable in a slot 115 in the lever. Adjustment of the pivot pin in said slot serves to vary the amplitude of reciprocation of the rail so that it may accurately conform to the said primary distance between stations.

The gear 110 is preferably connected with the shaft 108 by means of a friction clutch 116, and the gear carries two pins 117 and 118 engageable respectively with two stationary stops 120 and 121. The said stops are formed as parts of a plate 122 secured to the upright 56. These pins and stops cooperate with the friction clutch to accurately limit the extent of reciprocation of the rack and the rail.

As before stated, the rail 54 carries devices for picking up the components at the several stations and for transferring them toward the right. From Stations I, II, III, IV, V and VI the components and assemblies are transferred to the next following Stations II, III, IV, V, VI and VII. Station VII is sometimes herein referred to as constituting a "receiving position." The rail 54 and the several pickup or transfer devices are shown in their upper trailing postions. The several pickup or transfer devices are generally indicated respectively at 124, 126, 128, 130, 132 and 134.

Each of the transfer devices 124, 126, 128, 130, 132 and 134 includes suction cups and the suction to all of said cups is controlled by a main valve mechanism to be hereinafter described. A flexible hose 136 is connected with the suction valve mechanism, said hose 136 being connected with a suction box 138 carried by the rail 54 near the center thereof. The box 138 is connected by pipes 140 and 142 with suction boxes 144 and 146 also mounted on said rail 54. Pipes 148, 150 and 152 respectively connect the box 144 with the transfer devices 124, 126 and 128. Pipes 154, 156 and 158 respectively connect the box 146 with the transfer devices 130, 132 and 134.

The several transfer devices are or may be generally similar, but they differ as to the spacing of parts to meet the requirements at the several stations. Reference is made particularly to the transfer device 124 at Station I, which device is shown in Figs. 1 and 15. Rigidly secured to the transfer rail 54 is a block 160 having openings therein communicating with the corresponding suction pipe such as the pipe 148. The block 160 carries a plate 161 and a second plate 162 is carried by the plate 161. The plate 162 is transversely adjustable relatively to the plate 161, the adjusting means not being shown. The plate 162 carries two longitudinal T-bars 164, 164 and blocks 166, 166 are carried by said bars and are logitudinally adjustable. The blocks 166, 166 carry suction cups 168, 168 which are connected by means of flexible tubes 170, 172 with the suction openings in the block 160. Each block 166 with its suction cups 168, 168 constitutes a suction unit, and there may be two or more suction units on each T-bar 164. The plate 162 can be adjusted transversely and the suction units can be adjusted longitudinally for the size of the casing being made and to meet the requirements of a particular station.

The two cam tracks on the cam disc 68 are related in such manner that the horizontal and vertical movements of the rail and transfer devices are so coordinated that the rail and the transfer devices thereon are moved downwardly and then upwardly when the rail is in or near its trailing position and are again moved downwardly and then upwardly when the rail is in or near its leading position. Figs. 1 and 2 show the rail in its upper trailing position. From the last said position, the rail 54 and the transfer devices are moved downwardly to engage the said transfer devices with the components and assemblies at the several stations. As the transfer devices reach their lower positions, the before-mentioned valve mechanism is operated to connect the various suction pipes on the rail 54 with the suction pump. With said pipes so connected, the transfer devices are operatively engaged with the components and assemblies so as to be ready to lift them. Then the rail and the transfer devices with the engaged components and assemblies are moved upwardly and are moved toward the right or in the leading direction to an extent exactly equal to the before-mentioned primary distance which is the spacing between stations. The rail is thus moved to its leading position, and from this position said rail and said transfer devices are moved downwardly and the before-mentioned valve mechanism is operated to disconnect the several suction pipes from the suction pump and to thus release the components and assemblies. After this, the rail and transfer devices are moved upwardly and toward the left to the initial or trailing positions as shown in Figs. 1 and 2.

*Main suction valve mechanism*

The before-mentioned main suction valve mechanism is shown in Figs. 12 and 13. This mechanism serves to control suction for the several pickup or transfer devices 124, 126, 128, 130, 132 and 134 as previously described, and it also serves to control suction for other devices to be described.

Connected to the rear plate 13 of the machine frame is a valve housing 174 having a cover 176. A suction chamber is provided within the housing and there are preferably two suction chambers. As shown, there is a single longitudinal hole through the housing and a partition in said hole provides two suction chambers 178 and 180. These chambers are connected by pipes 182 and 184 with two separate suction pumps, not shown. By means of three similar valve devices 186, 188 and 190, the suction chamber 178 can be connected with a suction pipe 192, and the suction chamber 180 can be connected with suction pipes 194 and 196.

A description of one of the valve devices will be sufficient and reference will be made particularly to the device 186 shown in Fig. 12 and shown at the right in Fig. 13, this device being interposed between the chamber 178 and the pipe 192. It will be assumed that the pipe 192 is connected with the hose 136 and thus with the several pickup or transfer devices.

Above the suction chamber 178 in the housing 174 and communicating therewith through an opening 198 is a chamber 200 with which said pipe 192 is connected. The chamber 200 communicates with the external atmosphere through an opening 202. A vertical stem 204 extends through the housing and through the chambers 178 and 200, and closures 206 and 208 on said stem are adapted respectively to close the openings 198 and 202. The upper closure 208 is prevented from moving upwardly relatively to the stem by a fixed collar 210. The lower closure 206 is movable relatively to the stem and is biased downwardly by a spring 212 interposed between the two closures. A collar 214 on the stem limits relative downward movement of the lower closure 206. A spring 216 on the stem 204 biases said stem downwardly and tends to hold the lower closure 206 in its closed position as shown. A lever 218 is pivoted at 220 and said lever carries a roll 222 which engages a cam track, not shown, on a cam disc 224 carried by said cam shaft 15.

When the parts are in the positions shown, the lower valve closure 206 closes the opening 198 between the chambers 178 and 200. The opening 202 to the external atmosphere is open and atmospheric pressure is, therefore, maintained in the chamber 200 and in the pipe 192, and in all pipes and ducts connected therewith. The spring 216 is stronger than the spring 212 and the stem 204 and the valve closure 208 are, therefore, moved downwardly in opposition to the spring 212. When suction is required at the portion of the machine served by the pipe 192, that is, the pickup or transfer devices, the cam track on the cam 224 moves the lever 218 counterclockwise to lift the stem 204. As the stem moves upwardly, the spring 212 causes the upper closure 208 to move with it and to close the opening 202. Continued upward movement of the stem causes the collar 214 to move the closure 206 upwardly to open the opening 198 and thus connect the suction chamber 178 with the chamber 200 and with the pipe 192. The parts are so proportioned and related that the closure 208 closes the opening 202 before the closure 206 opens the opening 198. This avoids any direct connection between the suction chamber 178 and the external atmosphere. The last described connection is maintained by the cam track so long as suction is required at the corresponding portion of the machine. When suction is no longer required, the lever 218 releases the stem 204 which is moved downwardly by the spring 216 and all parts are restored to the positions shown in Figs. 12 and 13. In moving downwardly, the closure 206 closes the opening 198 before the closure 208 opens the opening 202, thus preventing any direct connection between the external atmosphere and the suction chamber 178.

Figure 29:
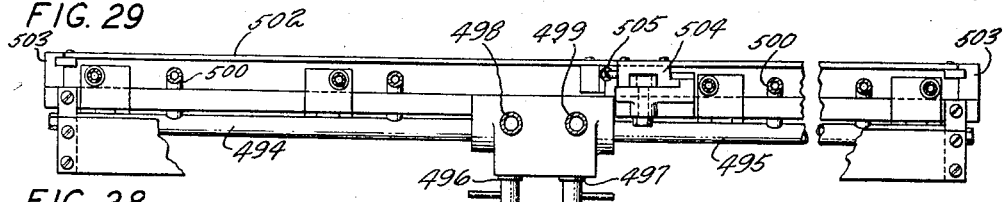
Fig. 29 is a plan view of the transfer mechanism as shown in Fig. 28.
Figure 28:
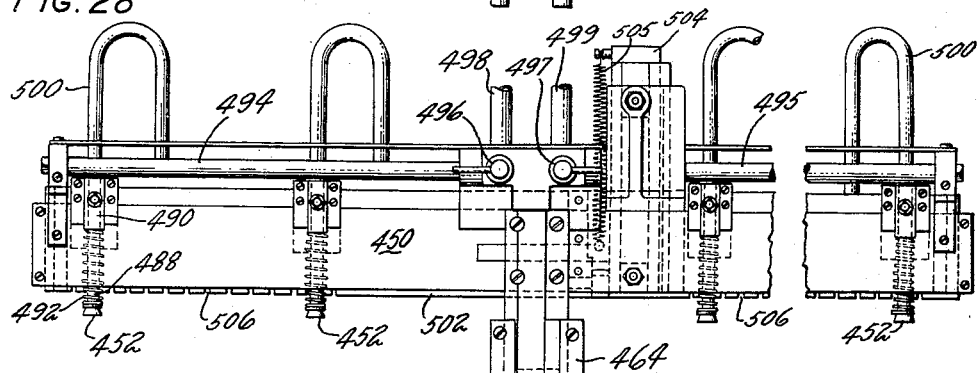
Fig. 28 is a front view of a portion of the transfer mechanism and a portion of the operating means therefor.

For operating the valve devices 188 and 190 which are similar to the described valve devices 186, levers 226 and 228 are provided which are similar to the lever 218 and which are operated by cam tracks on other cam discs similar to the cam disc 224. The valves 188 and 190 control suction in the pipes 194 and 196. Said pipe 194 may be connected with the hereinafter described suction means at the platforms for Stations II and III as shown in Fig. 20, and said pipe 194 may be connected with the hereinafter described suction elements of the transfer mechanism as shown in Figs. 28 and 29.

Station I—cover board feeding and placing mechanism—Figs. 14 to 17

At "I", the cover boards A, B and C are fed and after feeding, they are relatively positioned or placed as shown in the portion of Fig. 3 that is marked "Station I." Alternatively, the center board C may be omitted and a backlining D of the same size may be substituted, but for the immediately following description, it will be assumed that there is a center board C and not a backlining D.

Referring more particularly to Figs. 14 and 15, magazines are provided for holding stacks of boards A, B and C, such as identified in Fig. 3. As shown, there are magazine side plates 230 and 232 for the boards A, magazine side plates 234 and 236 for the boards B and magazine sides plates 238 and 240 for the boards C. The magazine plates 230 and 236 are carried respectively by transverse rails 242 and 244, the magazine plates 232 and 238 are carried by a transverse rail 246, and the magazine plates 234 and 240 are carried by a transverse rail 248. Supported on the main frame are two longitudinal plates 250 and 252 which support said transverse magazine rails. The plate 250 is supported indirectly by a bracket 254 secured to the front plate 12 of the frame.

Stacks of boards A, B and C are placed in engagement with the respective plates 230 and 232, 234 and 236, 238 and 240. Said stacks are supported at their left and right edges by the corresponding magazine rails. The plates 230, 236 and 238 carry vertical bars 256, 258 and 260 adjacent their rear edge which prevent rearward movements of said stacks. Each vertical rail is spaced at its bottom from the corresponding horizontal rail by a distance approximately equal to the thickness of a board. This permits one board at a time to be pushed rearwardly from each stack and along the rails as hereinafter explained.

Preferably, guides 262 are provided for preventing forward movements of said stacks. Each guide 262 is carried by a bar 263 on the corresponding magazine rail, and the bar 263 and the guide 262 are adjustable transversely of the machine according to the length of the boards in the stacks.

The rails 242, 244, 246 and 248 are preferably adjustable longitudinally along said plates 250 and 252. The rails 246 and 248 are adjustable by screws 264 and 266 interconnected by bevel gearing and by a transverse shaft, all of which are generally indicated at 268. The screws 264 and 266 have oppositely threaded portions for moving the rails 246 and 248 in opposite directions. The rails 242 and 244 are separately adjustable by screws 270 and 272 interconnected by bevel gearing and a transverse shaft, all of which are generally indicated at 274. The screws 270 and 272 have oppositely threaded portions for moving the rails 242 and 244 in opposite directions. By means of said screws 264 and 266 and said bevel gearing and shafts 268, the magazine rails 246 and 248 may be adjusted for the width of the center board C and the magazine rails 242 and 244 may be thereafter adjusted by means of said screws 270 and 272 and said bevel gearing and shaft 274 for the width of the boards A and B. The spacings at the sides of the center board C between it and the boards A and B are not subject to adjustment.

Two transversely reciprocable slides 276 and 278 are provided, said slides being longitudinally spaced. The slides are guided in transverse members 280 and 282 supported at least in part on the bracket 254. The slides 276 and 278 carry a logintudinal bar 284, and when the slides are reciprocated, said bar is reciprocated in a path below the level of the magazine rails. Carried by the bar 284 are pushers 286, 288 and 290 each adapted for engaging a single board at the bottom of its stack in the magazine and for pushing the engaged board rearwardly underneath the corresponding vertical rail 256, 258 or 260. As shown, there are two pushers 286 for the boards A, two pushers 288 for the boards B, and one pusher 290 for the center boards C. One of the pushers 286 or 288 is shown in detail in Fig. 16. The pusher includes a spring biased tooth 292 which is the portion that actively engages the corresponding board to move it. The pusher 290 is shown in detail in Fig. 17 and this includes a shoulder 294 which is the portion that actively engages the board C to push it.

For reciprocating the slides 276 and 278, there are provided gears 296 and 298 on a longitudinal shaft 300, said gears meshing respectively with racks 302 and 304 on the bottoms of said sides. Openings are provided in said guide members 280 and 282 to enable said gears to engage said racks.

Carried by the cam shaft 15 is a cam disc 306 and a lever 308 is pivotally mounted on said pivot shaft 72, this lever having a roll 310 engaging a cam track, not shown, on one side of said cam disc. The lever 308 has its upper end pivotally connected at 312, its upper end with a reciprocable rack bar 314 having teeth at the bottom thereof. The pivot at 312 is in a vertically movable block 313 which compensates for the arcuate movement of the pivot. The bar 314 is guided in part by a yoke 316 secured to the bracket 254. The teeth on the bar 314 mesh with a gear 318 secured to the shaft 300. When the lever 308 is moved in the clockwise direction, the rack bar 314 is moved toward the right and the gear 318 and the parts connected therewith are turned in the clockwise direction. The slides 276 and 278 are moved toward the rear, carrying the several pushers with them. As before stated, the cam shaft 15 makes one revolution for each cycle of the machine, and by means of the parts that have been described, the pushers 286, 288 and 290 are given one reciprocation during each cycle, said pushers serving to move one set of boards A, B and C rearwardly from the magazines to positions at the rear of the magazine. The bars 256, 258 and 260 are so located that the lowermost boards can be pushed rearwardly beneath them as previously explained, and said bars prevent the entire stacks from moving rearwardly. The guides 262 prevent the stacks from moving forwardly as the pushers move forwardly. In Fig. 15, the lever 308 and the slides 276, 278 and the several pushers are shown as being at or near their rearmost positions. Fig. 15 shows a board B in its proper rearward position. The three boards A, B and C are relatively positioned or placed as shown in the left portion of Fig. 3. Rabbets in the several rails 242, 244, 246 and 248 receive the edge portions of the boards and prevent any unintended movements of the boards longitudinally of the machine.

Station I—backlining feeding and placing mechanism—Figs. 14, 15, 18 and 19

It has been stated that a backlining D may be used in lieu of the centerboard C. When a backlining is to be supplied, the mechanism shown in Figs. 18 and 19 is provided for this purpose. When the backlining mechanism is provided and used, the mechanism for feeding the cover boards A and B functions exactly as described, but no center boards C are placed in the center board magazine.

Power for operating the backlining mechanism is derived from the shaft 300 shown in Fig. 14. A gear 320 is mounted on said shaft 300 adjacent the gear 318, and said gear 320 may be connected with said shaft or disconnected therefrom. The gear may be connected by means of a longitudinally movable pin 322 extending into a hole in the gear 318. The pin 322 can be moved into or out of engaging position by a yoke 324 controlled by a handle 326 on the front of the machine. A spring pressed detent 325 tends to hold the yoke 324 in either the engaging position or the disengaging position. As shown in Fig. 14, gear 320 is not connected with the shaft 300 and the backlining mechanism would be idle.

The gear 320 meshes with teeth 328 on the upper side of a rack bar 329 guided at its front portion in a bracket 330. The bar 329 with its rack teeth 328 is shown in Fig. 15, but the gear 320 which meshes with the rack teeth is not shown for the reason that it is directly behind the gear 318. The rear portion of the rack bar 329 is guided in a bracket 332 forming a part of the backlining mechanism as shown in Figs. 18 and 19.

The backlining mechanism as shown in Figs. 18 and 19 comprises the before-mentioned bracket 332 secured to the frame plate 13 and comprises another bracket 334 also secured to said frame plate. Rotatably mounted in the bracket 334 is a shaft 336 to which is secured a gear 338 meshing with teeth 339 on the lower side of said rack bar 329. Also secured to the shaft 336 is a crank 340 carrying a crank pin 342, the throw of the pin being adjustable by a screw 344. The crank pin 342 is connected by a link 346 with a slide 348 guided for transverse movement and having rack teeth 349 at the top. Said slide 348 is movable through an opening in the rear frame plate 13. Suitably mounted on said rear frame plate, but at the inner face thereof, is a bracket having a bearing for a longitudinal horizontal shaft 350. A gear 352 is connected with the shaft 350 and meshes with the rack teeth 349 on the slide 348. Said gear 352 is connected with the shaft 350 by a unidirectional clutch 354 which rotates the shaft in the clockwise direction only, as viewed in Fig. 18.

Suitably mounted above the shaft 350 are parallel rotatable shafts 356 and 358 which are connected by meshing gears 360 and 362. A gear 364 on the shaft 350 meshes with the gear 362, so that the shafts 356 and 358 are rotated respectively in the clockwise and counter-clockwise directions whenever the shaft 350 is rotated in the clockwise direction.

The shafts 356 and 358 carry opposed rolls 366 and 368 which are adapted to engage and feed a strip of backlining material toward the left or forwardly to provide the required backlining strip D. The material is supplied to the machine in the form of a coil R carried by a frame 370 on a bracket 371. The backlining strip is guided to the rolls 366 and 368 by an idler pulley 362 together with suitable rollers 373. A weighted lever 374 provides friction to maintain tension.

For cutting off backlining strips of the required length, there is provided a stationary lower knife 375 and a movable upper knife 376 carried by an arm 377 pivoted at 378. A spring 380 upwardly biases the arm 377 and the knife 376. Secured to the transfer rail 54 is a lug 382 carrying a screw 386 which serves upon downward movement of the rail to engage the arm 377 to move it and the knife 376 downwardly to cut off the strip.

Figs. 18 and 19 show the parts in the positions that they occupy at the conclusion of a feeding operation and immediately prior to downward movement of the rail 54. The feeding of the backlining strip D has taken place simultaneously with the feeding of the cover boards A and B. The rack bar 329 has been moved forwardly by the gear 314 simultaneously with the rearward movement of cover boards A and B. The rack bar 329 in moving forwardly has rotated the gear 338 in the counter-clockwise direction and the crank pin 342 and the slide or rack 348 have been moved forwardly. Forward movement of the rack 348 has rotated the gear 352 in the clockwise direction, and the clutch 354 has rotated the shaft 350 in the clockwise direction. Rotation of the shaft in the clockwise direction has rotated the rolls 366 and 368 in their feeding direction and a strip D of proper length has been fed. As soon as the rail 54 and the transfer devices thereon start to move downwardly to their engaging position, the knife 375 is actuated to cut off the fed strip. The length of the fed strip can be changed by adjusting the throw of the crank pin 342 by means of the screw 344.

*General summary as to backstrip and cover cloth assembly*

When the machine is used for making cases having a backstrip and having two separate cover cloth sections, there is provided a means, as hereinafter described in detail, which is operable in timed relation with the operation of the transfer mechanism and which serves for gluing two cover cloth sections on the upper faces thereof and for placing the glued cloth sections at the cloth assembly station in longitudinally spaced relationship with each other and in register longitudinally with the cover boards and center element at said board assembly station. There is also provided a means, as hereinafter described in detail, which is adjacent said cloth assembly station and which is operable in timed relation with the operation of the transfer mechanism and which serves for gluing a backstrip on the upper face thereof and for placing the glued backstrip in register longitudinally with the cover boards and center element at said board assembly station. There is also provided a means which is adjacent said cloth assembly station and which is operable in time relation with the operation of the transfer mechanism for effecting relative longitudinal movement between the glued backstrip and the glued cover cloth sections to cause overlapping of the outer edge portions of said backstrip with the inner edge portions of the cover cloth sections, said backstrip and cover cloth sections after said relative longitudinal movement being located at said cloth assembly station and being engageable with the cover boards and center element transferred from said board assembly station to said cover assembly station. As shown and as hereinafter described, said means for gluing and placing the backstrip is at a separate backstrip assembly station and said means for effecting relative longitudinal movement to cause overlapping is the transfer device 126 which is a part of the main transfer mechainsm. It will be understood that the invention in its broader aspects is not limited to a separate backstrip assembly station.

*Stations II and III—platforms and pneumatic retaining means for backstrip and cover cloth sections—Figs. 9 and 20 to 25*

Referring particularly to Fig. 20, a platform 386 is provided at Station II for receiving the casing parts A, B, C (or D) and E as shown at II in Fig. 3. At this station, a precut backstrip E is glued on its upper face and is placed on said platform 386 by means to be described, and then the cover boards A and B and the center element C or D are transferred by the pickup or transfer device 124 from Station I to said platform 386 and onto said glued backstrip E at Station II.

A platform 388 generally similar to the platform 386 is provided at Station III for receiving the casing parts A, B, C (or D), E and F, F as shown at III in Fig. 3. At this station, two precut cover cloth sections F, F are glued on their upper faces and are placed on said platform 388 by means to be described, and then the parts A, B, C (or D) and E are transferred by the pickup or transfer device 126 from the platform 386 to said platform 388 and onto said glued cover cloth sections F, F.

Each of the platforms 386 and 388 is yieldably supported at a normally fixed level, but it may be moved downwardly to a limited extent in opposition to spring pressure. The yieldable supporting means for the platforms are not shown in Fig. 20, but the similar supporting means for a similar platform 389 at Station VI is shown in Fig. 9. Located below the platform 389 is a supporting member 390 fixedly supported on the main frame. The member 390 is recessed to receive compression springs 392, 392 which press upwardly against the platform, four such springs preferably being provided. Bolts 394, 394 have threaded engagement with the platform and they extend through the springs 392, 392 and through holes in the member 390. Heads on these bolts 394, 394 definitely limit upward movement of the platform 389. Two or more dowel pins 396, 396 are secured to the platform 389 and enter holes in the member 390, these pins serving to guide the platform for vertical movement.

When the stated casing parts have been placed on the platform 386 or on the platform 388, it is important that said parts be held and prevented from any horizontal movement either relatively to each other or as a group relatively to the platform. To this end, each platform is provided with a plurality of suction holes, such holes and related parts being shown and described with particular reference to platform 386. The suction holes are of two types and are designated respectively as 398, 398 and 400, 400. The suction holes 398, 398 are variously distributed over the platform area, but said holes 400, 400 are arranged in a central transverse line. Some of the details of said suction holes are shown in Fig. 21. Each suction hole 398 has a flexible suction cup 402 therein connected with a flexible suction pipe, such as the pipe 404. Each suction hole 400 is preferably in a transverse metallic strip 406 in a groove in the platform. As shown in Figs. 20 and 21, there are three separate strips 406 and each of them has a groove 407 in its bottom with which a plurality of said holes 400 communicate. Each groove 407 is connected with a flexible suction pipe, such as the pipe 408.

A valve mechanism for controlling the suction holes 398 and 400 is shown in Figs. 22 to 25. This mechanism includes a bracket 410 mounted on the machine frame, and this bracket serves as a support and as a cover for a valve casing 412. A suction chamber 414 is provided within the casing 412, and a pipe 416 connects the chamber 412 with the suction pipe 194 as shown in Fig. 13.

The valve mechanism includes a plurality of valves, one valve being provided for each suction hole 398 and for each group of suction holes 400. Each valve has a nipple 418 to which is connected one of the flexible suction pipes 404 and 408. As more clearly shown in Fig. 25, each valve mechanism includes a valve member 420 connected with the corresponding said nipple 418 and projecting through the bracket 410 and into the chamber 414. Surrounding each member 420 is a sleeve 422 having a knob 424 which projects from the casing 412. The sleeve 422 and the member 420 have holes 425 and 426 which may be in register to provide communication between the chamber 414 and the corresponding flexible pipe. By means of the knob, the sleeve 422 may be turned to bring said holes 425 and 426 into or out of register and to thus connect the corresponding flexible pipe with the suction chamber 412 or to disconnect it therefrom. A spring 428 provides friction to hold the sleeve 422 in adjusted position.

The pattern of the arrangement of the knobs 424, as shown in Fig. 23, conforms generally to that of the suction holes 398 and 400 in the platform 386. Thus, in setting up the machine, one or more of the knobs 424 may be turned to deactivate any of the suction holes 398 or any groups of the suction holes 400 that are not required for the casing parts to be handled.

The suction holes for the platform 388 at Station III are not fully shown, but said holes are arranged in a pattern generally similar to that for the platform 386. It will be understood that the valve mechanism as described for the platform 386 at Station II is substantially duplicated for the platform 388 at Station III, except that a larger number of valves may be provided. Both valve mechanisms are connected with such pipe 194 of the valve mechanism 188 shown in Figs. 12 and 13.

The valve mechanism 188 is actuated by the lever 226 in timed relation with the action of the hereinafter described backstrip and cover cloth section supply and transfer mechanisms and with the action of the transfer devices, more particularly, the transfer devices 124 and 126. Prior to the delivery of the backstrip E and the cover cloth sections F, F to the platforms 386 and 388 and prior to the transfer to said platforms of parts from the preceding stations, the valve mechanism 188 serves to connect the several activated suction holes in said platforms with the suction so as to retain the several casing parts in fixed positions on said platforms. Before said parts are to be transferred from Stations II and III to the next following stations, said valve mechanism 188 acts to disconnect said holes from the suction so as to release said parts.

Preferably, in order to facilitate the release of casing parts from the platforms 386 and 388, each of said platforms is provided with pusher springs 430, 430 as shown in Figs. 20 and 21. Each spring 430 is attached to the bottom of the platform, and it has an upturned end 431 that projects through a slot in the platform. The ends 431, 431 of the several springs tend to move above the level of the platform and they thus serve to assist in the initial upward movement of the casing parts when engaged by the transfer device.

*Stations II and III—Supply and Shift mechanisms for backstrips and cover sections—Figs. 1 and 26 to 31*

Figure 26:
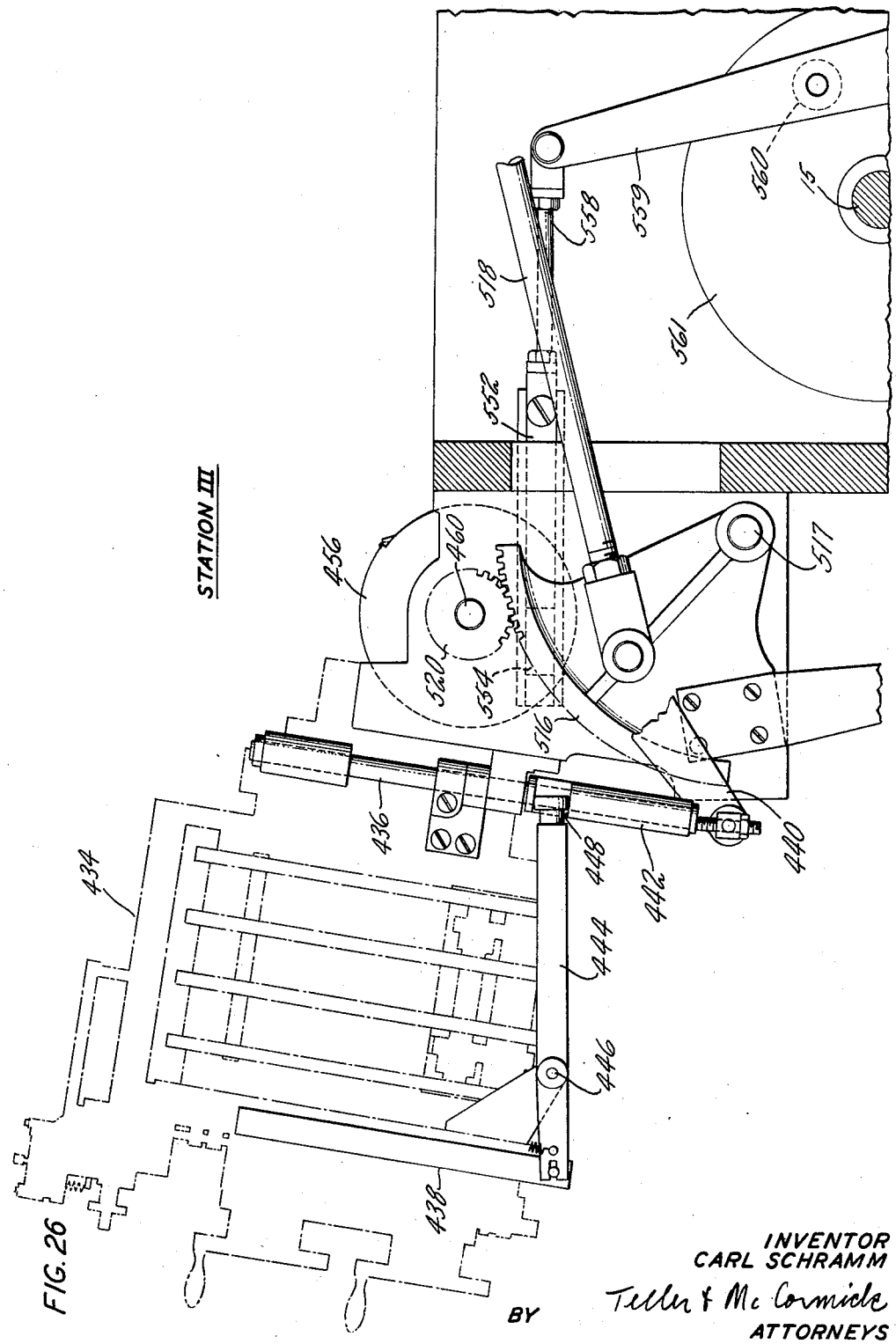
Fig. 26 is a fragmentary transverse sectional view taken along the line 26—26 of Fig. 1 and showing a portion of one stack mechanism and the operating means therefor and also showing the operating means for other parts of the machine.

Referring particularly to Figs. 26, 27 and 31, the machine is provided at the front of Stations II and III with two similar stack mechanisms. Said stack mechanisms are only incompletely shown as they do not of themselves constitute any part of the present invention. Said stack mechanisms may be similar to that shown in the Schramm Patent No. 2,752,153 dated June 26, 1956 and entitled "Stack Mechanism for Book Components." It is a characteristic of a stack mechanism such as shown in said patent that a supply or stack of book components is maintained with its top always at a predetermined level. Thus, the top component of the stack is always in a suitable position for engagement by a transfer mechanism. The stack mechanism at Station II is partly shown in Fig. 27 and is designated 432, this mechanism being adapted and adjusted for supplying precut backstrips E. The stack mechanism at Station III is partly shown in Fig. 26 and 31 and is designated 434, this mechanism being adapted and adjusted for supplying precut backstrips E. The stack mechanism at Station III is partly shown in Figs. 26 and 31 and is designated 434, this mechanism being adapted and adjusted for supplying two precut cover cloth sections F, F in proper spaced relationship with each other. Said stack mechanisms are entirely omitted in Fig. 1 for simplicity of illustration and in order to more clearly show other parts.

Preferably, each of said stack mechanisms 432 and 434 is pivotally connected with the main frame, as for instance by means of a pivot pin 436, as shown in Figs. 26 and 31. Each stack mechanism may be swung forwardly and toward the right end of the machine to provide more convenient access to other parts, more particularly the hereinafter described glue pans.

Figure 10:
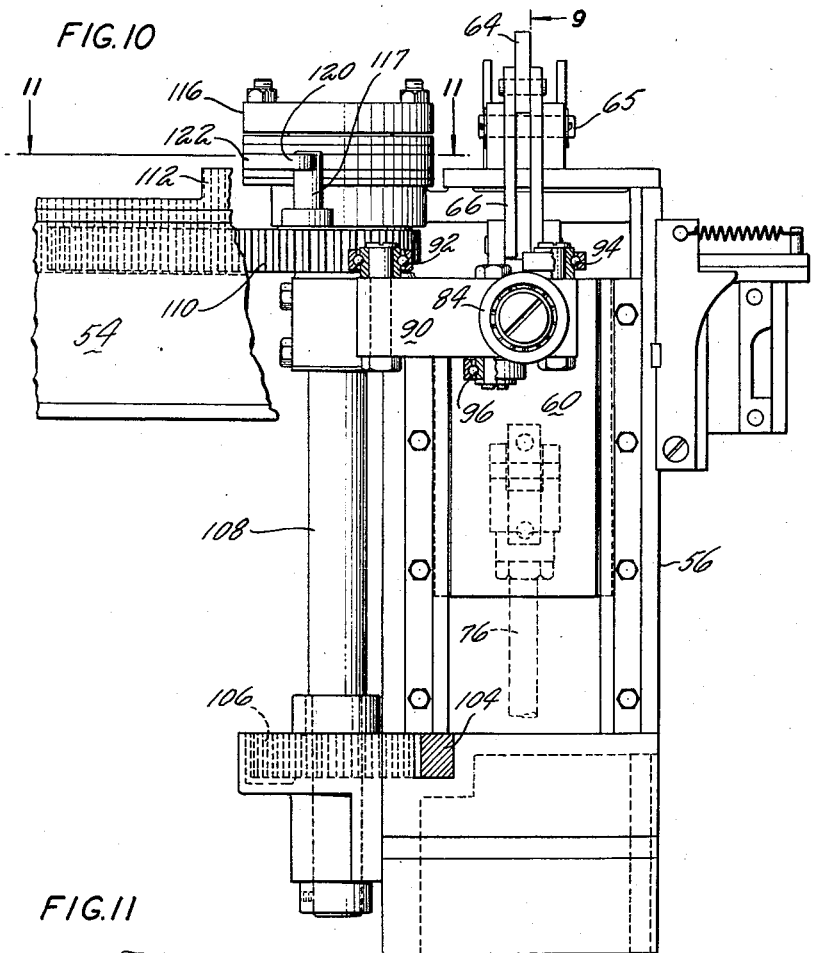
Fig. 10 is an enlarged fragmentary front view taken partially in section along the line 10—10 of Fig. 9, parts of the transfer rail being broken away to more clearly show other parts.
Figure 11:
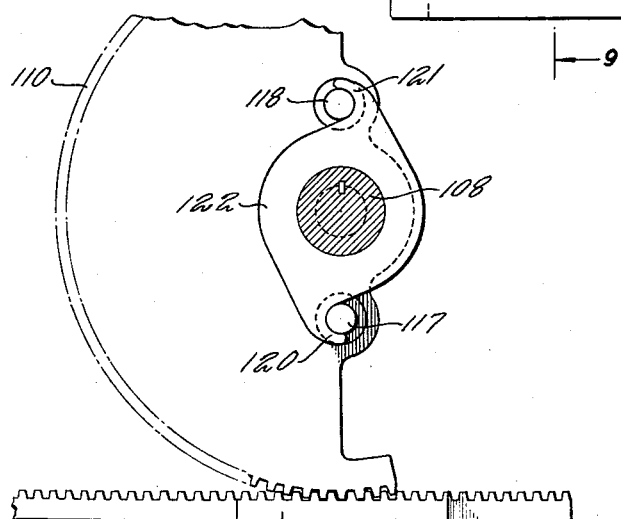
Fig. 11 is a fragmentary horizontal sectional view of a portion of the rail operating mechanism which is shown in Figs. 9 and 10, this view being taken along the line 11—11 of Fig. 10.

A stack mechanism of the stated type requires a reciprocably actuating member such as the link 214 shown in Fig. 10 of said patent, and the vertically reciprocable rod 438 shown in Fig. 26 hereof constitutes the reciprocable actuating member for the stack mechanism 434. The rod 438 serves by means of devices not shown, but similar to those illustrated in said patent, to operate the stack mechanism so as to maintain the top of the stack at a predetermined level. For reciprocating the rod 438, there is provided a vertically oscillating lever 440 operated by a cam mechanism which is not shown but which is driven by the cam shaft 15. There is also provided a member 442 which is located coaxially with the axis of the pivot pin 436 and which is axially reciprocable by said lever 440. A lever 444 is pivoted between its ends on the stack mechanism at 446 and the outer end of said lever is pivotally connected with the rod 438. The inner end of the lever 444 is partly spherical and is entered in a notch 448 in said member 442. By means of the described parts, the oscillating lever 440 serves to reciprocate the rod 438. Inasmuch as the member 442 is concentric with the pivotal axis of the stack mechanism, said stack mechanism 434 can be swung without breaking the operative connection between said lever 440 and said rod 438.

Referring particularly to Figs. 1 and 27 to 30, a single shift mechanism is provided for both of the Stations II and III, this mechanism including a longitudinal shift bar 450 which spans both stations and carries a plurality of suction elements 452 which are hereinafter more fully described. Said bar and suction elements are movable during each cycle from the forward position shown by full lines in Fig. 27 to the rear position shown by dotted lines. At said forward positions, the suction elements 452 engage the uppermost backstrip E and the uppermost cover sections F, F in said stack mechanisms 432 and 434 and said suction elements, in moving to their rear positions, shift said backstrip and cover sections to carrier cylinders 454 and 456, where they are engaged by grippers 458. Immediately thereafter, said bar and suction elements are returned to their forward positions. Said cylinders 454 and 456 are mounted on a longitudinal shaft 460 and means is provided as hereinafter described for causing said carrier cylinders and the parts gripped by said grippers 458 to make one complete rotation in the clockwise direction during each cycle, said cylinders being then momentarily stopped. The gripper parts are glued during said rotation.

The shift bar 450 and the suction devices 452 may be moved between their said front and rear positions by mechanism to be now described. The shift bar 450 is rigidly secured to the upper end of a slide 462 which is guided for movement upwardly and downwardly relatively to an arm 464, said arm being pivoted for movement about a fixed horizontal axis at 466. A cam disc 468 is provided on the cam shaft 15 and a lever 470 is provided adjacent the cam disc, the lower rear end of the lever, not shown, being suitably pivoted. The lever 470 carries a roller 472 engageable with a cam track, not shown, on the cam disc 468. The lever 470 is connected with the arm 464 by means of a link 474. Thus, the arm 464 is given one complete oscillation during each cycle. A second lever 476 is provided adjacent the cam disc 468, this lever being pivoted at 478. The lever 476 carries a roller 480 engageable with another cam track, not shown, on the disc 468. The lever 476 is connected by means of a link 482 with an oscillating lever 484, and said oscillating lever is connected by means of a link 486 with said slide 462. The two cam tracks on the cam disc 468 are so shaped and related that the oscillation of the arm 464 combined with the relative movement of the slide 462 causes the suction elements 452 to move between the positions shown by full and dotted lines in Fig. 27.

Referring more particularly to Figs. 1, 28 and 29, it will be seen that the suction elements 452, 452 are distributed longitudinally along the bar 450. As shown, there are two elements for Station II and four elements for Station III. Each suction element comprises a suction cup carried by a tube 488 that is vertically movable in a guide block 490 on said bar 450, the tube being biased downwardly by a spring 492. Two longitudinal rigid suction pipes 494 and 495 are carried by the bar 452, these pipes being connected by means of manually operable valves 496 and 497 with flexible pipes 498 and 499 which in turn are connected with the suction pipe 196 of the valve mechanism 190 shown in Figs. 12 and 13. Spaced nipples are carried by the pipes 494 and 495 and these nipples are connected by flexible pipes 500, 500 with the tubes 488 of the suction elements.

The valve mechanism 190 is actuated by the lever 228 in timed relation with the movement of the shift mechanism between its forward and rear positions shown in Fig. 27. With the parts in their forward positions, the suction is connected and the suction elements engage the uppermost backstrip E and the uppermost cover cloth sections F, F in the stack mechanisms. Suction is maintained while the backstrips and cover cloth sections are moved or shifted rearwardly to positions where they reach the cylinders 454 and 456 and are engaged by the grippers 458. Then the suction is disconnected, and it remains disconnected until the suction elements of the shift mechanism again reach their forward positions.

At the rear of the shift bar 450 and carried thereby is a relatively thin presser plate 502 that extends throughout the length of the bar and is relatively movable substantially vertically. The plate 502 is guided at its ends by angle members 503, 503 and said plate 502 is connected near its center with a slide 504 guided for downward and upward movement along the bar 450. The plate 502 is movable downwardly by gravity, and it is additionally biased downwardly by a spring 505.

When the shift device is in its forward position as shown by full lines in Fig. 27, the presser plate 502 engages stationary abutments on the stack mechanisms and it is held in a relatively elevated position. However, when the parts are in their rearward position, the plate 502 is not so held and it tends to move downwardly to a level slightly below that of the suction elements 452. As the shift device moves into its rear position, the bottom of the presser plate engages the backstrip E and the cover cloth sections F, F at the rear of the suction elements 452 and at the front of the grippers 458. The plate 502 thus serves to insure firm engagement of said backstrip E and said cover cloth sections F, F with the cylinders 452 and 454 so that they may be assuredly engaged by said grippers 458. The plate 502 is provided with notches 506 into which the grippers 458 can extend as they move into their gripping positions.

Figure 30:
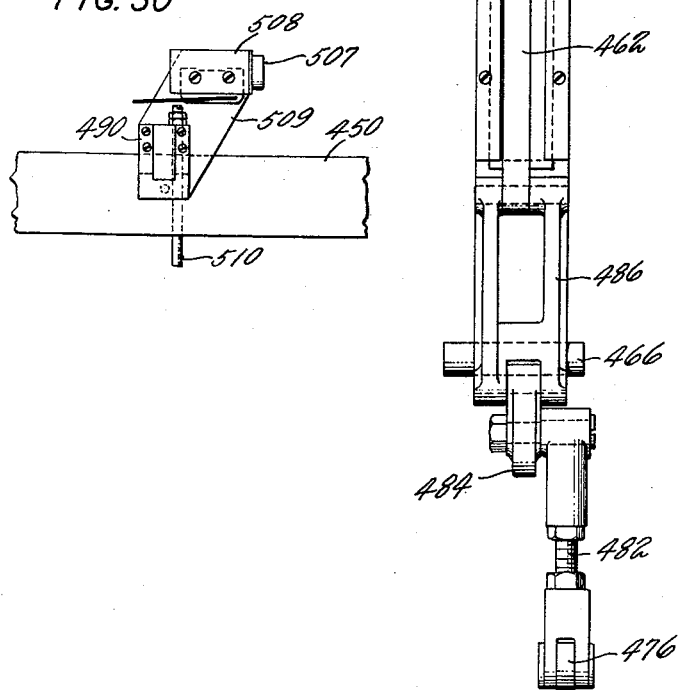
Fig. 30 is a rear fragmentary view of a portion of the mechanism shown in Fig. 28.

Two or more sensing devices 507 are preferably provided on the shift mechanism, one device being shown in Fig. 30 which is a rear view, each device includes an electric switch 508 which is carried by a bracket 509 located adjacent a suction element 452 and secured to the bar 450. A vertically movable rod 510 is guided in the corresponding guide block 490 and its lower end is initially below the level of the bottom of the adjacent suction element. With the rod so positioned, the switch 508 is closed. However, when a backlining or a cover cloth section is being held and transferred by the corresponding suction element, the rod 510 is raised and the switch 509 is opened.

In order to avoid confusion of illustration, the sensing devices 507 are omitted from Figs. 1, 28 and 29. It will be understood, however, that there is one sensing device 507 at the left for the backstrips and two sensing devices at the right for the respective cover cloth sections. Said sensing devices are provided respectively with switches 508, 508ª and 508ᵇ as shown in the electrical diagram in Fig. 35. The devices 507 serve to sense the engagement of a backstrip or cover cloth by said shift mechanisms and the function of said devices will be more fully described in connection with Fig. 35.

*Stations II and III—gluing mechanisms for backstrips and cover cloth sections—Figs. 26, 31 to 35*

Each of the carrier cylinders 454 and 456 is provided with the before-mentioned grippers 458, there being two or more of these grippers on each cylinder for engaging and holding the leading or rear edge portions of the backstrip E or of the cover sections F, F when they are delivered by the shift mechanisms to their before-mentioned rear positions. The positions of the carrier cylinders shown in Figs. 27 and 31 are designated as the "starting positions" and each cylinder is releasably held in its said starting position by a spring-pressed detent 511. Said starting positions of the cylinders are such that the grippers are spaced rearwardly from a vertical plane through the cylinder axis. As before stated, the cylinders during each machine cycle make one complete rotation. The mechanisms for so rotating the cylinders are hereinafter described. The grippers 458 are movable into their gripping positions immediately before rotation is started, and the mechanism for operating the grippers is hereinafter described.

With the backstrip E and the cover cloth sections F, F engaged by the corresponding grippers, said backstrip and cover cloth sections are carried with said cylinders 454 and 456 clockwise from said starting positions. During cylinder rotation, said backstrips and cover cloth sections are glued on their outer faces by means of glue rolls 512 and 513, hereinafter described in detail. Referring particularly to Fig. 31, each cylinder preferably has a segment 514 of reduced radius extending in the leading direction from the grippers. With each cylinder in its starting position, this segment extends beyond the corresponding glue roll and does not contact therewith. The remaining cylinder segment 515, which is of full radius, extends in the trailing direction from the grippers and is of such length, measured circularly, that it will accommodate the longest backstrip E or the longest cover cloth sections F, F within the capacity of the machine. At the conclusion of cylinder rotation, the backstrip and the cover cloth sections have been glued and they are wrapped around the full radius segments 515 of their respective cylinders as shown in Fig. 36 and their leading edges have returned to the same positions as before rotation, that is, as they were shown in Fig. 27. Said glued backstrip E and cover sections F, F are then ready to be engaged by the hereinafter described carrier mechanisms and moved rearwardly onto the before-described platforms 386 and 388.

For rotating the shaft 460 and the carrier cylinders 454 and 456, there is provided a segmental gear 516, shown in Figs. 26 and 32, which gear is movable about a longitudinal pivotal axis at 517. The gear 516 is oscillated by a link 518 operated by a lever, not shown, which is actuated by a cam, not shown, on the cam shaft 15. The gear 516 meshes with a gear 520 secured to the shaft 460. Thus, the shaft 460 is given a complete oscillation once during each machine cycle, the shaft making a full turn in each direction. A friction brake 522 overcomes any tendency to coast at the ends of the rotative movements.

Mechanisms are provided for respectively connecting the cylinders 454 and 456 with the shaft 460 for rotation therewith but only in the clockwise direction. The mechanisms for the two cylinders are similar and it will be sufficient to describe the mechanism for the cylinder 456 shown at the right in Fig. 32.

Clamped or otherwise fixedly secured to the shaft 460 is a driver 524 having teeth 526. Carried by the cylinder 456 is a longitudinally movable spring pressed plunger 528 having teeth thereon adapted to mesh with the teeth 526 on the driver 524. When the cylinder is in its starting position as shown in Fig. 31, the driver is substantially stationary at the beginning of its movement in the clockwise direction. The timing is such that the plunger 528 is in longitudinal register with the driver 524 when the cylinder and the driver are in the last-mentioned position.

A transverse rockshaft 529 is mounted below the shaft 460 and adjacent the driver 524. The rockshaft carries a lever 530 having an extension 532 which is engageable with the plunger 528 to hold it out of engagement with the driver and which is disengageable from the plunger to permit such engagement. Connected with the shaft 529 at the rear end thereof is a lever 534, which is clearly shown in Fig. 31. A link 536 is connected with the lever 534, said link including two telescopic parts with an interposed spring 538. The link 536 in its entirety is extensible with the spring resisting extension. A vertically oscillating lever 540 is connected with the link 536 at the bottom thereof, said lever being operated by a cam mechanism which is not shown but which is driven by the cam shaft 15. The last said cam mechanism is so timed that the lever extension 532 is moved toward the right, as viewed in Fig. 32, substantially simultaneously with the movement of the grippers 458 to gripping positions, the plunger 528 thus being enable to engage the driver 524. The driver makes one rotation in the clockwise direction, as viewed in Fig. 31, and said driver carries the cylinder with it, the cylinder being forced out of its engagement with the detent 511. The cam mechanism for the lever 540 is further so timed that the lever extension 532 is moved toward the left to disengage the plunger 528 from the driver 524 when the cylinder has made one complete rotation and is again held by the detent 511.

It will be understood that the last described mechanism for operating and controlling the cylinder 456 is duplicated for the cylinder 454. Repetition of the description is unecessary.

The details of the before-mentioned grippers 458 and of the means for mounting and actuating them on the cylinders are not part of the present invention, these details being generally similar to those shown in the Jacobs Patent No. 580,111 dated April 6, 1897 and entitled, "Machine for Making Book Covers." Referring more particularly to Figs. 31 to 34 and to the cylinder 456, the grippers 458 are carried by and project from an oscillatory longitudinal shaft 542 mounted within the cylinder but near the periphery thereof. One or more openings are provided in the cylinder wall through which the grippers project, and there may be a single long opening in the cylinder as shown in the last said patent. The number of grippers carried by the shaft 542 can be changed according to the width of the pieces to be gripped, but the spacing of the grippers must be such that they can enter the notches 506 in the presser plate 502.

The shaft 542 is biased by suitable spring means, not shown, to the position shown in Fig. 33 wherein the grippers are disengaged. Said shaft 542 carries a lever 544, and a lever 546 is mounted on a hub 548 for the cylinder. Said lever 546 is bodily rotatable with the cylinder and is also oscillable relatively thereto about the cylinder axis. The lever 546 carries a pin 550 which is engageable with the lever 544 to move it from the position shown in Fig. 33 to the position shown in Fig. 34, this movement of the lever 544 serving to move the grippers to their engaging positions. A lever 562 is pivoted to the end wall of the cylinder, and said lever is biased inwardly by a spring 564. The lever 562 carries a detent engageable with a pin 568 on the lever 546. It will be clear that the detent tends to hold the lever 546 either in the Fig. 33 position or in the Fig. 34 position.

For moving the lever 546, there is provided a transversely movable slide 552 having a recess 554 into which projects a roller 556 on said lever 544. For moving the slide 552, there is provided a link 558 operable by a lever 559, shown in Fig. 26, said lever carrying a roller 560 engageable with a cam track, not shown, on a cam disc 561 on the cam shaft 15. Fig. 33 shows the slide 552 in its rear position and the length of the recess 554 is such that room is provided for the roller 556 to have moved clockwise into the position shown. The roller in so moving has encountered the wall at the front of the recess 554 with the result that the lever 546 has been stopped and has in effect been moved relatively counterclockwise to enable the pin 550 to release the lever 544 and the grippers 458. The detent 566 and the pin 568 temporarily hold the grippers in their released positions. As soon as the backstrip E and the cover cloth sections F, F are in place as shown by dotted lines in Fig. 27, the slide 552 is moved forwardly to the Fig. 34 position. In so moving, the wall at the rear of the recess 554 engages the roller 556 to move the lever 546 relatively clockwise and to thus move the lever 544 in the counter clockwise direction to engage the grippers 458. The detent 566 and the pin 568 temporarily hold the grippers in their engaged positions. The length of the recess 554 is such that there is room for the roller 556 to move in the clockwise direction from the Fig. 34 position during the immediately following cylinder rotation.

Referring particularly to Figs. 31 and 32, the before-mentioned glue rolls 512 and 513 are positioned beneath the carrier cylinders 454 and 456, these rolls being rotatable about a longitudinal axis and being so located that they will contact or nearly contact with the full radius segments 515 of said cylinders. The glue rolls are carried respectively by shafts 570 and 572. Glue pans 574 and 576 are provided for holding liquid glue, these pans being so located that the rolls dip into the glue. Other pans 578 and 580 may be provided below the glue pans, these pans 578 and 580 being adapted for holding hot water for maintaining the proper glue temperature.

The before-mentioned power shaft 30 is utilized for driving the glue rolls. A shaft 582 is provided in alignment with the shaft 30, and a clutch 584 is provided for connecting the shaft 580 with the shaft 30 or disconnecting it therefrom, the clutch being controlled by a manually operable lever 585. The glue roll 513 is driven by a gear 586 fixedly connected with the shaft 582, this gear meshing with an idler gear 588 which in turn meshes with a gear 590 secured to the roll shaft 572. The glue roll 512 is driven by a gear 592 on the shaft 582, this gear meshing with an idler gear 594 which in turn meshes with a gear 596 secured to the roll shaft 570. Preferably, the gear 592 is connectible with the shaft 582 by means of a clutch 598, the clutch being controlled by a manually operable level 599. The gear 592 is shown as connected with the shaft 582 to rotate the glue roll 512, but the gear may be disconnected from the shaft so that said glue roll may be idle. The glue rolls are rotated in the counterclockwise direction as indicated in Fig. 30 and scrapers or doctors 600 are preferably provided to remove excess glue from the rolls.

Referring particularly to Figs. 32 and 35, mechanisms are provided for the respective carrier cylinders to prevent rotation thereof in the event of failure of the shift mechanism to pick up and shift the required backlining or cover cloth sections. In order that said mechanisms may be more readily understood, the mechanism at the right is shown in position for permitting cylinder rotation and the mechanism at the left is shown in position for preventing cylinder rotation.

Secured to each rockshaft 529 is a lever 602 which extends toward the right and is movable downwardly when the shaft is rocked to permit the corresponding plunger 528 to move toward the right and into engagement with the corresponding driver 524. Located below each lever 602 is a pivoted latch 604 which in the position shown at the right does not interfere with the lever 602 but which in the position shown at the left engages the level 602 to prevent movement thereof and of the lever 530. Each latch is biased by a spring 606 toward its lever engaging position. A vertically movable spring pressed detent 608 normally holds the latch 604 in its disengaged position as shown at the right, but said detent is connected with the movable core of a solenoid. The solenoid at the left is designated 609 and the solenoid at the right is designated 610. When either solenoid is energized, the corresponding detent 608 is moved downwardly to release the corresponding latch and permit it to be moved by the spring 606 to its lever engaging position. When the latch is so moved, the lever 602 and the lever 530 and the lever extension 532 are held in the positions shown at the left. The plunger 528 is held out of engagement with the driver 524 and the corresponding cylinder is not rotated. The spring 538 shown in Fig. 31 permits the lever 540 to move without turning the rockshaft 529.

Fig. 35 is a diagram of electrical connections for the solenoids 609 and 610. Main electrical leads 611 and 612 are provided and said switches 508, 508ª and 508ᵇ are connected in parallel with each other and are connected with said lead 611 through a master switch 613. The switch 508 is connected to said solenoid 609 which in turn is connected with the lead 612. The switches 508ª and 508ᵇ are connected to said solenoid 610 which in turn is connected with the lead 612. The switch 613 is normally open, but by mechanism, not shown, actuated by the cam shaft 15, it is momentarily closed once during each cycle and it is so closed during the period when backstrips and cover sections should be shifted to the carrier rolls 454 and 456 by the shift mechanism.

If a backstrip E is being properly held and shifted by the corresponding suction elements 452, the corresponding rod 510, Fig. 30, is raised and the corresponding switch 508 is opened. With the switch or sensing device 508 open, the momentary closing of the switch 613 does not complete a circuit through the solenoid 609. However, if no backstrip was properly engaged by the suction elements, the rod 510 remains in the lower position and the switch or sensing device 508 remains closed. Thus, the closing of the switch 613 energizes the solenoid 609 which acts as before described to stop the rotation of the carrier cylinder 454.

If either cover cloth section F, F is being properly held and shifted by the corresponding suction elements 452, the corresponding rod is raised and the corresponding switch 508ª or 508ᵇ is opened. With both switches 508ª and 508ᵇ open, the momentary closing of the switch 613 does not complete a circuit through the solenoid 510. However, if no cover cloth section or only one cover cloth section was properly engaged by the suction elements, one or both of the rods 510 remains in the lower position and one or both of the switches or sensing devices 508 and 508ª remains closed. Thus, the closing of the switch 613 energizes the solenoid 610 which acts as before described to stop rotation of the carrier cylinder 456.

Upon energization of either solenoid as above described, the corresponding cylinder 454 or 456 is prevented from rotating, thus preventing the application of glue to the segment 515 of said cylinder. If glue were so applied, it would be necessary to clean the cylinder before operation could be resumed, and this would involve a costly delay.

Preferably by means of relay switches, not shown, the closing of any one of the switches or sensing devices 508, 508ª and 508ᵇ also serves to stop the main motor 16 and to thus stop the entire machine. Notwithstanding the stopping of the entire machine, it is important to immediately stop cylinder rotation, as otherwise the machine would coast to such an extent that glue would be applied to some portions or to all of said cylnider segments 515.

The operation of the gluing mechanisms will be briefly summarized, reference being made particularly to the mechanism for the backstrips E. With the carrier cylinder 454 in the position shown in Fig. 27 and with the grippers 458 in their disengaged positions, a backstrip E is picked up from the stack mechanism 432 by the suction devices 452 of the shift mechanism and is shifted to the cylinder 454, the pressure plate 502 of the shift mechanism serving to smooth and hold the backstrip along a line immediately adjacent the rear edge thereof. With the backstrip E so held, the grippers are moved to their gripping positions as shown in Figs. 31 and 34.

Immediately following gripping, the cylinder is given one complete rotation clockwise from its starting position, the backstrip being supported on and moved by the segment 515 of the cylinder. As the backstrip is moved by the cylinder, it is carried past the glue roll 512 and glue is applied to the entire surface thereof. If there is a failure to shift a backstrip, the cylinder is not rotated and the backstrip area is not glued.

The backstrip to be glued is ordinarily much smaller in area than the segment 515 of the cylinder and the area not covered by the backstrip may have an accumulation of glue thereon. In order to prevent this glue from flowing along the surface of the cylinder and onto the area reserved for successive backstrips, it is preferable to provide a support sheet, not shown, on the cylinder surface 515 having exactly the same size and shape as the backstrip and positioned to space said backstrip away from the surface of the cylinder. This support sheet has substantial thickness and it prevents the glue from flowing as above stated.

After making one complete rotation, the carrier cylinder is again stopped in its said starting position and the grippers 458 are moved to other designated positions as shown in Fig. 33. The glued backstrip is then carried rearwardly from the cylinder by the carrier mechanism to be hereinafter described.

The operation of the gluing mechanism at Station III for the cover sections F, F is substantially the same as that last above described, the only significant difference being that there are two cover cloth sections spaced apart.

*Stations II and III—carrier mechanisms for backstrips and cover sections—Figs. 20, and 36 to 40*

Two similar carrier mechanisms are provided which are adapted respectively for carrying the backstrips E and the cover cloth sections F, F rearwardly from the carrier cylinders 454 and 456 after the said backstrips and cover cloth sections have been glued as previously described. The description which follows will relate particularly to the mechanism at the left for transferring the backstrips.

The mechanism at the right for transferring the cover cloth sections is, or may be, substantially identical in construction, and repetition of the description will be unnecessary.

Referring particularly to Figs. 20 and 36, two similar transversely movable slides 614, 614 are provided at Station II at opposite sides of the platform 386. Mounted on the cam shaft 15 is a cam disc 616 and a lever 618 is pivoted near the front of the machine and carries a roller 620 engaging a cam track, not shown, on said cam disc 616, said lever 618 being oscillated by said cam track. An oscillable gear segment 622 is provided, this being mounted for relative movement on a longitudinal shaft 624. A link 626 connects the lever 618 with the segment 622 for enabling the former to oscillate the latter. The gear segment 622 meshes with a gear 628 secured to a longitudinal shaft 630. Also secured to said shaft 630 is a gear 632 which meshes with a transverse rack 634 secured to the bottom of the slide 614. Each of said slides has a rack 634 and there are two gears 632 meshing respectively with said racks, but only one rack and one gear are shown. By means of the mechanism described, the two slides 614 are moved forwardly and rearwardly in unison, making one complete reciprocation during each cycle. The slides are properly timed in relation to other parts as will be hereinafter more fully explained. Spring pressed detents 636 releasably hold the slides 614 in their forward positions so that they are accurately located. Preferably, each gear 632 for the mechanism at Station II is releasably connected with the shaft 630, and it is shown as being so connected by means of a hub 638 and a removable pin 640, as shown in Fig. 37. The slides 614, 614 at Station II and all parts carried thereby are idle when said pins 640 are withdrawn.

The link 626 comprises two end portions connected by a central threaded member 642. The threaded member 642 constitutes means for adjusting the length of the link 626 so as to insure movement of the slides to their correct forward positions as shown in Fig. 36. The link 626 is connected with the segment 622 by means of a pivot pin 644 transversely adjustable in a slot 646 in the gear segment. Adjustment of the pivot pin in said slot serves to vary the amplitude of oscillation and to thus vary the length of travel of said slides 614, 614 to accommodate backstrips of different lengths.

The two slides 614, 614 are connected at the front by a plate 648 which is at a level only slightly above the surface of the platform 386, this being more readily apparent from Fig. 38. The plate 648 has a relatively large number of transverse horizontal holes 650 therein open at the front and adapted for receiving pins 652. Said pins 652 constitute the lower jaws of pairs of jaws adapted for gripping the backstrip E to move it rearwardly. A relatively large number of holes 650 are provided in order that the pins 652 may be properly located and spaced to suit the particular backstrips to be transferred. Also extending transversely between the slides 614, 614 are two rods 654 and 656. The two rods are connected by straps 658, 658 and said rods may be oscillated as a unit about the axis of the forward rod 654. Said forward rod has a relatively large number of holes 660 therein corresponding in spacing to the before-mentioned holes 650 in the plate 648, and a plurality of pins or jaws 662 are inserted in some of the said holes, these pins or jaws corresponding in number and in spacing to the before-mentioned pins or jaws 652.

Referring particularly to Fig. 38, the forward rod 654 carries at each end a lever 664 having a tail portion engageable with a pin 666 on a slide 668 which is movable transversely of the machine separately from the said slides 614, 614. When the slides 668 are in their forward positions, the pins 666 engage the levers 664 to swing the rods 654 and 656 in the counter-clockwise direction about the axis of the former and to thus move the upper jaws 662 downwardly into engaging positions. When the slides 668 are moved rearwardly, the pins 666 release the levers 664 and the upper jaws 662 move upwardly out of engaging positions.

For moving the slides 668, 668, there are provided rods 670, 670, the rear portions of which are supported on and guided by brackets 672, 672 on the slides 614, 614. Carried by the rods 670 are forward collars 674, 674 and rear collars 676, 676 which are adjustable along the rods and which can be locked in adjusted positions.

Secured to the before-mentioned shaft 624 for movement in unison therewith are two similar levers 678, 678 carrying pins 680, 680 which are engageable with the collars on the rods 670. For oscillating the shaft 624 and the levers 678, 678, there is provided a lever 682 carrying a roller 684 which is engageable with a second cam track on the cam disc 616. By means of the last said cam track, the lever 682 can be oscillated to locate the pins 680, 680 in the proper positions for engaging the collars on the rods 670, 670 and to thus effect engagement and release of the jaws 662, 662 at the proper times.

To minimize shock at the ends of the forward and rearward movements of slides 614, 614, there may be provided on each slide a block 686 having a transverse hole through which extends a movable rod 688 having a collar 690 at the front and a collar 692 at the rear. A spring 694 is interposed between the block and the front collar, and a spring 696 is interposed between the block and the rear collar. Near the end of forward movement of the slides, the collars 690, 690 engage stationary blocks 698, 698 and the springs 694, 694 are compressed to restrict said forward movement. Near the end of rearward movement of the slides, the collars 692, 692 engage stationary abutments 700, 700 on rearwardly extending bars 702, 702 and the springs 696, 696 are compressed to restrict said rearward movement.

Referring particularly to Fig. 36, it will be observed that the carrier cylinder 454 is in the same position that is shown by dotted lines in Fig. 27, but the backstrip E has been wrapped around said cylinder and has been glued. As shown in Fig. 36, the grippers 458 have been released and are in their disengaged positions and the slides 614, 614 have moved the lower jaws 652 into positions below the rear edge portion of the glued backstrip E.

Immediately following the arrival of the various parts in the relative positions shown in Fig. 36, the cam track for the lever 682 moves the levers 678, 678 and the pins 680, 680 slightly rearwardly so that said pins engage the collars 676, 676, thus moving the slides 668, 668 rearwardly and thus moving the upper jaws 662, 662 downwardly to grip the extreme rear edge portion of the backstrip E as shown in Fig. 40.

Immediately following the gripping of the backstrip E, the cam track for the lever 618 oscillates said lever to move the slides 614, 614 rearwardly. As the slides move rearwardly, the jaws carried thereby draw the glued backstrip from the carrier cylinder 454 and onto the platform 386. When the slides have moved rearwardly to a sufficient extent to properly position the backstrip on said platform 386, the collars 674, 674 engage the pins 680, 680 to move the slides 668, 668 relatively forwardly and to thus release the jaws. Said pins 680, 680 have been moved by their levers 678, 678 so as to properly time the releasing of said jaws. Simultaneously with the releasing of the jaws, rearward motion is momentarily interrupted. The timing of the suction applied to the holes 398 and 400 is such that said suction is applied immediately upon the arrival of the backstrip at its predetermined rearmost position. The suction holds the backstrip in the said predetermined position. Following the arrival of the parts at the last position and after a momentary interruption of movement, the slides are additionally moved to a slight extent rearwardly in order that the jaws 652, 652 may clear the glued backstrip so that it is unobstructed for the next following upward and forward movement by the transfer mechanism. The cam track for the lever 682 is so formed that the pins 680, 680 are moved as above stated, in order to permit the beforementioned additional rearward movement of the slides.

The operation of the carrier mechanism at Station III for the cover cloth sections F, F is substantially the same as that last above described, the only significant difference being that there are two cover cloth sections spaced apart.

It will be understood that while the backstrip E and the cover cloth sections F, F are being carried rearwardly to their described rearmost positions, the next following backstrip E and cover cloth sections F, F are being shifted to the carrier cylinders in the positions shown in Fig. 27 preparatory to gluing.

With respect to the backstrips E at Section II, it is essential that each strip be moved to such an extent that the rear and forward edges are equally spaced from the front and rear edges of the cover boards and center element that are to be subsequently transferred from Station I. This symmetrical relationship is shown at II in Fig. 3. With respect to the cover cloth sections F, F at Station III, it is essential that the sections be moved to such an extent that the rear and forward edges will register respectively with the rear and forward edges of the backstrips E that are to be transferred from Station II. This registering relationship is shown at III in Fig. 3. Also as will appear, the first folding mechanism at Station IV is not substantially adjustable at the rear, and is adjustable only at the front to accommodate cover cloth sections of different lengths. It is therefore essential that all of the components at Stations I, II and III be properly located transversely so that the several components are in the required relationship and so that the rear edges of the cover boards are at the proper predetermined position for cooperation with the first folding mechanism.

*Stations II and III—alternative operation for one-piece covers*

When the backstrip E is omitted and when there is a one-piece cover K as shown in Figs. 5 and 8, the operation of the machine as thus far described differs only in the fact that various mechanisms at Station II are idle and that one-piece covers K are fed, transferred, glued and carried at Station III. The stack mechanism 432 at Station II may be rendered inactive, and the shift suction elements 452 at Station II are made inactive by closing the valve 498. The mechanism for rotating the cylinder 454 has its latch 604 in the position shown at the left in Fig. 27 so that said cylinder is not rotated. The clutch 598 is disengaged to prevent rotation of the glue roll 512. The slides 614, 614 of the carrier mechanism at Station II are made inactive by withdrawing the pins 640 shown in Fig. 37.

With the several mechanisms disconnected as stated, the pickup or transfer device 124 during each cycle transfers a set of boards A, B and C from Station I to Station II where they momentarily remain without any change in relative positions. They are held in place by the described suction devices on the platform 386 at said Station II. During the next following cycle, the pickup or transfer device 126 transfers the set of boards A, B and C, without any change in relationship, from Station II to Station III where they are deposited on the glued one-piece cover K.

*Stations IV and VI—folding in general*

Stations IV and VI are folding stations for two separate folding operations. A folding means is located at the first folding Station IV which is operable after the transfer to said Station IV of the components assembled at said cloth assembly station, and this folding means serves for folding portions of the previously glued cover cloth around two opposite edges of the cover boards. Another folding means is located at the second folding Station VI which is operable after the transfer to said Station VI of the components assembled at said cloth assembly station and partly folded at the first folding station, and this second folding means serves for folding portions of the previously glued cover cloth around the two remaining exposed edges of said cover boards. As shown, the cover cloth, and the backstrip when provided, are folded at the first folding station around the rear and front edges of the boards and the cover cloth is folded at the second folding station around the side edges of the boards, but the invention is not necessarily so limited.

The folding mechanisms, shown as being located at Station IV and VI, are claimed herein only in combination with other mechanisms. Said folding mechanisms are separately set forth and seperately claimed in my application Ser. No. 830,424 filed July 29, 1959 and entitled "Folding and Creasing Mechanism for a Case Making Machine," which application is a continuation-in-part of this present application.

*Station IV—first folding mechanism—Figs. 41 to 60*

In the presently preferred embodiment of the invention, mechanism is provided at Station IV for folding the backstrip E and the cover cloth sections F, F as indicated in the portion of Fig. 3 that is marked "IV," said backstrip and cover cloth sections being folded around the rear and front edges of the cover boards A, B and C.

Referring particularly to Fig. 41, a platform 704 is provided at said Station IV, said platform being similar to the platform 389 that is shown in Fig. 9 and has previously been described. Longitudinal fold bars 706 and 708 are provided which are respectively near the rear and near the front of said platform. These bars 706 and 708 are movable to effect the above-mentioned folding of the backstrip and cover sections. Each of the fold bars 706 and 708 is pivotally movable about a longitudinal axis and has a vertical face that extends through said axis and is exposed toward the other bar. Preferably, each fold bar is rectangular but the invention is not so limited.

The rear fold bar 706 is carried at its ends by two pivot members 710 and 712 which have cylindrical portions rotatively movable in bearing apertures in blocks 714 and 716. In its initial position as shown in Figs. 43 and 44, the rear bar 706 has its bottom face horizontal and said bar is so related to the pivot members that its lower forward corner is coincident with the axis of rotative movement. The bottom face of said bar and said axis are in or near the plane of the top of the platform 704 when the platform is in its upper position.

The forward fold bar 708 is carried at its ends by two pivot members 718 and 720 which are similar to the pivot members 710 and 712 and which have cylindrical portions rotatively movable in bearing apertures in blocks 722 and 724. In its initial position as shown in Figs. 43 and 44, the front bar 708 has its bottom face horizontal and said bar is so related to its pivot members that its lower rear corner is approximately coincident with the axis of rotative movement. The bottom face of said bar and said axis are in or near the plane of the top of the platform 704 when the platform is in its upper position.

As best shown in Fig. 43, mechanism is provided for rotatively moving or oscillating the fold bars 706 and 708 through 90°, the bar 706 being initially moved counterclockwise and the bar 708 being initially moved clockwise. Otherwise stated, the movements of the bars are such that the folding faces are moved toward each other. The mechanism for moving the fold bars includes a vertically movable slide 726 located at one end of the station and shown as being at the right end, said slide carrying a transverse bracket 728. For vertically reciprocating the slide 726 and the bracket 728, there is provided an arm 730 pivotally mounted on a longitudinal stud 731, said arm carrying a roller 732 which enters a transverse slot in a block 734 carried by the slide 726. A lever 736 is pivoted on a pivot pin 738 near the front and is connected by a link 739 with the lever 730. A cam disc 740 is secured to the main shaft 15 and a roller 741 on the lever 736 engages a cam track, not shown, on said disc 740. Said cam track serves to oscillate the levers 736 and 730 once during each cycle and to thus reciprocate the slide 726 and the bracket 728.

Secured to the pivot members 712 and 720 at the right ends thereof are pinions 742 and 744. Carried by said bearing blocks 716 and 724 are guides 746 and 748 for vertically movable racks 750 and 752, these racks meshing respectively with the pinions 742 and 744. The racks are connected with the bracket 728 for vertical reciprocation therewith. The extent of rack movement is such that the fold bars 706 and 708 are oscillated through 90° during each cycle. The timing of the oscillatory movement of the fold bars will be explained in connection with Figs. 45 to 50.

The bearing blocks 714, 716, 722 and 724 are mounted respectively on transversely movable slides 754, 756, 758 and 760. Mechanism is provided for the reciprocation in unison of the several slides 754, 756, 758 and 760 and of the parts carried thereby, the slides 754 and 756 being moved rearwardly from the positions shown and the slides 758 and 760 being moved forwardly from the positions shown. As the slides 756 and 760 are reciprocated, the racks 750 and 752 move with them. The bracket 728 has a horizontal slot 761 and the racks have projections or tongues 762 and 763 which enter said slot and are movable therealong.

The several means for supporting and guiding the slides are similar, and that for the slide 756 is clearly shown in Fig. 42. Reference is also made to Figs. 41 and 44. A longitudinal rockshaft 764 is located near the rear of the machine and two shorter longitudinal rockshafts 765 and 766 are located near the front. Connected respectively with the shafts 764 and 765 are levers 768 and 770 having inter-meshing gear segments thereon. Connected respectively with the shafts 763 and 766 are levers 772 and 774 having intermeshing gear segments thereon. For oscillating the several rockshafts there is provided a lever 776 pivotally mounted on said pivot pin 738, said lever being connected by a link 778 with one of said gear segment levers, such as the lever 772. The arm 776 carries a roller 780 which engages a cam track, not shown, on said cam disc 742. Said cam track serves to oscillate the lever 776 once during each cycle and to thus oscillate the rockshafts 764, 765 and 766 and all of the segment levers 768, 770, 772 and 774. The rockshafts 764 and 765 respectively carry two forked arms 782 and 784 which respectively embrace rollers 786 and 788 on the slides 754 and 758. The rockshafts 764 and 766 respectively carry two similar formed arms 790 and 792 which respectively embrace rollers 794 and 796 on the slides 756 and 760. Thus, when the lever 776 is oscillated, the several slides are transversely reciprocated as before stated, the fold bars being reciprocated with them. The timing of the reciprocating movements of the fold bars will be explained in connection with Figs. 45 to 50.

The rear bearing blocks 714 and 716 and all parts carried thereby including the fold bar 706 are preferably adjustable on the slides 754 and 756 in the direction of slide reciprocation. They are so adjustable by means of screws 798 and 800 engaging brackets 802 and 804 on said slides. Said bearing blocks and said fold bar 706 are so adjustable for purposes of initial set-up and they are not ordinarily adjusted for different sizes of cases to be made.

The forward bearing blocks 722 and 724 and all parts carried thereby including the fold bar 708 are preferably adjustable on the slides 758 and 760 in the direction of slide reciprocation. They are so adjustable by means of screws 806 and 808 engaging brackets 810 and 812 on said slides. In order that the screws 806 and 808 may be turned in unison, they are connected with each other by a longitudinal shaft 814 and by bevel gearing. Said bearing blocks 722 and 724 and said fold bar 708 are adjusted in accordance with different transverse dimensions of the cases to be made.

As shown in Fig. 45, the fold bars 706 and 708 are horizontal and their lower faces are in or near the plane of the top of the platform 704, and said fold bar 708 is spaced from the fold bar 706 by a distance somewhat greater than the transverse dimension of the boards A, B and C. Assemblies of cover boards, backstrip and cover cloth sections, as assembled at Station III, are transferred from said Station III and to Station IV by the pickup or transfer device 128. As each assembly reaches the position shown in Fig. 45, the projecting portions of the backstrip E and cover cloth sections F, F engage said fold bars 706 and 708. The before-described carrier mechanisms at Stations II and III have been so adjusted that said backstrip and said cover cloth sections uniformly overlap the fold bars. For simplicity of illustration, the backstrip E is omitted.

It will be understood that the bars 706 and 708, as shown in Fig. 45, are being moved toward each other and are approaching the positions shown in Fig. 46 wherein the spacing between the bars is only very slightly greater than said transverse dimension of the cover boards. The fold bars are so moved by the lever 776 and by the parts actuated thereby including the slides 754, 756, 758 and 760.

The pickup or transfer device 128 continues to move downwardly from the Fig. 45 position, and in moving to the Fig. 46 position, the projecting portions of the backstrip E and of the cover cloth sections F, F are partly folded upwardly and around the rear and front edges of the boards A, B and C. The greater spacing of the fold bars as shown in Fig. 45 assures entry of the boards between them, and the movement of the fold bars toward each other simultaneously with the downward movement of the entire assembly of case components serves to correct any minor transverse inaccuracy in the placing of said assembly. During said partial folding, the platform 704 is moved downwardly in opposition to its springs so that the plane of the top of the boards is approximately coincident with the plane of the bottoms of the fold bars. This is the limit of downward movement.

With all other parts remaining in the same positions as in Fig. 46, the fold bars 706 and 708 are turned 90° as shown in Fig. 47, the rear bar 706 being turned counterclockwise about an axis coincident with its lower front corner and the forward bar 708 being turned clockwise about an axis coincident with its lower rear corner. This movement is effected by the lever 736 and by the parts actuated thereby including the racks 750 and 752. Thus, the fold bars complete the folding of the projecting portions of the backstrip and cover cloth sections.

With the fold bars remaining in the same positions as the Fig. 47, the pickup device 128 is moved upwardly and then returned toward the left as viewed in Figs. 1 and 2. At the same time, the next pickup device 130 is moved toward the left and is then moved downwardly to engage the casing assembly as shown in Fig. 48. During this interval, the fold bars 706 and 708 hold the folded portions of the backstrip and cover cloth sections to assure adherence of the glue and also to prevent any shifting of the assembly along the platform. During said interval, upward pressure is applied by the platform 704 which is upwardly biased by its springs.

Immediately following the engagement of the casing assembly by the pickup device 130, the fold bars 706 and 708 are reversely turned to the positions shown in Fig. 49, these being the same positions as shown in Fig. 46. The fold bars are so moved by the lever 736 and the racks 750 and 752.

Immediately following the turning of the fold bars to the Fig. 49 positions, said bars are moved bodily rearwardly and forwardly to the positions shown in Fig. 50. The bars are so moved by the lever 776 and the racks 754, 756, 758 and 760. The bars are thus entirely clear from the casing assembly to prevent any rubbing or scraping of the newly folded backstrip and cover cloth sections as the assembly is moved upwardly by the pickup device 130 preparatory to movement thereof to the next following Station V.

As the case assembly moves upwardly, the platform moves with it and returns to the Fig. 45 position. Immediately following the upward movement of the case assembly and the platform from the Fig. 50 position, the fold bars 706 and 708 are moved respectively forwardly and rearwardly to the positions shown in Fig. 45. When they reach the Fig. 45 positions, the fold bars are ready to receive the next following case assembly.

*Pressing or creasing in general—Figs. 51 to 54*

Means is provided for pressing or creasing the partly folded cover cloth after the first folding operation so as to insure smooth folding during the second folding operation. The pressing or creasing will be understood by referring to Figs. 51 to 54.

Figs. 51 and 52 show one corner of a book casing as it appears immediately after the first folding operation. Referring particularly to Fig. 52, it will be seen that the projecting cover cloth portion F' at the left must be folded upwardly and toward the right around the edge of the cover board A. In being so folded, the portion F' must engage the cover cloth portion F" and the exact bending or folding of said portion F" would be unpredictable and the final fold would in many instances be objectionably rough or irregular. In order to be assured of a smooth and definite final fold, the cover cloth portion F" is pressed or creased at H as shown in Figs. 53 and 54. After creasing, the portion F" adheres to the portion F' and the final folding of the portion F' is definite and smooth.

The means for effecting pressing or creasing as above explained may be variously located, but there is preferably provided a separate creasing station which is Station V.

The creasing mechanism, shown as being located at Station V, is claimed herein only in combination with other mechanisms. Said creasing mechanism and the combination of the creasing mechanism with a folding mechanism are separately set forth and claimed in the before-mentioned continuation-in-part application Ser. No. 830,424.

*Station V—creasing mechanism—Figs. 55 to 60*

Referring particularly to Figs. 55 and 56, a platform 816 is provided at Station V and said platform preferably differs in its mounting from other platforms that have been described. As shown, the platform 816 is rigidly connected with a vertically movable post 818 guided in bearings in brackets 820 and 822. Connected with the platform is a pin 824 which enters an aperture in the bracket 820 to prevent the platform from moving about the axis of the post 818. Said post 818 and the platform are biased upwardly by a spring 826 connected at its lower end with said post and connected at its upper end with said bracket 820. A suitable means, not shown, limits upward movement of the post and of the platform.

Two similar longitudinally spaced slides 828 and 830 are provided, these slides extending transversely and being movable transversely. Said slides are guided at their rear portions by two similar brackets 832 and 834 and said slides are guided at their front portions by two similar brackets 836 and 838. In order that the slides 828 and 830 may be adjusted to change the longitudinal spacing between them, each of said brackets 832, 834, 836 and 838 is a longitudinally movable slide guided for movement along the tops of the main frame members 13 and 12, as clearly shown in Fig. 56. In order that said slides 828 and 830 may be uniformly adjusted longitudinally, said carrier slides 832 and 834 are connected with each other by two longitudinal screws 840 and 842 and said carrier slides 836 and 838 are connected with each other by two longitudinal screws 844 and 846. The screws 840 and 842 are rigidly connected with each other at their adjacent ends and the screw 842 is rotatable in a bracket 848 which prevents longitudinal movement. The screws 844 and 846 are similarly related to each other and to the slides 836 and 838, and the screw 846 is rotatable in a bracket 850 which prevents longitudinal movement. Said screws 840 and 842 are oppositely threaded and they are respectively in engagement with the slides 832 and 834 and said screws 844 and 846 are oppositely threaded and they are respectively in engagement with the slides 836 and 838, the result being that said slides move in opposite directions when the screws are rotated. The screws at the rear and those at the front are operatively connected with each other by a transverse shaft 852 and by suitable bevel gearing. By rotating the shaft 852, the slides 828 and 830 are moved in opposite directions so that the spacing between them can be adjusted in accordance with the longitudinal dimension of the cases to be made.

For reciprocating the slides 828 and 830 forwardly and rearwardly, there is provided a lever 854 mounted on a pivot pin 856 near the front, this lever having a roller 858 which cooperates with a cam track, not shown, on a cam disc 860 on the main cam shaft 15. Mounted in brackets 862 and 864 at the rear of the machine is a rockshaft 866. A lever 868 is rigidly secured to said shaft 866 and said lever is connected with the lever 854 by means of a link 870. Extending upwardly from the rockshaft 866 and adjacent the brackets 862 and 864 are two levers 872, 872, one of which is shown in Fig. 56 and the other of which is shown in Fig. 57. The said levers 872 at the upper ends thereof carry a longitudinal shaft 874. Secured respectively to said slides 828 and 830 are brackets 876 and 878. Fitted in each of these brackets is a vertically movable block 880 having a bearing aperture through which the shaft 874 extends. When the slides 828 and 830 are moved longitudinally of the machine for purposes of adjustment, said brackets 876 and 878 are similarly moved along the shaft 874. During operation of the machine, the cam track on the disc 860 serves to oscillate the lever 854 once during each cycle and said lever in turn oscillates the levers 868 and 872. The levers 872 serve by means of the shaft 874 to reciprocate the slides 828 and 830. As shown in Figs. 55 and 56, the slides are in intermediate positions.

In order to effect creasing, each of the slides 828 and 830 is provided with two creasing devices, said devices being respectively designated 882, 884, 886 and 888. These four creasing devices are similar to each other except for reversal of parts and it will be sufficient to particularly describe the creasing device 886 on the slide 828.

Each of the slides 828 and 830 has a longitudinal T-slot 890 therein. Each creasing device includes a block 892 movable along the slide and having a tongue entering the corresponding T-slot. The block can be clamped in place by means of a T-bolt 894. A lever 896 is pivoted to the block 892 at 898 and this lever carries a creasing tool 900 and a roller 902. The lever 896 is biased in the clockwise direction by means of a spring 904 and a screw 906 provides a stop to limit movement of the lever. As the creasing device 886 is moved rearwardly from the position shown, the creasing tool 900 engages the corresponding cover cloth portion F'' to form the crease H, as shown in Figs. 53 and 54. The roller 902 is spaced closely behind the tool 900 and this roller serves to press the cover portion F'' against the cover portion F'.

It is necessary, or at least desirable, to provide means for firmly holding the book casing assembly in place on the platform 816 during the operation of the several creasing devices. The casing assembly might be held in place by vacuum devices such as fully described in connection with Stations II and III, but it is preferred to provide mechanical devices for clamping the cover assembly in place.

As shown, there are two clamping levers 908 and 910 pivotally connected respectively to the carrier slides 832 and 834 for longitudinal adjustment therewith, the pivotal connection for one lever being shown at 911. The levers are biased to their clamping positions by means of springs 912 and 914, but Fig. 56 shows the levers 908 in their released or disengaged position.

A longitudinal rockshaft 916 is mounted in suitable bearings near the rear of the machine and this lever has two upwardly extending levers 918 which carry a longitudinal presser bar 920. The bar 920 is engageable with rollers 922 at the lower ends of the clamping levers 908 and 910. For oscillating the shaft 916, there is provided a lever 924 mounted on said pivot pin 856, this lever having a roller 926 which cooperates with a cam track, not shown, on said cam disc 860. A lever 928 is secured to said rockshaft 916 and a link 930 connects said lever 924 with said lever 928.

The timing is such that the clamping levers 908 and 910 are held in the positions shown in Fig. 56 while one casing assembly is being removed from the platform 816 and while the next following casing assembly is being transferred thereto. Immediately following the transfer of a casing assembly to said platform, the presser bar 920 is moved rearwardly to the position shown in Fig. 60 and the springs 912 and 914 move the clamping levers 908 and 910 forwardly and downwardly to engage the newly transferred casing assembly near the top edge thereof.

As before stated, the slides 828 and 830 are shown in their intermediate positions. As soon as a casing assembly is transferred to the platform 816 and is clamped thereon as above described, the slides 828 and 830 are moved forwardly to enable the creasing devices 882 and 884 to effect creasing at the rear left corner and at the rear right corner of the casing assembly. Immediately thereafter, the slides 828 and 830 are moved rearwardly beyond the positions shown to enable the creasing devices 886 and 888 to effect creasing at the forward left corner and at the forward right corner of the casing assembly. Then the slides are returned to the intermediate positions shown and the clamping levers are returned to the positions shown in Fig. 56 so that the creased casing assembly can be transferred to the next following Station VI.

Figure 61:
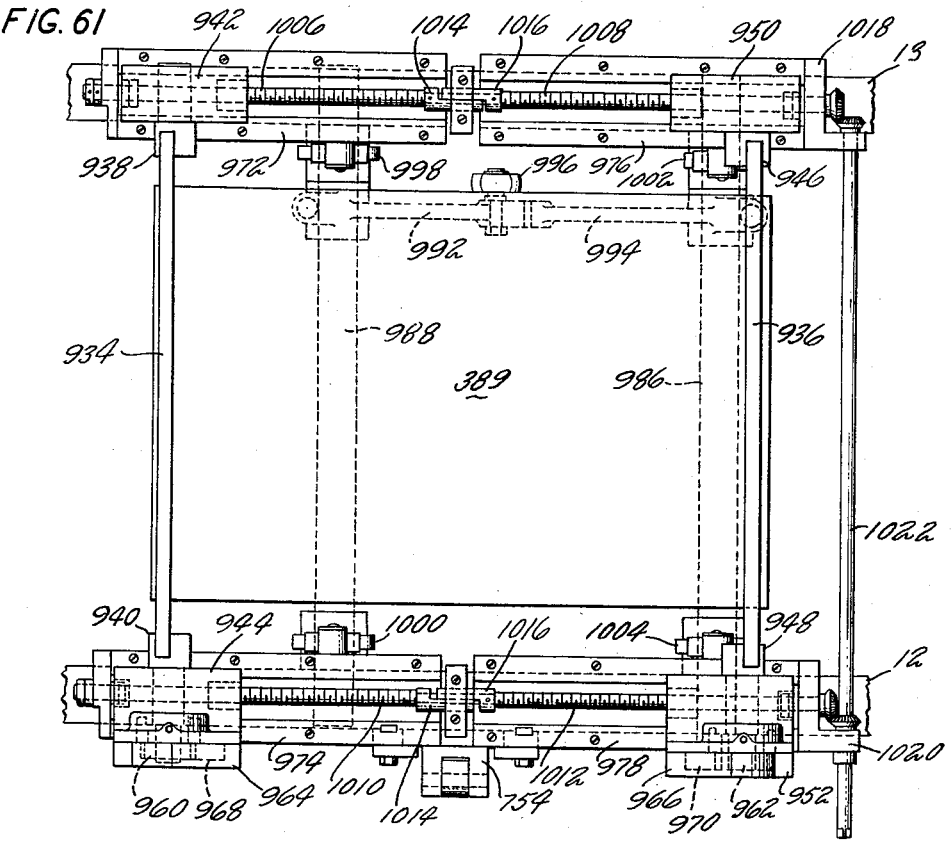
Fig. 61 is a fragmentary plan view taken along the line 61—61 of Fig. 2, this view showing various parts at Station VI.
Figure 62:
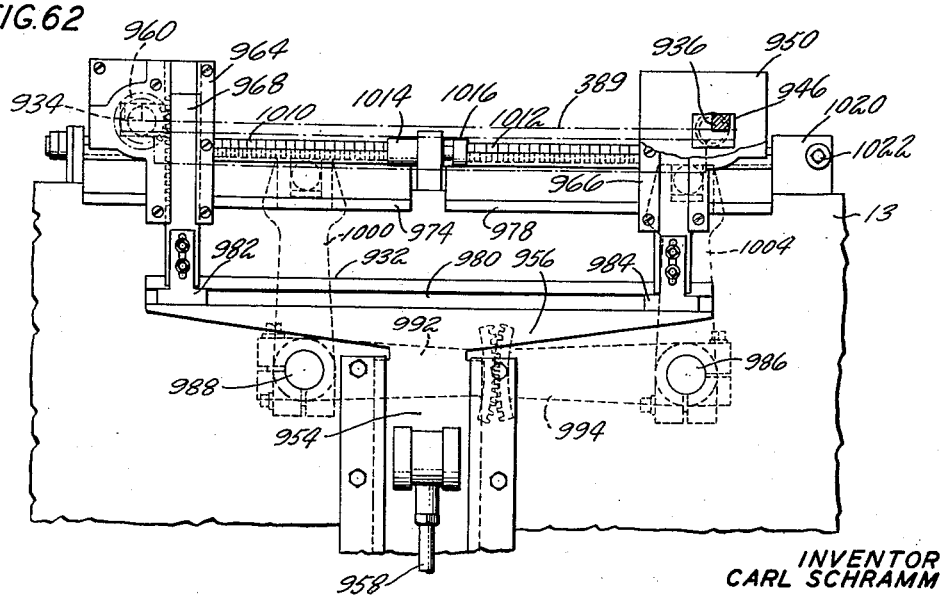
Fig. 62 is a fragmentary front view of some of the parts shwn in Fig. 61.

*Station VI—second folding mechanism—Figs. 61 and 62*

Mechanism is provided at Station VI for folding the cover cloth sections F, F as indicated in the portion of Fig. 3 that is marked "VI," said cover sections being folded around the left and right edges of the cover boards A and B.

Referring particularly to Fig. 61, the platform 389 is provided at said Station VI, said platform being shown in Fig. 9 and having been previously described. Transverse fold bars 934 and 936 are provided which are respectively near the left and near the right of said platform. These bars 934 and 936 are generally similar to the fold bars 706 and 708 at Station IV and they are movable to effect the last above-mentioned folding of the cover sections.

The left fold bar 934 is carried at its ends by two pivot members 938 and 940 which have cylindrical portions rotatively movable in bearing apertures in blocks 942 and 944. The right fold bar 936 is carried at its ends by two pivot members 946 and 948 which are similar to the pivot members 938 and 940 and which have cylindrical portions rotatively movable in bearing apertures in blocks 950 and 952. The fold bars 934 and 936 are rectangular and they are related to the pivot members and to the platform in the same manner as previously described for the fold bars 706 and 708. Said bars 934 and 936 are relatively movable as before described in connection with said bars 706 and 708.

The mechanism for rotatively moving or oscillating the fold bars 734 and 736 through 90° includes a vertically movable slide 954 located at the front, said slide carrying a transverse bracket 956. A suitable mechanism including a link 958 is provided for vertically reciprocating the slide 954 and the bracket 956. This mechanism is not shown in detail, but it may be generally similar to the mechanism for reciprocating the slide 726 and the bracket 728 at Station IV.

Secured to the pivot members 940 and 948 at the front ends thereof are pinions 960 and 962. Carried by said bearing blocks 944 and 952 are guides 964 and 966 for vertically movable racks 968 and 970, these racks meshing respectively with the pinions 960 and 962. The racks are connected with the bracket 956 for vertical reciprocation therewith. The extent of rack movement is such that the fold bars 934 and 936 are oscillated as before stated during each cycle.

The bearing blocks 942, 944, 946 and 948 are mounted respectively on longitudinally movable slides 972, 974, 976 and 978. Mechanism is provided for the reciprocation in unison of the several said slides and of the parts carried thereby, the slides 972 and 974 being moved toward the left from the positions shown and the slides 976 and 978 being moved toward the right from the positions shown. As the slides 974 and 978 are reciprocated, the racks 968 and 970 move with them. The bracket 956 has a horizontal slot 980 and the racks have projections or tongues 982 and 984 which enter said slot and are movable therealong.

A transverse rockshaft 986 is located near the right and a second transverse rockshaft 988 is located near the left. Connected respectively with the shafts 986 and 988 are levers 992 and 994 having intermeshing gear segments thereon. A suitable mechanism is provided for oscillating the two rockshafts, and this mechanism includes a link 996 connected with one of the levers 992 and 994. Said mechanism is not shown in detail, but it may be generally similar to the mechanism for oscillating the rockshafts 763, 764 and 765 at Station IV. The rockshaft 988 carries two forked arms 998 and 1000 which respectively embrace rollers on the slides 972 and 974. The rockshaft 986 carries two similar forked arms 1002 and 1004 which respectively embrace rollers on the slides 976 and 978. Thus, when the rockshafts are oscillated, the several slides are longitudinally reciprocated as before stated, the fold bars 934 and 936 being reciprocated with them.

The left and right bearing blocks and all parts carried thereby, including the fold bars 934 and 936, are preferably adjustable on their slides in the direction of slide reciprocation. The rear blocks are so adjustable by means of screws 1006 and 1008, and the forward blocks are so adjustable by means of screws 1010 and 1012. The screws at the front are similar to those at the rear, and it will be sufficient to describe those at the rear.

The screws 1006 and 1008 are oppositely threaded and they respectively engage the blocks 942 and 950. At their adjacent ends, the two screws are respectively connected with members 1014 and 1016 which engage each other in such a manner as to transmit rotative motion while permitting relatively longitudinal motion. Thus, the slides 992 and 976 are free for independent longitudinal movement as previously described. The screw 1008 extends through a stationary bracket 1018 which prevents longitudinal movement of said screw.

The screw 1012 extends through a stationary bracket 1020 which is similar to the bracket 1018 and which prevents longitudinal movement of said screw. The screws 1010 and 1012 are connected with each other by means of a transverse shaft 1022 and by suitable bevel gearing. When the shaft 1022 is turned, the bearing blocks for the two fold bars are moved in unison either toward each other or away from each other, being always equally spaced from a central transverse plane. In this way, the fold bars can be adjusted to accommodate casings for books of different widths.

The sequence of movements and operations for the second fold mechanism is substantially the same as for the first fold mechanism as described in connection with Figs. 45 to 50. Repetition is unnecessary.

Figure 63:
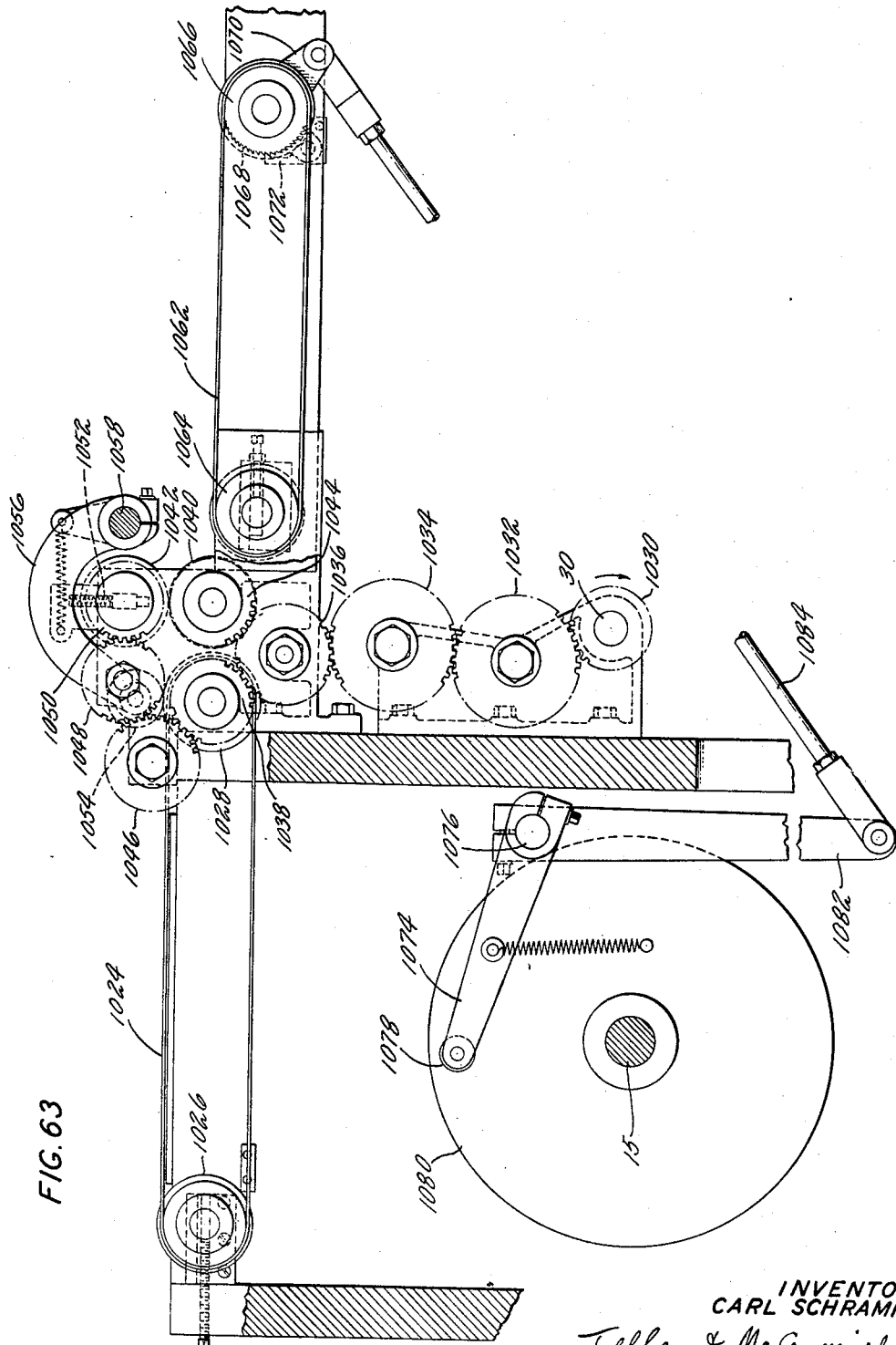
Fig. 63 is a transverse vertical sectional view taken along the line 63—63 of Fig. 2 and showing the parts at Station VII.

*Station VII—pressing and forward transfer mechanism—Figs. 2 and 63*

At Station VII, there is provided a broad endless conveyor belt 1024 extending over rolls 1026 and 1028 mounted on the frame for rotation about fixed longitudinal axes. The belt 1024 is driven from said shaft 30 by means of a gear 1030 on said shaft, a train of idler gears 1032, 1034 and 1036, and a gear 1038 directly connected to said roll 1028. The upper run of said belt 1024 moves forwardly and after the second folding operation, the casing assemblies are transferred by said pickup or transfer device 134 from Station VI and onto said belt. Said upper run of the belt provides a receiving position for the completed cases.

The successive casing assemblies or cases are delivered from the belt 1028 to companion power driven pressing rolls 1040 and 1042 rotatable about longitudinal axes. The lower roll 1040 is rotatable about a fixed axis and is driven by a gear 1044 meshing with the before-mentioned idler gear 1036. The upper roll 1042 is driven from said gear 1038 by means of idler gears 1046 and 1048 and by means of a gear 1050 directly connected to said roll. The upper gear 1042 is vertically movable within narrow limits and is biased downwardly by springs 1052. The outer portion of said upper roll is preferably formed of rubber or equivalent relatively soft material.

For more definitely feeding the successive casing assemblies to said pressing rolls 1040 and 1042, there is provided a feed roll 1054 rotatable about a longitudinal axis. Said roll 1054 extends throughout the width of the belt 1024 and it is located above the roll 1028, said roll 1054 being yieldingly pressed downwardly. As shown, the roll 1054 is carried by two longitudinally spaced arms 1056 pivoted for movement about an axis 1058 at the front of the roll 1042. The roll 1054 is biased downwardly by gravity and it may be additionally biased downwardly by a spring.

From the pressing rolls 1040 and 1042, the casings are discharged onto an endless conveyor belt 1062 preferably having about the same width as the belt 1024. The belt 1062 extends over rolls 1064 and 1066 suitably mounted for rotation about longitudinal axes. The belt is slowly driven to move the upper run thereof forwardly.

As shown, a ratchet wheel 1068 is connected with the roll 1066 and a ratchet arm 1070 is mounted for oscillation about the axis of the ratchet wheel. A pawl 1072 on the ratchet arm engages the teeth of the ratchet wheel to move said wheel in the clockwise direction during each clockwise movement of the ratchet arm. For oscillating the arm 1070, there is provided a lever 1074 secured to a longitudinal shaft 1076. The lever 1074 carries a roller 1078 which engages a cam track, not shown, on a cam disc 1080 secured to said cam shaft 15. Secured to said shaft 1076 for movement therewith is a lever 1082, and a link 1084 connects said lever 1082 with said ratchet arm 1070.

In operation, the pickup device 1034 transfers casings to the conveyor belt 1024. Said belt 1024 in cooperation with the roll 1046 delivers the casings to the pressing rolls 1040 and 1042. The upper roll 1042, being relatively soft, conforms to any minor irregularities and finally presses the glued folds. Said roll 1042 may also form the previously mentioned grooves J, J, shown at "VII" in Figs. 6, 7 and 8. After pressing, the casings are delivered onto the conveyor belt 1062 which is moved intermittently and to small extents. The casings extensively overlap each other on the belt 1062 and they can be removed manually or otherwise from the front portion of said belt.

The invention claimed is:

1. In a cyclically operable case making machine, the combination of a main frame having a sequential series of four horizontally spaced operative stations adapted respectively for board assembly and for cover cloth assembly and for first folding and for second folding, transfer mechanism on the frame automatically operable during each cycle and adapted for substantially simultaneously engaging case components at each of said stations and for thereupon transferring the engaged components from said stations while maintaining the relationship of said components with each other, said transfer mechanism being constructed and arranged to serve during each cycle for depositing the components from each of the first three said stations at the next following stated station and for depositing the components from said second folding station at a receiving position, means operable in timed relationship with the operation of the transfer mechanism for assembling two cover boards and a center element in a predetermined spaced relationship at said board assembly station, means located at said cloth assembly station and operable in timed relation with the operation of the transfer mechanism for gluing a cover cloth on the upper face thereof and for moving the glued cover cloth to a position for the deposit at least partly thereon by said transfer mechanism of the previously assembled cover boards and center element, folding means located at said first folding station and operable after the transfer thereto of the components assembled at said cloth assembly station which folding means serves for folding portions of the previously glued cover cloth around two opposite exposed edges of said cover boards, and folding means located at said second folding station and operable after the transfer thereto of the components from said first folding station which last said folding means serves for folding portions of the previously glued and previously partly folded cover cloth around the two remaining exposed edges of said cover boards.

2. In a cyclically operable case making machine, the combination of a main frame having a sequential series of four horizontally spaced operative stations adapted respectively for board assembly and for cover cloth assembly and for first folding and for second folding, transfer mechanism on the frame including means reciprocable in a fixed path during each cycle and adapted for substantially simultaneously engaging case components at each of said stations and for thereupon transferring the engaged components from said stations while maintaining the relationship of said components with each other, said reciprocable means being constructed and arranged to serve during each cycle for depositing the components from each of the first three said stations at the next following stated station and for depositing the components from said second folding station at a receiving position, means operable in timed relationship with the reciprocable transfer means for assembling two cover boards and a center element in a predetermined spaced relationship at said board assembly station, means located at said cloth assembly station and operable in timed relation with the reciprocable transfer means for gluing a cover cloth on the upper face thereof and for moving the glued cover cloth to a position for the deposit at least partly thereon by said transfer means of the previously assembled cover boards and center element, folding means located at said first folding station and operable after the transfer thereto of the components assembled at said cloth assembly station which folding means serves for folding portions of the previously glued cover cloth around two opposite exposed edges of said cover boards, and folding means located at said second folding station and operable after the transfer thereto of the components from said first folding station which last said folding means serves for folding portions of the previously glued and previously partly folded cover cloth around the two remaining exposed edges of said cover boards.

3. A case making machine as set forth in claim 2, wherein said horizontally spaced stations are arranged in a straight longitudinal line with each station spaced from the next station by a primary distance or an integral multiple thereof, wherein the reciprocable means of said transfer mechanism is a horizontal longitudinal rail above said stations wherein said transfer mechanism includes means automatically operable during each cycle for effecting one complete longitudinal reciprocation of the rail between trailing and leading positions which are spaced apart by said primary distance, wherein said transfer mechanism also includes a plurality of transfer devices carried by the rail and all spaced apart by said primary distance with four of said devices respectively above said four stations when the rail is in its said trailing position, and wherein said transfer mechanism further includes means automatically operable during each cycle and when the rail is in or near its trailing position for moving said transfer devices downwardly and then upwardly to enable four of said devices to engage and lift case components at said four stations which last said means is also automatically operable during each cycle and when the rail is in or near its leading position for moving said transfer devices downwardly and then upwardly to enable four of said devices to deposit case components from preceding stations at said cloth assembly station and at said first folding station and at said second folding station and at said receiving position.

4. A case making machine as set forth in claim 3, wherein the means automatically operable during each cycle for moving the transfer devices downwardly and upwardly is constructed and arranged to also move the entire rail downwardly and upwardly in unison with said transfer devices.

5. A case making machine as set forth in claim 4, wherein two longitudinally spaced uprights are secured to the frame, wherein two similar brackets are respectively connected with the uprights and are guided for vertical movement therealong which brackets support the longitudinal rail, wherein said means for effecting longitudinal movement of the rail effects such reciprocation relatively to said brackets, and wherein said means for moving the rail downwardly and upwardly is connected with said brackets for moving them simultaneously downwardly and upwardly and for thus similarly moving the rail.

6. In a cyclically operable case making machine, the combination of a main frame having a sequential series of four horizontally spaced operative stations adapted respectively for board assembly and for cover cloth assembly and for first folding and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards in a predetermined spaced relationship at said board assembly station, two selectively useable means each operable in timed relationship with the transfer mechanism and each adapted for supplying a center element between and in a predetermined spaced relationship with said cover boards at said board assembly station, one of said two supplying means being constructed and arranged for rearwardly feeding a board center element and the other said two supplying means being constructed and arranged for forwardly feeding a flexible center element which last said supplying means includes a device for cutting the flexible center element to length after feeding, manually controlled means for causing the operation of either of said center element supplying means, means located at said cloth assembly station and operable in timed relation with the reciprocable transfer mechanism for gluing a cover cloth on the upper face thereof and for moving the glued cover cloth to a position for the deposite at least partly thereon by said transfer mechanism of the previously assembled cover boards and center element, folding means located at said first folding station and operable after the transfer thereto of the components assembled at said cloth assembly station which folding means serves for folding portions of the previously glued cover cloth around two opposite exposed edges of said cover boards, and folding means located at said second folding station and operable after the transfer thereto of the components from said first folding station which last said folding means serves for folding portions of the previously glued and previously partly folded cover cloth around the two remaining exposed edges of said cover boards.

7. In a cyclically operable case making machine, the combination of a main frame having a sequential series of horizontally spaced operative stations adapted respectively for board assembly and for cover cloth assembly and for first folding and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means operable in timed relation with the transfer mechanism for gluing two cover cloth sections on the upper faces thereof and for placing the glued cloth sections at the cloth assembly station in longitudinally spaced relationship with each other and in register longitudinally with the cover boards and center element at said board assembly station, means adjacent said cloth assembly station and operable in timed relation with the transfer mechanism for gluing a backstrip on the upper face thereof and for placing the glued backstrip in register longitudinally with the cover boards and center element at said board assembly station, means adjacent said cloth assembly station and operable in timed relation with the transfer mechanism for effecting relative longitudinal movement between the glued backstrip and the glued cover cloth sections to cause overlapping of the outer edge portions of said cover backstrip with the inner edge portions of the cover cloth sections, said backstrip and cover cloth sections after said relative longitudinal movement being located at said cloth assembly station and being engageable with the cover boards and center element transferred from said board assembly station to said cloth assembly station, folding means located at one of said folding stations and operable after the transfer thereto of the components assembled at said cloth assembly station which folding means serves for folding the front and rear portions of the previously glued backstrip and cover cloth sections around front and rear edges of said cover boards and center element, and folding means located at the other of said folding stations and operable after the transfer thereto of the components assembled at said cloth assembly station which last said folding means serves for folding the side portions of the previously glued and previously partly folded cover cloth sections around the side edges of said cover boards.

8. In a cyclically operable case making machine, the combination of a main frame having a sequential series of horizontally spaced operative stations adapted respectively for board assembly and for backstrip assembly and for cover cloth assembly and for first folding and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means operable in timed relation with the transfer mechanism for gluing a backstrip on the upper face thereof and for placing the glued backstrip at the backstrip assembly station for the deposit thereon by said transfer mechanism of the cover boards and center element assembled at said board assembly station, means operable in timed relation with the transfer mechanism for gluing two cover cloth sections on the upper faces thereof and for placing the glued cloth sections at the cloth assembly station in longitudinally spaced relationship with each other for the deposit thereon by said transfer mechanism of the cover boards and center element and backstrip assembled at said backstrip assembly station, folding means located at one of said folding stations and operable after the transfer thereto of the components assembled at said cloth assembly station which folding means serves for folding the front and rear portions of the previously glued backstrip and cover cloth sections around front and rear edges of said cover boards and center element, and folding means located at the other of said folding stations and operable after the transfer thereto of the components assembled at said cloth assembly station which last said folding means serves for folding the side portions of the previously glued and previously partly folded cover cloth sections around the side edges of said cover boards.

9. A case making machine as set forth in claim 8, wherein manual controlled means is provided for rendering inoperative said means for gluing and placing a backstrip at said backstrip assembly station, and wherein said means for gluing and placing two cover cloth sections is constructed and arranged for alternatively gluing and placing a single one-piece cover cloth.

10. In a cyclically operable case making machine, the combination of a main frame having a sequential series of four horizontally spaced operative stations adapted respectively for board assembly and for cover cloth assembly and for first folding and for second folding, transfer mechanism on the frame adapted for substantially simultaneously engaging case components at each of the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means adjacent said cloth assembly station and spaced transversely therefrom for holding a stack of cover cloths, a carrier cylinder rotatable about a longitudinal axis and located between said stack means and the last said station which cylinder has means thereon for gripping a cover cloth, means for rotating said cylinder once during each machine cycle, means operable in timed relation with the rotation of said cylinder for shifting a cover cloth from said stack means to said cylinder for gripping by said gripping devices so that the cover cloth is carried by said cylinder during rotation thereof, means adjacent said cylinder for applying glue to each cover cloth during cylinder rotation, means operable in timed relation with the rotation of said cylinder for engaging a cover cloth after gluing and for carrying the engaged cloth to a location at said cloth assembly station for the deposit at least partly thereon by said transfer mechanism of the previously assembled cover boards and center element, means for sensing the engagement of a cover cloth by said cloth shifting means, means responsive to said sensing means for causing said carrier cylinder to be idle when no cover cloth has been shifted to said cylinder by said shifting means, folding means located at said first folding station and operable after the transfer thereto of the components assembled at said cloth assembly station which folding portions of the previously glued cover cloth around two opposite exposed edges of said cover boards, and folding means located at said second folding station and operable after the transfer thereto of the components from said first folding station which last said folding means serves for folding portions of the previously glued and previously partly folded cover cloth around the two remaining exposed edges of said cover boards.

11. In a cyclically operable case making machine, the combination of a main frame having a sequential series of four operative stations adapted respectively for board assembly and for cover cloth assembly and for first folding and for second folding, each station being spaced from the next station by a primary distance or an integral multiple thereof, transfer mechanism on the frame including a horizontal rail above said stations and including means automatically operable during each cycle for effecting one complete reciprocation of the rail between trailing and leading positions which are spaced apart by said primary distance and said transfer mechanism also including a plurality of transfer devices carried by the rail and all spaced apart by said primary distance with four of said devices respectively above said four stations when the rail is in its said trailing position and said transfer mechanism further including means automatically operable during each cycle and when the rail is in or near its trailing position for moving said transfer devices downwardly and then upwardly to enable said four transfer devices to engage and lift case components at said four stations which last said means is also automatically operable during each cycle and when the rail is in its leading position for moving said transfer devices downwardly and then upwardly to enable four of said transfer devices to deposit case components from preceding stations at said cloth assembly station and at said first folding station and at said second folding station and at said receiving position, means operable in timed relationship with the reciprocable rail and transfer means for assembling two cover boards and a center element in a predetermined spaced relationship at said board assembly station, means located at said cloth assembly station and operable in timed relation with the reciprocable rail and transfer devices for gluing a cover cloth on the upper face thereof and for moving said glued cover cloth to a position for the deposit at least partly thereon by one of said transfer devices of the previously assembled cover boards and center element, folding means located at said first folding station and operable after the transfer thereto of the components assembled at said cloth assembly station which folding means serves for folding portions of the previously glued cover cloth around two opposite exposed edges of said cover boards, and folding means located at said second folding station and operable after the transfer thereto of the components from said first folding station which last said folding means serves for folding portions of the previously glued and previously partly folded cover cloth around the two remaining exposed edges of said cover boards, each of said folding means including two parallel fold bars spaced so as to engage projecting portions of the cover cloth and so as to effect partial folding thereof as the result of downward movement by the corresponding transfer device of the previously assembled case components.

12. In a cyclically operable case making machine, the combination of a main frame having a sequential series of horizontally spaced operative stations adapted respectively for board assembly and for cover cloth assembly and for first folding and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means located at the cloth assembly station and operable in timed relation with the transfer mechanism for gluing a cover cloth on the upper face thereof and for moving the glued cover cloth to a position for the deposit at least partly thereon of the previously assembled cover boards and center element, folding means located at said first folding station and operable after the transfer thereto of the components assembled at said cloth assembly station which folding means serves for folding portions of the previously glued cover cloth around two opposite exposed edges of said cover boards, creasing means operable in timed relationship with the transfer mechanism and after the completion of folding at the first folding station and which creasing means serves to crease the partly folded cover cloth along the two remaining opposite exposed edges of said cover boards, and folding means located at said second folding station and operable after the transfer thereto of the components from said first folding station which last said folding means serves for folding portions of the previously glued and previously partly folded and previously creased cover cloth around the two remaining exposed edges of said cover boards.

13. In a cyclically operable case making machine, the combination of a main frame having a sequential series of horizontally spaced operative stations adapted respectively for board assembly and for cover cloth assembly and for first folding and for creasing and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means located at the cloth assembly station and operable in timed relation with the transfer mechanism for gluing a cover cloth on the upper face thereof and for moving the glued cover cloth to a position for the deposit at least partly thereon of the cover boards and center element assembled at said board assembly station, folding means located at said first folding station and operable after the transfer thereto of the components assembled at said cloth assembly station which folding means serves for folding portions of the previously glued cover cloth around two opposite exposed edges of said cover boards, creasing means located at said creasing station and operable after the transfer thereto of case components from the first folding station which creasing means serves for creasing the partly folded cover cloth along the two remaining opposite exposed edges of said cover boards, and folding means located at said second folding station and operable after the transfer thereto of the components from said creasing station which last said folding means serves for folding portions of the previously glued and previously partly folded and previously creased cover cloth around the two remaining exposed edges of said cover boards.

14. In a cyclically operable case making machine, the combination of a main frame having a sequential series of five horizontally spaced operative stations adapted respectively for board assembly and for cover cloth assembly and for first folding and for second folding, transfer mechanism on the frame adapted for substantially simultaneously engaging case components at the respective stations and for thereupon transferring the engaged components therefrom and for depositing said compoents at subsequent stations and at a receiving position, means operable in timed relationship with the transfer mechanism for assembling two cover boards and a center element in a predetermined spaced relationship at said board assembly station, means operable in timed relation with the transfer mechanism for gluing two cover cloth sections on the upper faces thereof and for placing the glued cloth sections at the cloth assembly station in longitudinally spaced relationship with each other and in register longitudinally with the cover boards and center element at said board assembly station, means adjacent said cloth assembly station and operable in timed relation with the operation of the transfer mechanism for gluing a backstrip on the upper face thereof and for placing the glued backstrip in register longitudinally with the cover boards and center element at said board assembly station, means adjacent said cloth assembly station and operable in timed relation with the transfer mechanism for effecting relative longitudinal movement between the glued backstrip and the glued cover sections to cause overlapping of the outer edge portions of said backstrip with the inner edge portions of the cover cloth sections, said backstrip and cover cloth sections after said relative longitudinal movement being located at said cloth assembly station and being engageable with the cover boards and center element transferred from said board assembly station to said cover assembly station, folding means located at said first folding station and operable after the transfer thereto of the components assembled at said cloth assembly station which folding means serves for folding portions of the previously glued backstrip and portions of the previously glued cloth sections around the rear and front edges of said center element and cover boards, creasing means operable in timed relationship with the transfer mechanism and after the completion of folding at the first folding station which creasing means serves for creasing the partly folded cloth sections along the sides edges of said cover boards, and folding means located at said second folding station and operable after the transfer thereto of the components from said first folding station which last said folding means serves for folding portions of the previously glued and previously partly folded and previously creased cloth sections around the said side edges of said cover boards.

15. In a cyclically operable case making machine, the combination of a main frame having a sequential series of six horizontally spaced operative stations adapted respectively for board assembly and for backstrip assembly and for cover cloth assembly and for first folding and for creasing and for second folding, transfer mechanism on the frame adapted for substantially simultaneously engaging case components at the respective stations and for thereupon transferring the engaged components therefrom and for depositing said components at subsequent stations and at a receiving position, means operable in timed relationship with the transfer mechanism for assembling two cover boards and a center element in a predetermined spaced relationship at said board assembly station, means operable in timed relation with the transfer mechanism for gluing a backstrip on the upper face thereof and for placing the glued backstrip at the backstrip assembly station for the deposit thereon by said transfer mechanism of the cover boards and center element assembled at said board assembly station, means operable in timed relation with the transfer mechanism for gluing two cover cloth sections on the upper faces thereof and for placing the glued cloth sections at the cloth assembly station in longitudinally spaced relationship with each other for the deposit thereon by said transfer mechanism of the cover boards and center element and backstrip assembled at said backstrip assembly station, folding means located at said first folding station and operable after the transfer thereto of the components assembled at said cloth assembly station which folding means serves for folding portions of the previously glued cover cloth around two opposite exposed edges of said cover boards, creasing means located at said creasing station and operable after the transfer thereto of case components from the first folding station which creasing means serves for creasing the partly folded cover cloth along the two remaining opposite exposed edges of said cover boards, and folding means located at said second folding station and operable after the transfer thereto of the components from said creasing station which last said folding means serves for folding portions of the previously glued and previously partly folded and previously creased cover cloth around the two remaining exposed edges of said cover boards.

16. A case making machine as set forth in claim 15, wherein said horizontally spaced stations are arranged in a straight longitudinal line with each station spaced from the next station by a primary distance or an integral multiple thereof, wherein said transfer mechanism includes a horizontal longitudinal rail above said stations and includes means automatically operable during each cycle for effecting one complete longitudinal reciprocation of the rail between trailing and leading positions which are spaced apart by said primary distance, wherein said transfer mechanism also includes a plurality of transfer devices carried by the rail and all spaced apart by said primary distance with four of said devices respectively above said four stations when the rail is in its said trailing position, and wherein said transfer mechanism further includes means automatically operable during each cycle and when the rail is in or near its trailing position for moving said transfer devices downwardly and then upwardly to enable four of said transfer devices to engage and lift case components at said four stations which last said means is also automatically operable during each cycle and when the rail is in or near its leading position for moving said transfer devices downwardly and then upwardly to enable four of said transfer devices to deposit case components from preceding stations at said cloth assembly station and at said first folding station and at said second folding station and at said receiving position.

References Cited in the file of this patent
UNITED STATES PATENTS

| | | |
|---|---|---|
| 1,794,521 | Kirchhofer | Mar. 3, 1931 |
| 1,838,464 | Steinmann | Dec. 29, 1931 |
| 1,950,550 | Glass | Mar. 13, 1934 |
| 2,749,967 | Bach et al. | June 12, 1956 |
| 2,769,187 | D'Huy | Nov. 6, 1956 |

UNITED STATES PATENT OFFICE
CERTIFICATE OF CORRECTION

Patent No. 2,925,612  
February 23, 1960

Carl Schramm

It is hereby certified that error appears in the printed specification of the above numbered patent requiring correction and that the said Letters Patent should read as corrected below.

Column 4, line 21, for "shwn" read -- shown --; column 5, line 7, before "backstrip" insert an opening quotation mark; line 8, for "Station II" read -- Station III --; line 42, for "eges" read -- edges --; column 11, line 16, for "sides" read -- side --; column 12, line 12, for "sides" read -- slides --; column 14, line 22, for "time" read -- timed --; column 16, line 42, beginning with "The stack mechanism" strike out all to and including "precut backstrips E.", in line 44, same column; column 23, line 15, for "other designated" read -- their disengaged --; column 26, line 45, for "Station" read -- Stations --; line 52, for "60" read -- 50 --; column 36, line 38, for "deposite" read -- deposit --; column 40, line 28, for "compoents" read -- components --; line 65, for "sides" read -- side --.

Signed and sealed this 4th day of October 1960.

(SEAL)  
Attest:

KARL H. AXLINE  
Attesting Officer

ROBERT C. WATSON  
Commissioner of Patents